US010409029B2

(12) United States Patent
Hosokawa et al.

(10) Patent No.: US 10,409,029 B2
(45) Date of Patent: Sep. 10, 2019

(54) LENS DRIVING DEVICE

(71) Applicant: TDK CORPORATION, Tokyo (JP)

(72) Inventors: Masahiro Hosokawa, Tokyo (JP);
Naoki Yusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/795,041

(22) Filed: Oct. 26, 2017

(65) Prior Publication Data

US 2018/0113276 A1   Apr. 26, 2018

(30) Foreign Application Priority Data

Oct. 26, 2016 (JP) ................................. 2016-209712
Sep. 27, 2017 (JP) ................................. 2017-186915

(51) Int. Cl.
| | |
|---|---|
| *G02B 7/02* | (2006.01) |
| *G02B 7/10* | (2006.01) |
| *G02B 7/04* | (2006.01) |
| *G02B 26/08* | (2006.01) |
| *G03B 3/10* | (2006.01) |
| *H04N 5/225* | (2006.01) |
| *G03B 5/02* | (2006.01) |

(52) U.S. Cl.
CPC ............. *G02B 7/102* (2013.01); *G02B 7/026* (2013.01); *G02B 7/04* (2013.01); *G02B 26/0875* (2013.01); *G03B 3/10* (2013.01); *G03B 5/02* (2013.01); *H04N 5/2253* (2013.01); *H04N 5/2254* (2013.01); *G03B 2205/0015* (2013.01); *G03B 2205/0061* (2013.01)

(58) Field of Classification Search
CPC .......... G02B 7/04; G02B 27/646; G03B 5/00; G03B 2205/0038; G03B 2205/0061; H04N 5/2253; H04N 5/23248; H04N 5/23287; H04N 5/2254; H04N 5/349
USPC ................................. 359/676–706, 822–826
See application file for complete search history.

(56) References Cited

U.S. PATENT DOCUMENTS 6,539,174 B1 * 3/2003 Tanii .................... G02B 27/646
                                                        396/55

FOREIGN PATENT DOCUMENTS

JP          2009-093001 A      4/2009

* cited by examiner

*Primary Examiner* — Mahidere S Sahle
(74) *Attorney, Agent, or Firm* — Oliff PLC

(57) ABSTRACT

A lens driving device includes a base member, a movable element movable with respect to the base member, a piezoelectric actuator configured to move the movable element, a base-member-side urging part, and a movable-element-side urging part. The base-member-side urging part urges the movable element toward the base member side. The movable-element-side urging part urges the piezoelectric actuator toward the movable element side.

7 Claims, 33 Drawing Sheets

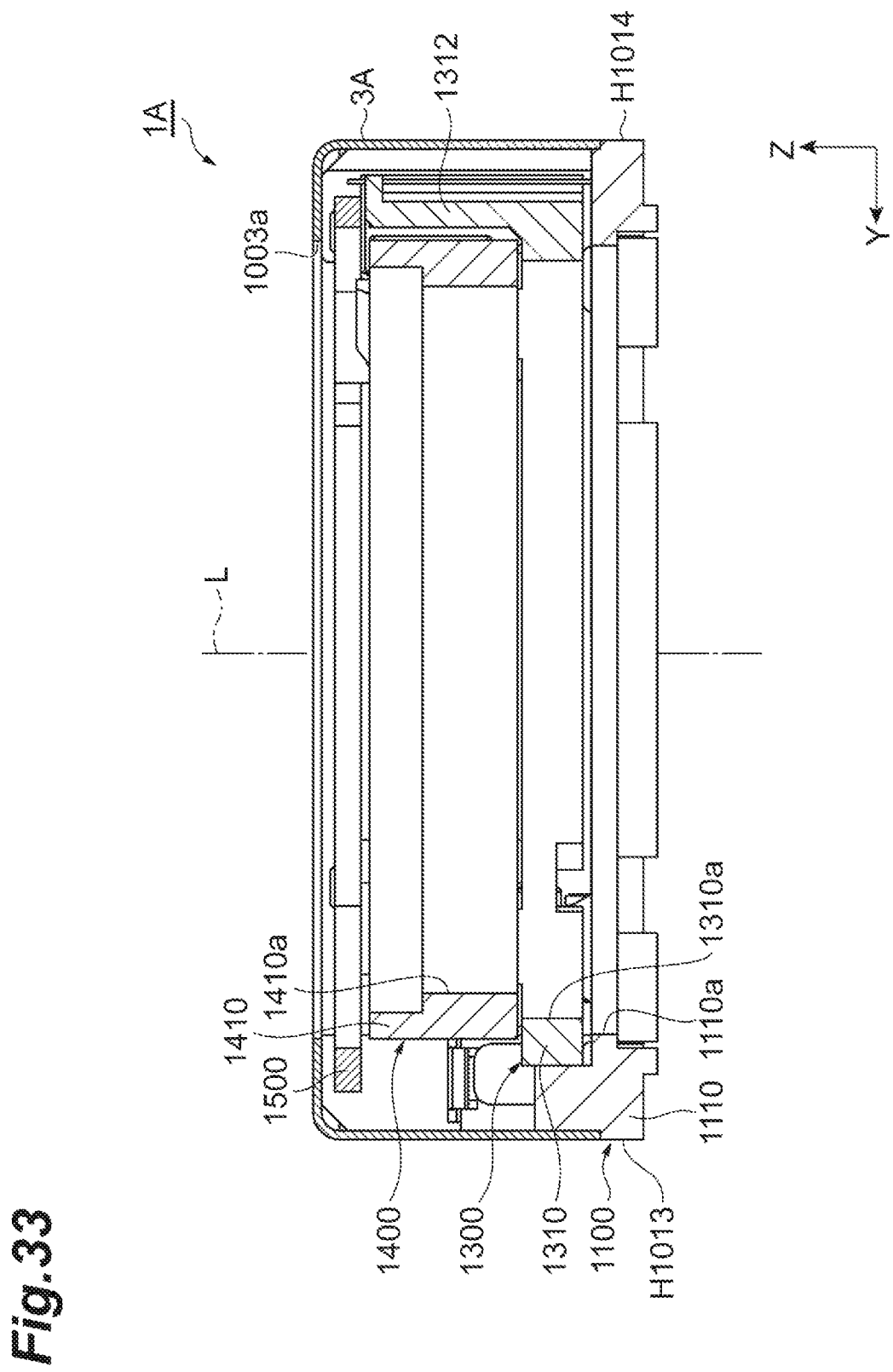

LENS DRIVING DEVICE

CROSS-REFERENCE TO RELATED APPLICATIONS

The disclosure is based upon and claims the benefit of priority from Japanese Patent Application No. 2016-209712 filed on Oct. 26, 2016 and Japanese Patent Application No. 2017-186915 filed on Sep. 27, 2017, the entire contents of which are incorporated herein by reference.

TECHNICAL FIELD

The present disclosure relates to a lens driving device.

BACKGROUND

Conventionally, as one type of a lens driving device used for an imaging apparatus mounted on a mobile phone or the like, lens drive devices adopting a smooth impact drive mechanism ("SIDM" is a registered trademark) are known.

A lens driving device adopting a smooth impact drive mechanism is disclosed in, for example, Japanese Unexamined Patent Publication No. 2009-93001. In the lens driving device disclosed in Japanese Unexamined Patent Publication No. 2009-93001, a camera shake correction function is realized by moving a lens unit in a direction orthogonal to a direction of an optical axis, with an actuator using the smooth impact drive mechanism.

SUMMARY

In a lens driving device, occurrence of unintended tilt or the like is undesirable during movement of a lens by an actuator, since the tilt may cause disturbance or the like of an image. For this reason, in the field of the lens driving device, there is a need for stable movement of a movable element during driving by the actuator.

In view of the above, an object of one aspect of the present disclosure is to provide a lens driving device capable of stably moving a movable element.

One aspect of the present disclosure is a lens driving device for driving a lens. The lens driving device includes: a base member; a movable element arranged to be stacked on the base member in a direction of an optical axis of the lens, and movable with respect to the base member; a piezoelectric actuator having a piezoelectric element, and configured to move the movable element in a direction orthogonal to the direction of the optical axis of the lens by expanding and contracting the piezoelectric element; a lens carrier arranged to be stacked on the movable element, on an opposite side to a side provided with the base member in the direction of the optical axis of the lens, and capable of holding the lens; a base-member-side urging part mounted on the base member; and a movable-element-side urging part mounted on the movable element. In the lens driving device, a second end part of the piezoelectric actuator is engaged with the movable element, the base-member-side urging part urges the movable element toward the base member side, and the movable-element-side urging part urges the piezoelectric actuator toward the movable element side.

In the lens driving device, the movable element is urged toward the base member side by the base-member-side urging part. This suppresses floating of the movable element from the base member, and raffling of the movable element with respect to the base member. The movable-element-side urging part urges the piezoelectric actuator toward the movable element side. That is, the piezoelectric actuator is sandwiched between the movable element and the movable-element-side urging part. Thus, providing the base-member-side urging part and the movable-element-side urging part causes suppression of floating of the movable element from the base member, enabling stable movement of the movable element.

A first end part of the piezoelectric actuator may be fixed to the base member, while the second end part may be engaged with the movable element. The movable-element-side urging part may urge the piezoelectric actuator toward the movable element side while the piezoelectric actuator is located closer to the base member than the movable element. Since the piezoelectric actuator is fixed to the base member, sandwiching the piezoelectric actuator between the movable element and the movable-element-side urging part suppresses rattling of the movable element with respect to the base member.

The base-member-side urging part may be opposed to the movable-element-side urging part with the optical axis of the lens interposed in between. In this case, the base-member-side urging part and the movable-element-side urging part can hold the movable element at a position with the center of gravity of the lens interposed in between. This allows the lens driving device to further stably move the movable element by the base-member-side urging part and the movable-element-side urging part.

The piezoelectric actuator may have a piezoelectric element, and a drive shaft having one end part fixed to the piezoelectric element. An end part on the piezoelectric element side of the piezoelectric actuator with respect to the drive shaft may be fixed to the base member, the drive shaft may be engaged with the movable element, and the movable-element-side urging part may urge the drive shaft toward the movable element side while the drive shaft is located closer to the base member than the movable element. In this case, the drive shaft is sandwiched between the movable-element-side urging part and the movable element, and frictionally engaged with the movable-element-side urging part and the movable element. This allows the piezoelectric actuator to move the movable element frictionally engaged with the drive shaft, in an expansion/contraction direction of the piezoelectric element, by expanding and contracting the piezoelectric element.

Another aspect of the present disclosure is a lens driving device for driving a lens. The lens driving device includes: a base member; an X-axis movable element arranged to be stacked on the base member in a direction of an optical axis of the lens, and movable with respect to the base member; an X-axis piezoelectric actuator having an X-axis piezoelectric element, and configured to move the X-axis movable element in an X-axis direction orthogonal to the direction of the optical axis of the lens by expanding and contracting the X-axis piezoelectric element; a Y-axis movable element arranged to be stacked on the X-axis movable element, on an opposite side to a side provided with the base member in the direction of the optical axis of the lens, and movable with respect to the X-axis movable element; a Y-axis piezoelectric actuator having a Y-axis piezoelectric element, and configured to move the Y-axis movable element in a Y-axis direction orthogonal to the direction of the optical axis of the lens and crossing the X-axis direction, by expanding and contracting the Y-axis piezoelectric element; a lens carrier arranged to be stacked on the Y-axis movable element, on an opposite side to a side provided with the X-axis movable element in the direction of the optical axis of the lens, and capable of holding the lens; a first urging part mounted on the base member; a second urging part mounted on the X-axis movable element; a third urging part mounted on the X-axis movable element; and a fourth urging part mounted on the Y-axis movable element. In the lens driving device, a first end part of the X-axis piezoelectric actuator is fixed to the base member, and a second end part is engaged with the X-axis movable element; a first end part of the Y-axis piezoelectric actuator is fixed to the X-axis movable element, and a second end part is engaged with the Y-axis movable element; the first urging part urges the X-axis movable element toward the base member side; the second urging part urges the X-axis piezoelectric actuator toward the X-axis movable element side while the X-axis piezoelectric actuator is located closer to the base member than the X-axis movable element; the third urging part urges the Y-axis movable element toward the X-axis movable element; and the fourth urging part urges the Y-axis piezoelectric actuator toward the Y-axis movable element side while the Y-axis piezoelectric actuator is located closer to the X-axis movable element than the Y-axis movable element.

In the lens driving device, the X-axis movable element is urged toward the base member side by the first urging part. This suppresses floating of the X-axis movable element from the base member, and rattling of the X-axis movable element with respect to the base member. Similarly, the Y-axis movable element is urged toward the X-axis movable element side by the third urging part. This suppresses rattling of the Y-axis movable element with respect to the X-axis movable element. The second urging part urges the X-axis piezoelectric actuator toward the X-axis movable element side. That is, the X-axis piezoelectric actuator is sandwiched between the X-axis movable element and the second urging part. Since the X-axis piezoelectric actuator is fixed to the base member, rattling of the X-axis movable element with respect to the base member is suppressed. Similarly, the fourth urging part urges the Y-axis piezoelectric actuator toward the Y-axis movable element side. That is, the Y-axis piezoelectric actuator is sandwiched between the Y-axis movable element and the fourth urging part. Since the Y-axis piezoelectric actuator is fixed to the X-axis movable element, rattling of the Y-axis movable element with respect to the X-axis movable element is suppressed. Thus, having the first to fourth urging parts causes suppression of floating of the X-axis movable element and the Y-axis movable element from the base member, enabling stable movement of the X-axis movable element and the Y-axis movable element.

The first urging part may be opposed to the second urging part with the optical axis of the lens in between, and the third urging part may be opposed to the fourth urging part with the optical axis of the lens in between. In this case, the first urging part and the second urging part can hold the X-axis movable element at a position with the center of gravity of the lens interposed in between. Similarly, the third urging part and the fourth urging part can hold the Y-axis movable element at a position with the center of gravity of the lens interposed in between. Arranging the first to fourth urging parts in this way allows the lens driving device to further stably move the X-axis movable element and the Y-axis movable element.

The X-axis piezoelectric actuator may have an X-axis piezoelectric element, and an X-axis drive shaft having one end part fixed to the X-axis piezoelectric element. An end part on the X-axis piezoelectric element side of the X-axis piezoelectric actuator, with respect to the X-axis drive shaft, may be fixed to the base member, and the X-axis drive shaft may be engaged with the X-axis movable element. The second urging part may urge the X-axis drive shaft toward the X-axis movable element side while the X-axis drive shaft is located closer to the base member than the X-axis movable element. The Y-axis piezoelectric actuator may have a Y-axis piezoelectric element, and a Y-axis drive shaft having one end part fixed to the Y-axis piezoelectric element. An end part on the Y-axis piezoelectric element side of the Y-axis piezoelectric actuator, with respect to the Y-axis drive shaft, may be fixed to the X-axis movable element, and the Y-axis drive shaft may be engaged with the Y-axis movable element. The fourth urging part may urge the Y-axis drive shaft toward the Y-axis movable element side while the Y-axis drive shaft is located closer to the X-axis movable element than the Y-axis movable element. In this case, the X-axis drive shaft is sandwiched between the second urging part and the X-axis movable element, and frictionally engaged with the second urging part and the X-axis movable element. This allows the X-axis piezoelectric actuator to move the X-axis movable element frictionally engaged with the X-axis drive shaft, in an expansion/contraction direction of the X-axis piezoelectric element, by expanding and contracting the X-axis piezoelectric element. Similarly, the Y-axis drive shaft is sandwiched between the fourth urging part and the Y-axis movable element, and frictionally engaged with the fourth urging part and the Y-axis movable element. This allows the Y-axis piezoelectric actuator to move the Y-axis movable element frictionally engaged with the Y-axis drive shaft, in an expansion/contraction direction of the Y-axis piezoelectric element, by expanding and contracting the Y-axis piezoelectric element.

According the various aspects of the present disclosure, the movable element can be stably moved.

BRIEF DESCRIPTION OF THE DRAWINGS

FIG. 33 is a cross-sectional view showing a state in which the lens driving device of FIG. 17 is cut along a direction of an optical axis.

DETAILED DESCRIPTION

Figure 1:
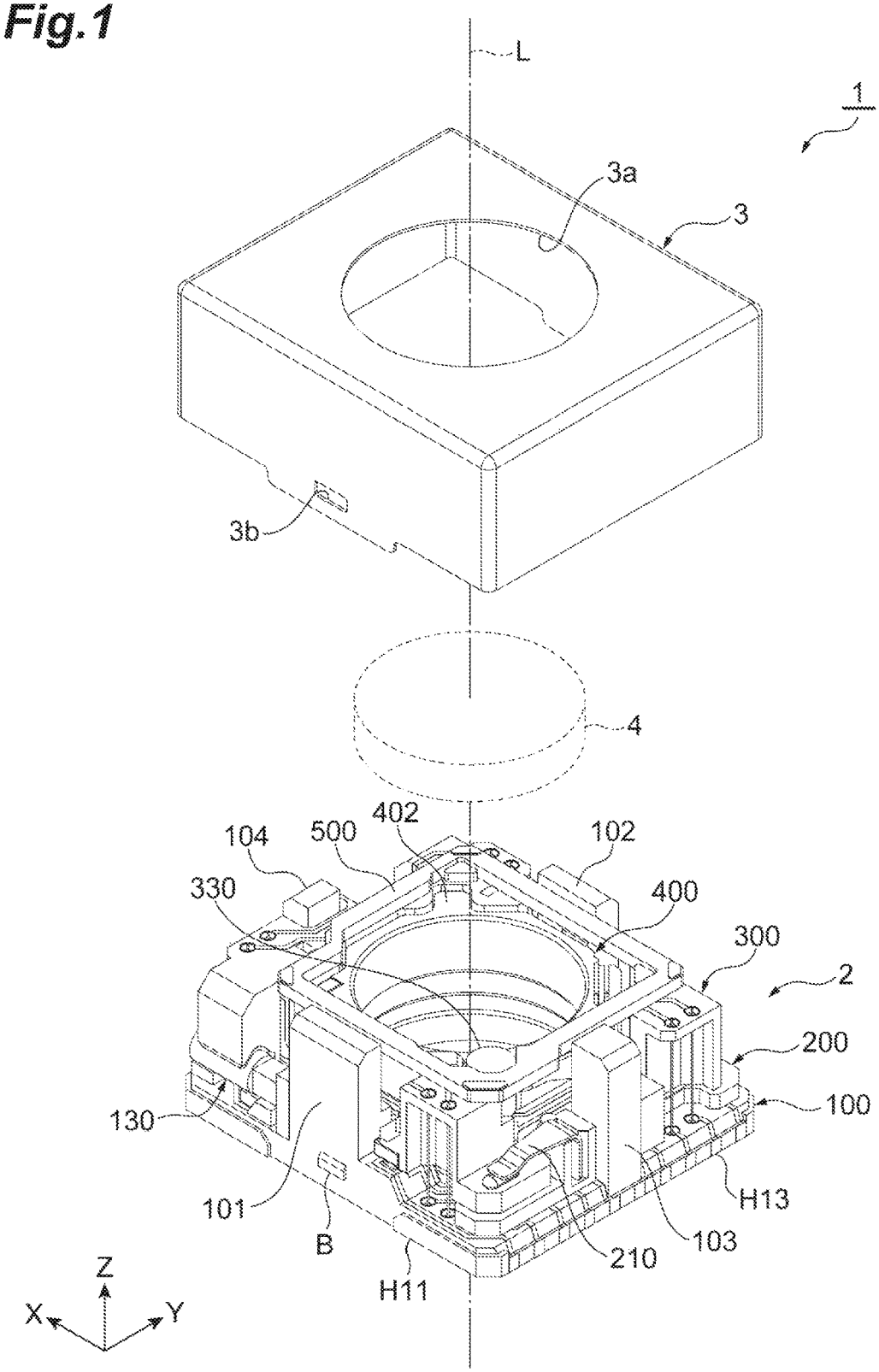
FIG. 1 is an exploded perspective view showing an internal configuration of a lens driving device according to a first embodiment.

Hereinafter, an embodiment of the present disclosure will be described with reference to the drawings. In the description of the drawings, the same elements are denoted by the same reference numerals, and duplicate descriptions are omitted.

First Embodiment

Figure 2:
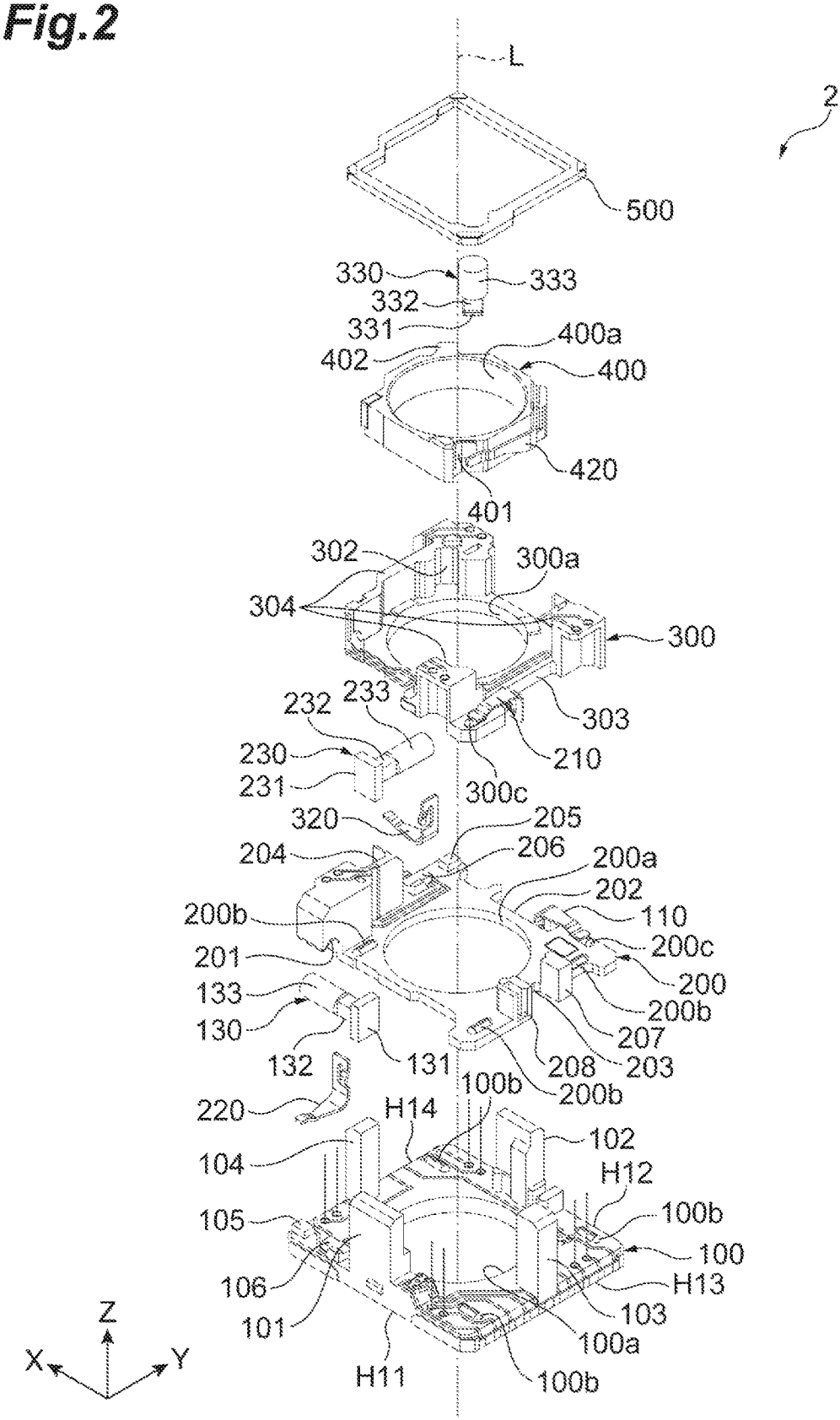
FIG. 2 is an exploded perspective view of a lens driving part of FIG. 1.

First, a first embodiment will be described. A lens driving device 1 shown in FIGS. 1 and 2 is mounted on an imaging apparatus such as a digital camera for example, and drives a lens 4. A lens driving device 1 includes a lens driving part 2 and a case 3. The lens driving device 1 has an optical axis L of a lens 4 to be mounted on the lens driving part 2.

For convenience of description, each figure shows an XYZ orthogonal coordinate system. The Z-axis direction is a direction of the optical axis L of the lens 4 to be mounted. The X-axis direction is orthogonal to the direction of the optical axis L. The Y-axis direction is orthogonal to the direction of the optical axis L and orthogonal to the X-axis direction.

The lens driving part 2 includes a base member 100, an X-axis movable element 200, a Y-axis movable element 300, a lens carrier 400, and a holding frame 500. The base member 100, the X-axis movable element 200, the Y-axis movable element 300, the lens carrier 400, and the holding frame 500 are arranged in this order along the direction of the optical axis L.

Specifically, the X-axis movable element 200 is arranged to be stacked on the base member 100 in the direction of the optical axis L. The Y-axis movable element 300 is arranged to be stacked on the X-axis movable element 200, on an opposite side to a side provided with the base member 100 (the side where the base member 100 is stacked) in the direction of the optical axis L. The lens carrier 400 is arranged to be stacked on the Y-axis movable element 300, on an opposite side to a side provided with the X-axis movable element 200 (the side where the X-axis movable element 200 is stacked) in the direction of the optical axis L.

The X-axis movable element 200 is supported by the base member 100 to be relatively movable with respect to the base member 100 in the X-axis direction. The Y-axis movable element 300 is supported by the X-axis movable element 200 to be relatively movable with respect to the X-axis movable element 200 in the Y-axis direction. The lens carrier 400 is supported by the Y-axis movable element 300 to be relatively movable with respect to the Y-axis movable element 300 in the direction of the optical axis L.

First, details around the base member 100 will be described. As shown in FIG. 2, the base member 100 is a substantially rectangular plate member having four corners when viewed along the direction of the optical axis L. For convenience of description, individual four edges constituting an outer peripheral edge of the base member 100 when viewed along the direction of the optical axis L are referred to as an edge H11, an edge H12, an edge H13, and an edge H14. The edge H11 and the edge H12 are parallel and extend along the X-axis direction. The edge H13 and the edge H14 are parallel and extend along the Y-axis direction. When the base member 100 is viewed along the direction of the optical axis L, individual edges are connected in the order of the edge H11, the edge H14, the edge H12, and the edge H13 to form the outer peripheral edge.

The base member 100 is provided with a circular opening 100a centered on the optical axis L. The base member 100 is provided with a plurality of projections 100b, on a surface on a side stacked with the X-axis movable element 200. A top of the projection 100b has a substantially arcuate cross section along the Y-axis direction. The projection 100b extends in a band shape along the X-axis direction. Note that the projection 100b is not limited to extending in the band shape, but may be substantially hemispherical.

The lens driving part 2 further includes a first support column 101, a second support column 102, a third support column 103, and a fourth support column 104. The first support column 101 to the fourth support column 104 are provided on the base member 100, on the surface on the side stacked with the X-axis movable element 200, and rising from the base member 100 toward the X-axis movable element 200 side. The first support column 101 to the fourth support column 104 are provided on an edge portion of the base member 100.

In detail, the first support column 101 is provided at a substantially intermediate position of the edge H11 at the edge portion on the edge H11 side of the base member 100. The second support column 102 is provided at a substantially intermediate position of the edge H12 at the edge portion on the edge H12 side of the base member 100. The third support column 103 is provided at a substantially intermediate position of the edge H13 at the edge portion on the edge H13 side of the base member 100. The fourth support column 104 is provided at a substantially intermediate position of the edge H14 at the edge portion on the edge H14 side of the base member 100.

Figure 3:
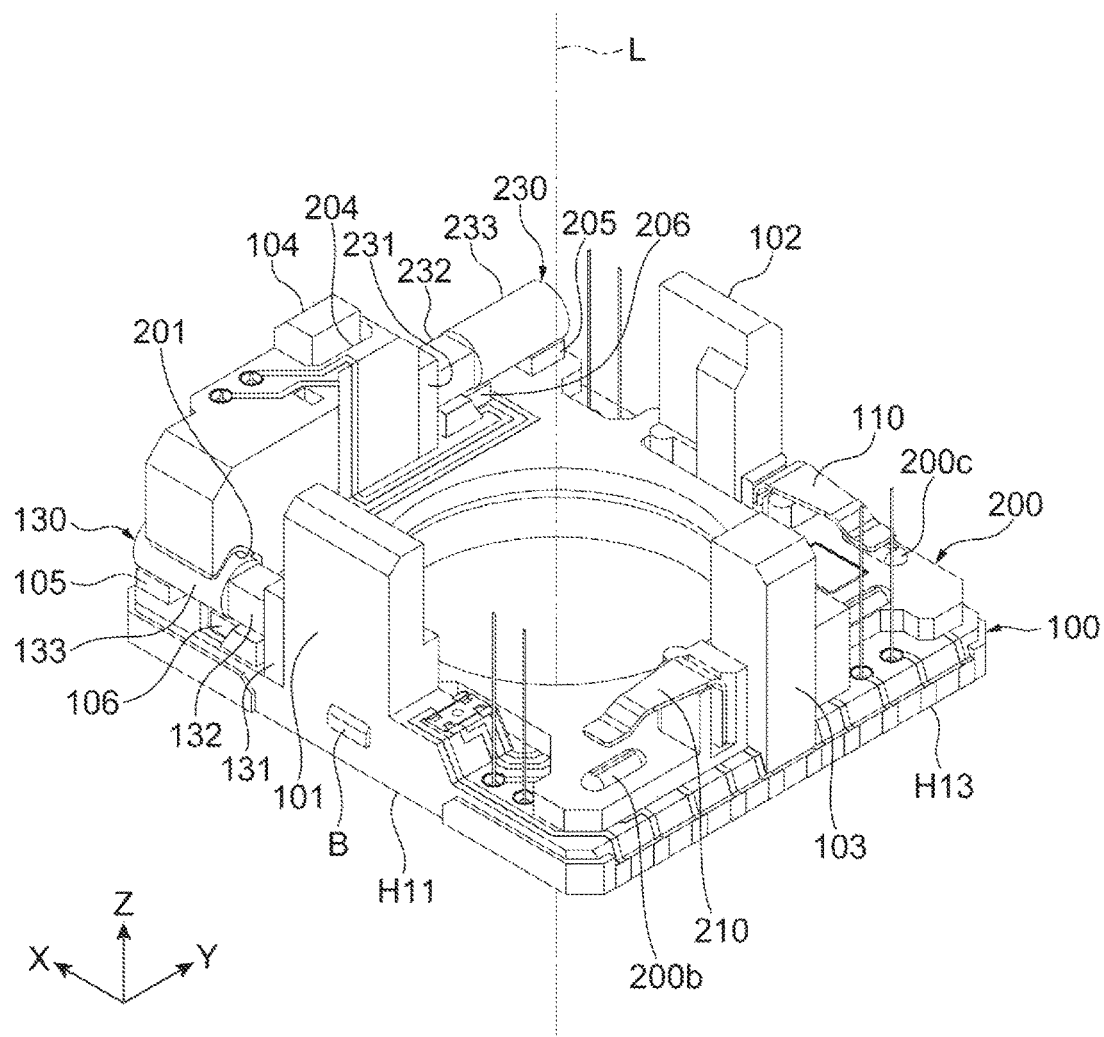
FIG. 3 is a perspective view showing a state in which a base member and an X-axis movable element are combined.

As shown in FIGS. 2 and 3, the lens driving part 2 further includes an X-axis piezoelectric actuator 130. The X-axis piezoelectric actuator 130 is an actuator constituting a smooth impact drive mechanism. The X-axis piezoelectric actuator 130 has a piezoelectric element, and moves the X-axis movable element 200 in the X-axis direction by expanding and contracting the piezoelectric element. In detail, the X-axis piezoelectric actuator 130 includes a weight part 131, an X-axis piezoelectric element 132, and an X-axis drive shaft 133.

The X-axis piezoelectric element 132 is an element capable of expanding and contracting in the X-axis direction. The X-axis piezoelectric element 132 is made of a piezoelectric material. The X-axis drive shaft 133 is formed in a columnar shape, and arranged such that an axis of the column extends along the X-axis direction. The X-axis drive shaft 133 is fixed to a first end part of the X-axis piezoelectric element 132 in the expansion/contraction direction. The weight part 131 is fixed to a second end part of the X-axis piezoelectric element 132 in the expansion/contraction direction.

A first end part (an end part on the weight part 131 side) of the X-axis piezoelectric actuator 130 is fixed to a surface on the edge H14 side of the first support column 101. The X-axis piezoelectric actuator 130 extends from the surface on the edge H14 side of the first support column 101, toward the edge H14 side along the X-axis direction. A second end part (an end part on the X-axis drive shaft 133 side) of the X-axis piezoelectric actuator 130 is engaged with the X-axis movable element 200 to move the X-axis movable element 200 in the X-axis direction.

The base member 100 is provided with a first projection 105 and a second projection 106 at a portion facing the X-axis drive shaft 133 of the X-axis piezoelectric actuator 130. The first projection 105 and the second projection 106 slidably abut on a surface on the base member 100 side of the X-axis drive shaft 133, to support the X-axis drive shaft 133.

Next, details of a configuration of the X-axis movable element 200 and details of a supporting configuration of the X-axis movable element 200 by the base member 100 will be described. As shown in FIG. 2, the X-axis movable element 200 is a substantially rectangular plate member having four corners when viewed along the direction of the optical axis L. The X-axis movable element 200 is provided with a circular opening 200a centered on the optical axis L.

The X-axis movable element 200 is provided with escape portions 202, 203, and 204 to avoid interference with the second support column 102, the third support column 103, and the fourth support column 104, when stacked on the base member 100. The escape portions 202 to 204 have a shape in which the outer peripheral edge of the X-axis movable element 200 is recessed toward inside (the opening 200a side).

The X-axis movable element 200 is provided with rising portions 207 and 208 rising toward the Y-axis movable element 300 side, on a surface on a side stacked with the Y-axis movable element 300. The rising portions 207 and 208 are provided at positions where the escape portion 203 is sandwiched between the rising portion 207 and the rising portion 208 in the Y-axis direction.

The X-axis movable element 200 has an X-axis friction engagement part 201 frictionally engaged with the X-axis drive shaft 133 of the X-axis piezoelectric actuator 130. In the X-axis friction engagement part 201, a surface abutting on the X-axis drive shaft 133 is V-shaped. Further, in the X-axis friction engagement part 201, a V-shaped metal plate is provided at a portion abutting on the X-axis drive shaft 133.

The X-axis movable element 200 is provided with a plurality of projections 200b, on a surface on a side stacked with the Y-axis movable element 300. A top of the projection 200b has a substantially arcuate cross section along the X-axis direction. The projection 200b extends in a band shape along the Y-axis direction. Note that the projection 200b is not limited to extending in the band shape, but may be substantially hemispherical.

As shown in FIGS. 2 and 3, the lens driving part 2 further includes a Y-axis piezoelectric actuator 230. The Y-axis piezoelectric actuator 230 is an actuator constituting the smooth impact drive mechanism. The Y-axis piezoelectric actuator 230 has a piezoelectric element, and moves the Y-axis movable element 300 in the Y-axis direction by expanding and contracting the piezoelectric element. In detail, the Y-axis piezoelectric actuator 230 includes a weight part 231, a Y-axis piezoelectric element 232, and a Y-axis drive shaft 233.

The Y-axis piezoelectric element 232 is an element capable of expanding and contracting in the Y-axis direction. The Y-axis piezoelectric element 232 is made of a piezoelectric material. The Y-axis drive shaft 233 is formed in a columnar shape, and arranged such that an axis of the column extends along the Y-axis direction. The Y-axis drive shaft 233 is fixed to a first end part of the Y-axis piezoelectric element 232 in the expansion/contraction direction. The weight part 231 is fixed to a second end part of the Y-axis piezoelectric element 232 in the expansion/contraction direction.

A first end part (an end part on the weight part 231 side) of the Y-axis piezoelectric actuator 230 is fixed to a rising wall portion provided around the escape portion 204 of the X-axis movable element 200. The Y-axis piezoelectric actuator 230 extends from a part fixed with the X-axis movable element 200 along the Y-axis direction. A second end part (an end part on the Y-axis drive shaft 233 side) of the Y-axis piezoelectric actuator 230 is engaged with the Y-axis movable element 300 to move the Y-axis movable element 300 in the Y-axis direction.

The X-axis movable element 200 is provided with a first projection 205 and a second projection 206, at a portion facing the Y-axis drive shaft 233 of the Y-axis piezoelectric actuator 230. The first projection 205 and the second projection 206 slidably abut on a surface on the X-axis movable element 200 side of the Y-axis drive shaft 233, to support the Y-axis drive shaft 233.

Next, a state in which the X-axis movable element 200 is stacked on the base member 100 will be described. As shown in FIGS. 3 to 7, with the X-axis movable element 200 stacked on the base member 100, the projection 100*b* of the base member 100 abuts on the surface on the base member 100 side of the X-axis movable element 200. As shown in FIG. 7, when viewed along the direction of the optical axis L, the second support column 102 is fitted into the recessed escape portion 202. Similarly, the third support column 103 is fitted into the escape portion 203. The fourth support column 104 is fitted into the escape portion 204. The X-axis friction engagement part 201 abuts on a surface of the X-axis drive shaft 133, opposite to the base member 100. That is, the X-axis drive shaft 133 is located closer to the base member 100 than the X-axis friction engagement part 201. As described above, the X-axis piezoelectric actuator 130 is located between the X-axis movable element 200 (a portion provided with the X-axis friction engagement part 201, in the X-axis movable element 200) and the base member 100.

Figure 5:
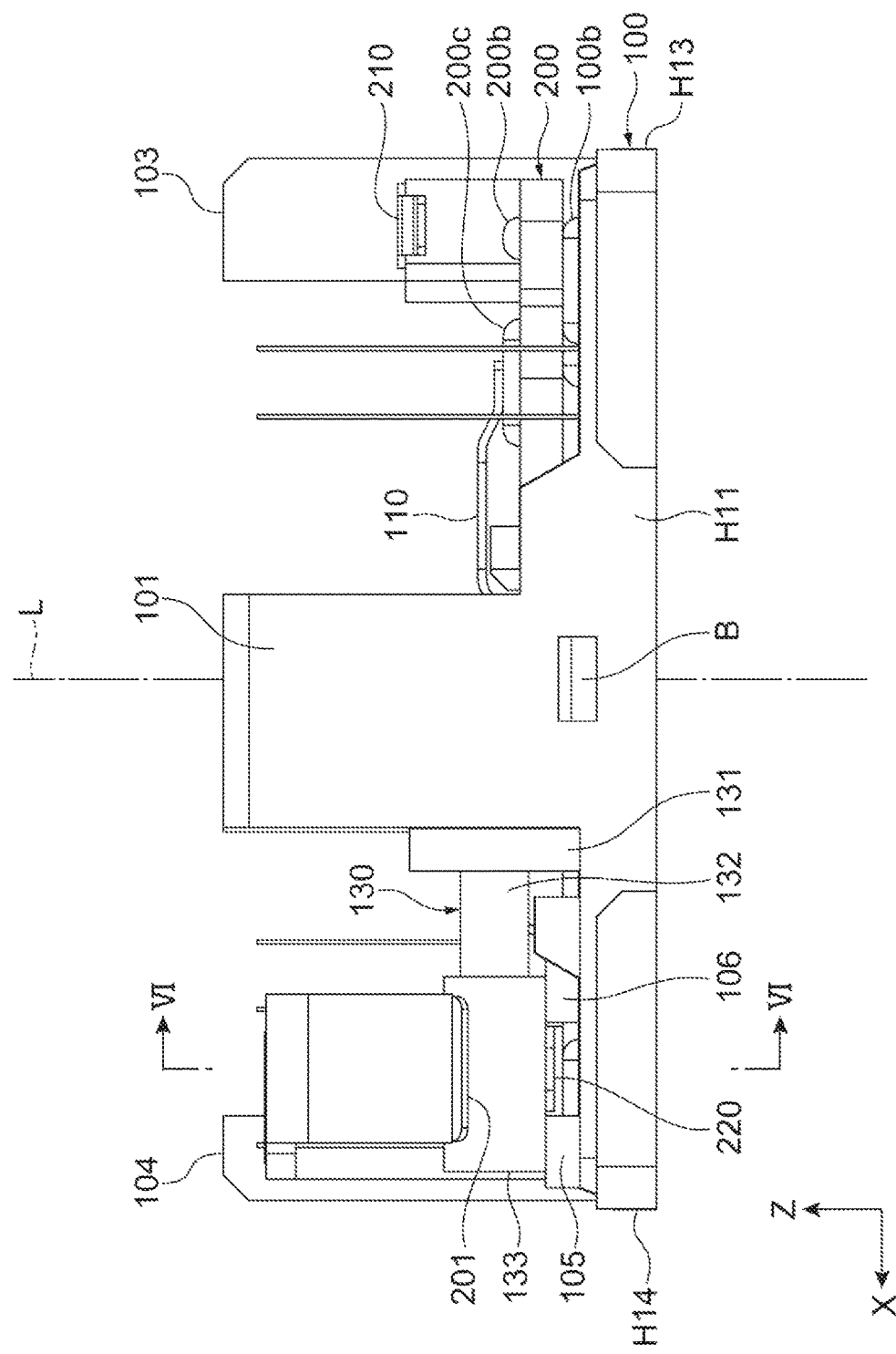
FIG. 5 is a side view of a state in which the base member and the X-axis movable element are combined, as viewed from a first column portion side.
Figure 6:
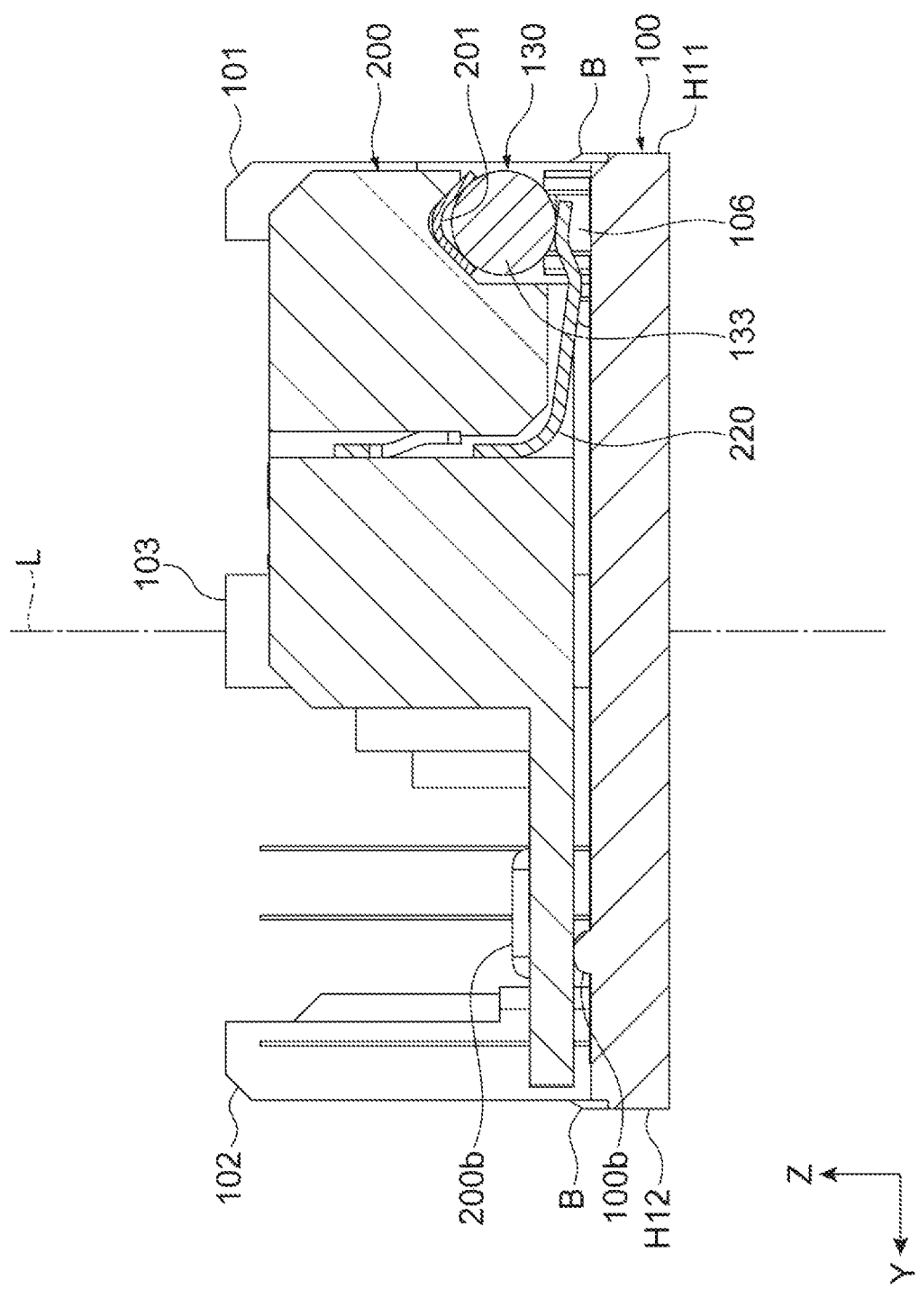
FIG. 6 is a cross-sectional view taken along line VI-VI of FIG. 5.
Figure 7:
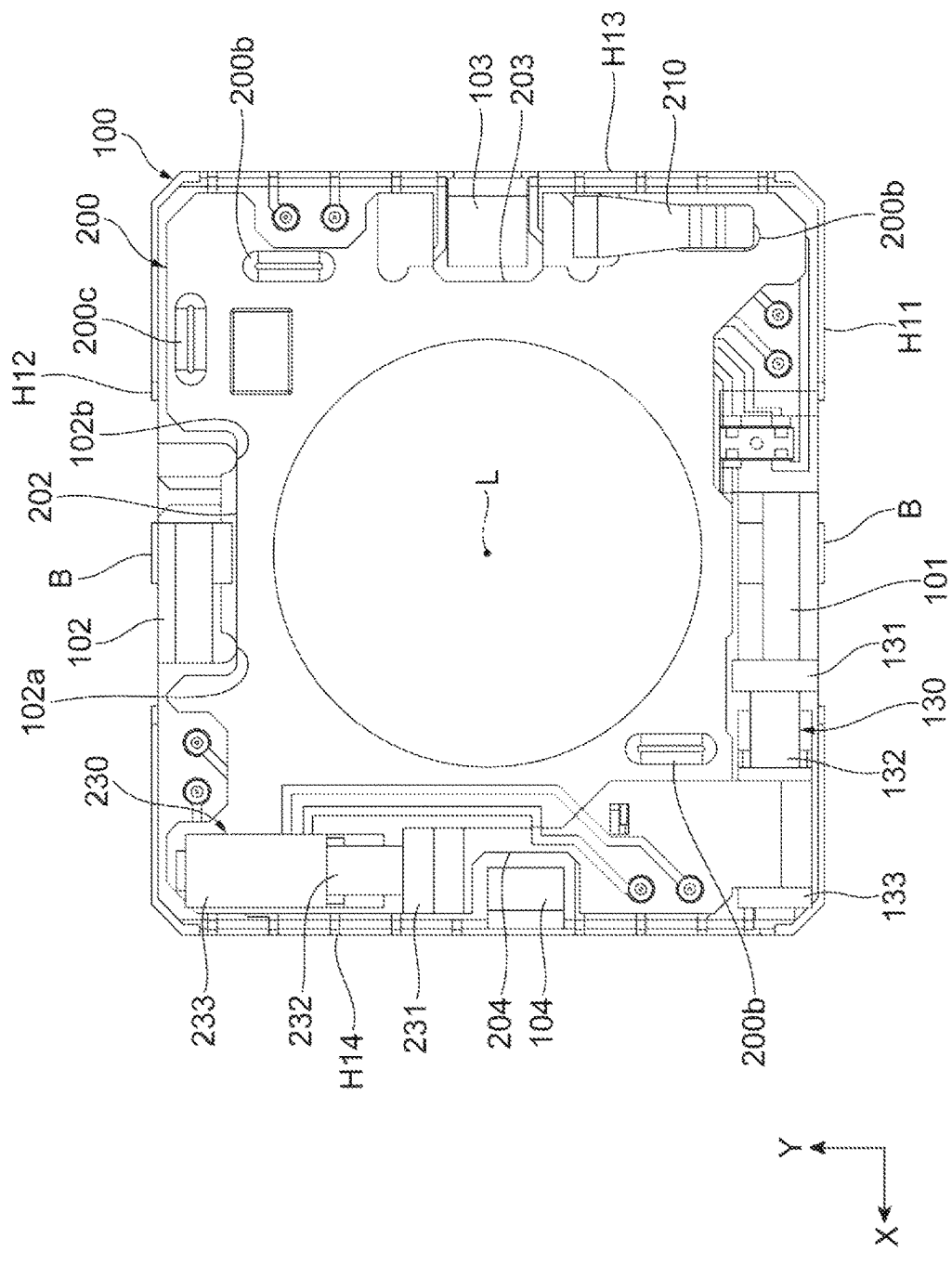
FIG. 7 is a plan view of a state in which the base member and the X-axis movable element are combined, as viewed from the X-axis movable element side.

Additionally, as shown in FIGS. 2, 5 and 6, the X-axis movable element 200 is mounted with a second urging part (movable-element-side urging part) 220 having a first end part fixed to the X-axis movable element 200, and a second end part abutting on the X-axis drive shaft 133 of the X-axis piezoelectric actuator 130. The second urging part 220 has elasticity. The second end part of the second urging part 220 abuts on the X-axis drive shaft 133, between the first projection 105 and the second projection 106. By abutting on the X-axis drive shaft 133, the second urging part 220 urges the X-axis drive shaft 133 toward the X-axis movable element 200 side. That is, the second urging part 220 presses the X-axis friction engagement part 201 against the X-axis drive shaft 133. Accordingly, the X-axis drive shaft 133 is sandwiched between the second urging part 220 and the X-axis friction engagement part 201.

This causes the X-axis friction engagement part 201 to be frictionally engaged with an outer peripheral surface of the X-axis drive shaft 133 of the X-axis piezoelectric actuator 130. The X-axis piezoelectric element 132 expands and contracts in the X-axis direction while the X-axis friction engagement part 201 is frictionally engaged with the X-axis drive shaft 133 of the X-axis piezoelectric actuator 130, causing the X-axis movable element 200 to move in the X-axis direction.

Figure 4:
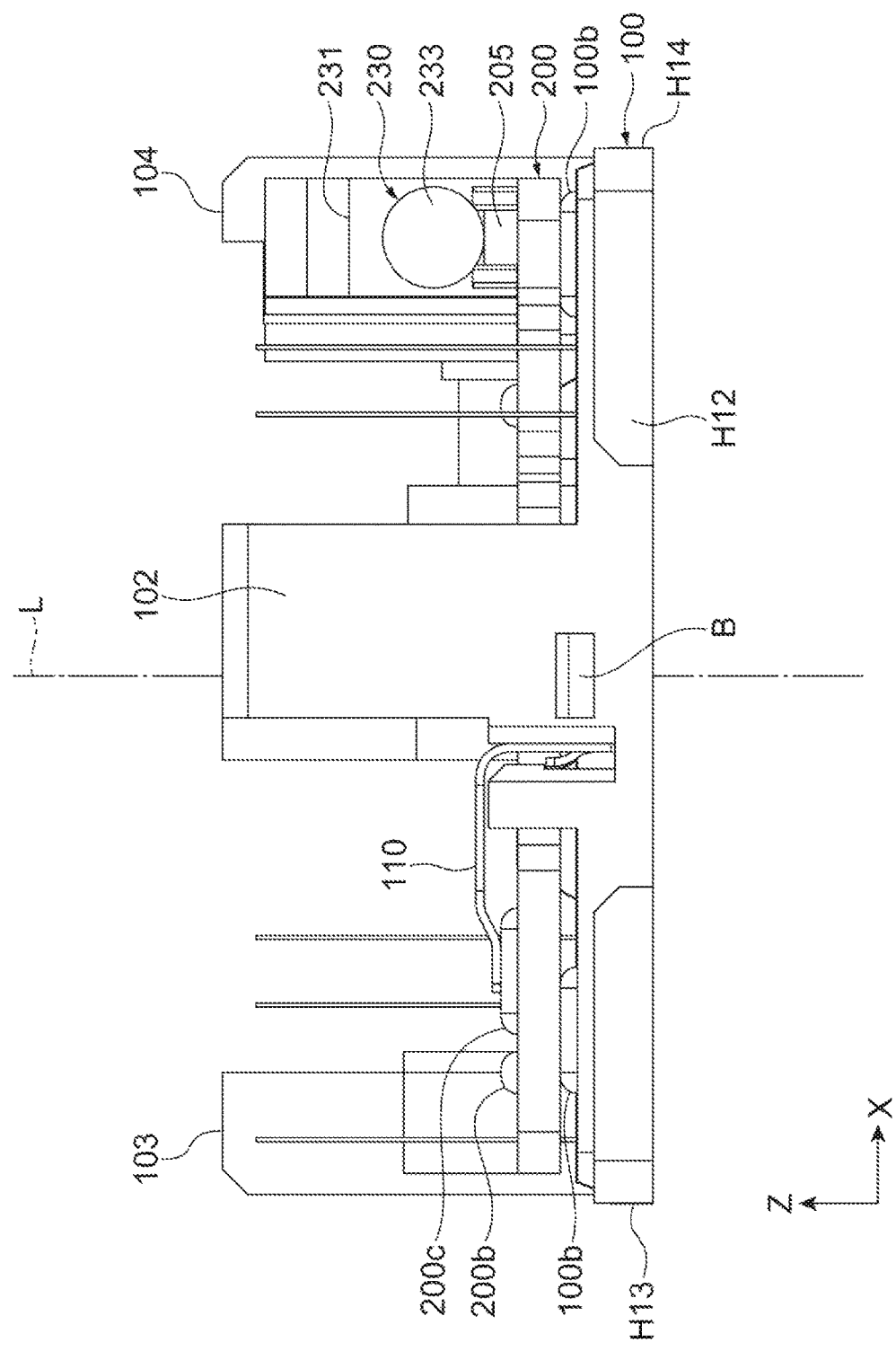
FIG. 4 is a side view of a state in which the base member and the X-axis movable element are combined, as viewed from a second column portion side.

Further, as shown in FIGS. 3 and 4, the base member 100 is provided with a first urging part (base-member-side urging part) 110 having a first end part fixed to a base of the second support column 102 rising from the base member 100, and a second end part abutting on a surface of the X-axis movable element 200, on the side stacked with the Y-axis movable element 300. The first urging part 110 has elasticity. The first urging part 110 urges the X-axis movable element 200 toward the base member 100 side by abutting on the X-axis movable element 200.

A projection 200*c* is provided at an abutting part of the X-axis movable element 200 with the first urging part 110. A top of the projection 200*c* has a substantially arcuate cross section along the Y-axis direction. The projection 200*c* extends in a band shape along the X-axis direction. Note that the projection 200*c* is not limited to extending in the band shape, but may be substantially hemispherical.

In addition, as shown in FIG. 4 and the like, a position of at least one of the plurality of projections 100*b* provided on the base member 100 substantially coincides with a position of the projection 200*c* provided on the X-axis movable element 200 in the direction of the optical axis L. Thus, when the X-axis movable element 200 is urged by the first urging part 110, an urging force of the first urging part 110 is received by the projection 100*b* that substantially coincides with a region where the first urging part 110 urges the X-axis movable element 200, in the direction of the optical axis L. This can inhibit tilting of the X-axis movable element 200 with respect to the base member 100.

The first urging part 110 mounted on the base member 100 is opposed to the second urging part 220 mounted on the X-axis movable element 200 with the optical axis L interposed in between, when viewed along the direction of the optical axis L.

In this way, as shown in FIG. 6, the X-axis drive shaft 133 of the X-axis piezoelectric actuator 130 fixed to the first support column 101 is sandwiched between the X-axis friction engagement part 201 and the second urging part 220, and the first urging part 110 urges the X-axis movable element 200, suppressing floating of the X-axis movable element 200 with respect to the base member 100.

Here, when a force in a direction to separate the X-axis movable element 200 from the base member 100 is applied to the X-axis movable element 200, deflecting of the second urging part 220 can suppress deformation of the X-axis piezoelectric actuator 130 (X-axis piezoelectric element 132).

As shown in FIG. 7, when viewed along the direction of the optical axis L, the second support column 102 is located in the escape portion 202 of the X-axis movable element 200. In order to illustrate around the escape portion 202, FIG. 7 shows a state in which the first urging part 110 is removed. An inner wall surface of the escape portion 202 and an end part of the second support column 102 in the X-axis direction are facing each other in the X-axis direction. The second support column 102 is formed such that the end part of the second support column 102 in the X-axis direction abuts on the inner wall surface of the escape portion 202, when the X-axis movable element 200 moves in the X-axis direction. Thus, the second support column 102 has a function of limiting the moving range of the X-axis movable element 200 moved by the X-axis piezoelectric actuator 130.

The second support column 102 may be provided with projections 102*a* and 102*b* protruding toward the opening 100*a* side. A line connecting a top of the projection 102*a* and a top portion of the projection 102*b* is along the X-axis direction. The second support column 102 may guide a movement of the X-axis movable element 200 along the X-axis direction by abutting the projections 102*a* and 102*b* to the inner wall surface of the escape portion 202 of the X-axis movable element 200. Thus, when the projections 102*a* and 102*b* are provided on the second support column 102, it is possible to suppress a rotation of the X-axis movable element 200 with an axis along the direction of the optical axis L (the axis parallel to the optical axis L) as the rotation axis.

Further, as shown in FIG. 7, when viewed along the direction of the optical axis L, the third support column 103 is located in the escape portion 203 of the X-axis movable element 200. Similarly, the fourth support column 104 is located in the escape portion 204 of the X-axis movable element 200. This makes it possible to suppress a rotation of the X-axis movable element 200 with the axis along the direction of the optical axis L (the axis parallel to the optical axis L) as the rotation axis, by the third support column 103 and the fourth support column 104. In the X-axis direction, between the third support column 103 and the escape portion 203, and between the fourth support column 104 and the escape portion 204, a predetermined clearance is provided so as not to obstruct a movement of the X-axis movable element 200 in the X-axis direction by the X-axis piezoelectric actuator 130.

Next, details of a configuration of the Y-axis movable element 300 and details of a supporting configuration of the Y-axis movable element 300 by the X-axis movable element 200 will be described. As shown in FIG. 2, the Y-axis movable element 300 is a substantially rectangular plate member having four corners when viewed along the direction of the optical axis L. The Y-axis movable element 300 is provided with a circular opening 300a centered on the optical axis L.

The Y-axis movable element 300 is provided with an escape portion 303 to avoid interference with the rising portions 207 and 208, when stacked on the X-axis movable element 200. The escape portion 303 has a shape in which an outer peripheral edge of the Y-axis movable element 300 is recessed toward inside (the opening 300a side).

Figure 9:
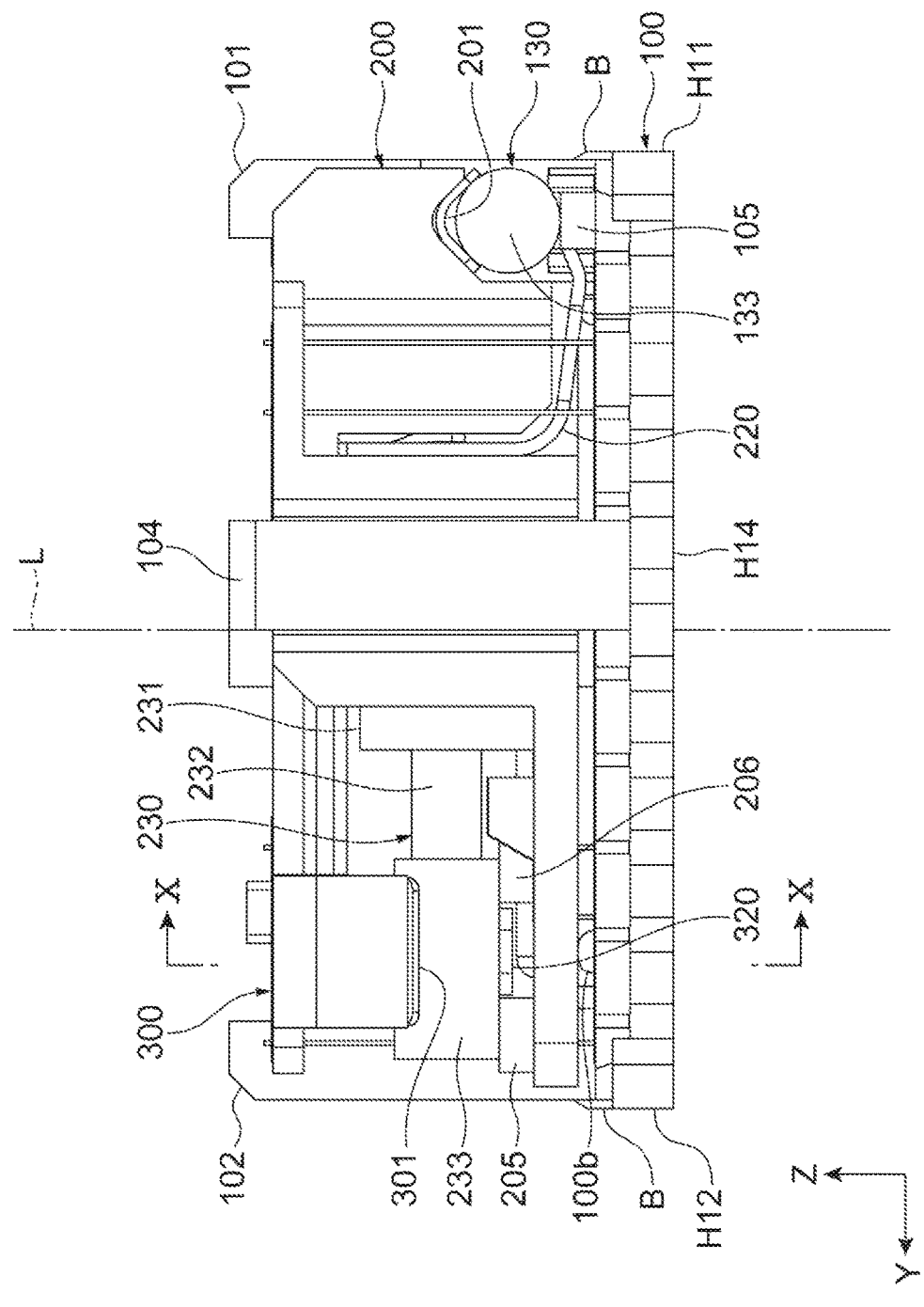
FIG. 9 is a side view of a state in which the base member, the X-axis movable element, and the Y-axis movable element are combined, as viewed from a fourth column portion side.
Figure 10:
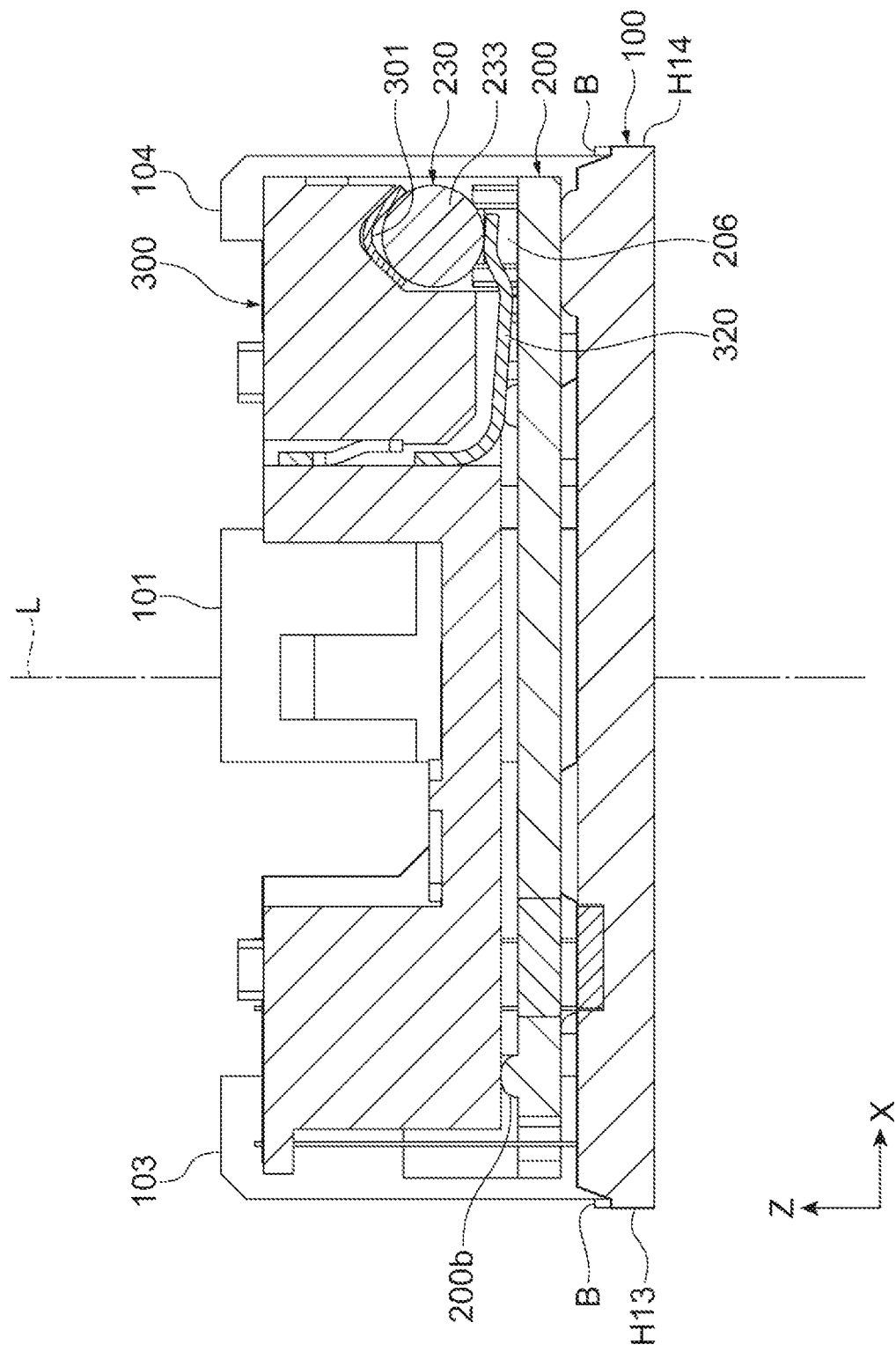
FIG. 10 is a cross-sectional view taken along line X-X of FIG. 9.

As shown in FIGS. 9 and 10, the Y-axis movable element 300 has a Y-axis friction engagement part 301 frictionally engaged with the Y-axis drive shaft 233 of the Y-axis piezoelectric actuator 230. In the Y-axis friction engagement part 301, a surface abutting on the Y-axis drive shaft 233 is V-shaped. Further, in the Y-axis friction engagement part 301, a V-shaped metal plate is provided at a portion abutting on the Y-axis drive shaft 233.

Figure 11:
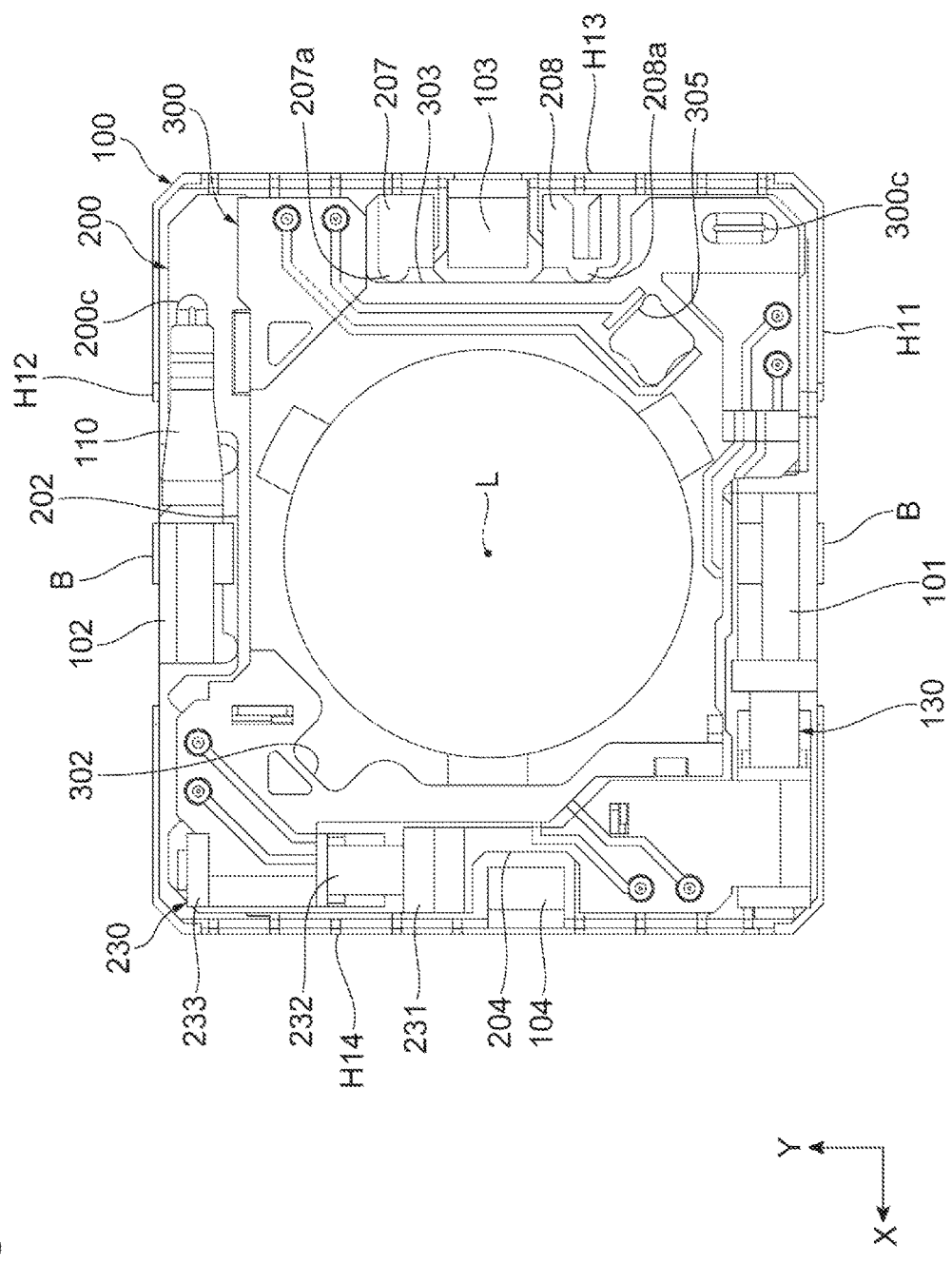
FIG. 11 is a plan view of a state in which the base member, the X-axis movable element, and the Y-axis movable element are combined, as viewed from the Y-axis movable element side.

Next, a state in which the Y-axis movable element 300 is stacked on the X-axis movable element 200 will be described. As shown in FIGS. 8 to 11, with the Y-axis movable element 300 stacked on the X-axis movable element 200, the projection 200b of the X-axis movable element 200 abuts on a surface on the X-axis movable element 200 side of the Y-axis movable element 300. As shown in FIG. 11, when viewed along the direction of the optical axis L, the rising portion 207, the rising portion 208, and the third support column 103 are fitted into the recessed escape portion 303. The Y-axis friction engagement part 301 abuts on a surface of the Y-axis drive shaft 233, on an opposite side to the X-axis movable element 200. That is, the Y-axis drive shaft 233 is located closer to the X-axis movable element 200 than the Y-axis friction engagement part 301. As described above, the Y-axis piezoelectric actuator 230 is located between the Y-axis movable element 300 (a portion provided with the Y-axis friction engagement part 301, in the Y-axis movable element 300) and the X-axis movable element 200.

Additionally, as shown in FIGS. 2, 9 and 10, the Y-axis movable element 300 is mounted with a fourth urging part 320 having a first end part fixed to the Y-axis movable element 300, and a second end part abutting on the Y-axis drive shaft 233 of the Y-axis piezoelectric actuator 230. The fourth urging part 320 has elasticity. The second end part of the fourth urging part 320 abuts on the Y-axis drive shaft 233, between the first projection 205 and the second projection 206. The fourth urging part 320 urges the Y-axis drive shaft 233 toward the Y-axis movable element 300 side, by abutting on the Y-axis drive shaft 233. That is, the fourth urging part 320 presses the Y-axis friction engagement part 301 against the Y-axis drive shaft 233. Accordingly, the Y-axis drive shaft 233 is sandwiched between the fourth urging part 320 and the Y-axis friction engagement part 301.

This causes the Y-axis friction engagement part 301 to be frictionally engaged with an outer peripheral surface of the Y-axis drive shaft 233 of the Y-axis piezoelectric actuator 230. The Y-axis piezoelectric element 232 expands and contracts in the Y-axis direction while the Y-axis friction engagement part 301 is frictionally engaged with the Y-axis drive shaft 233 of the Y-axis piezoelectric actuator 230, causing the Y-axis movable element 300 to move in the Y-axis direction.

Figure 8:
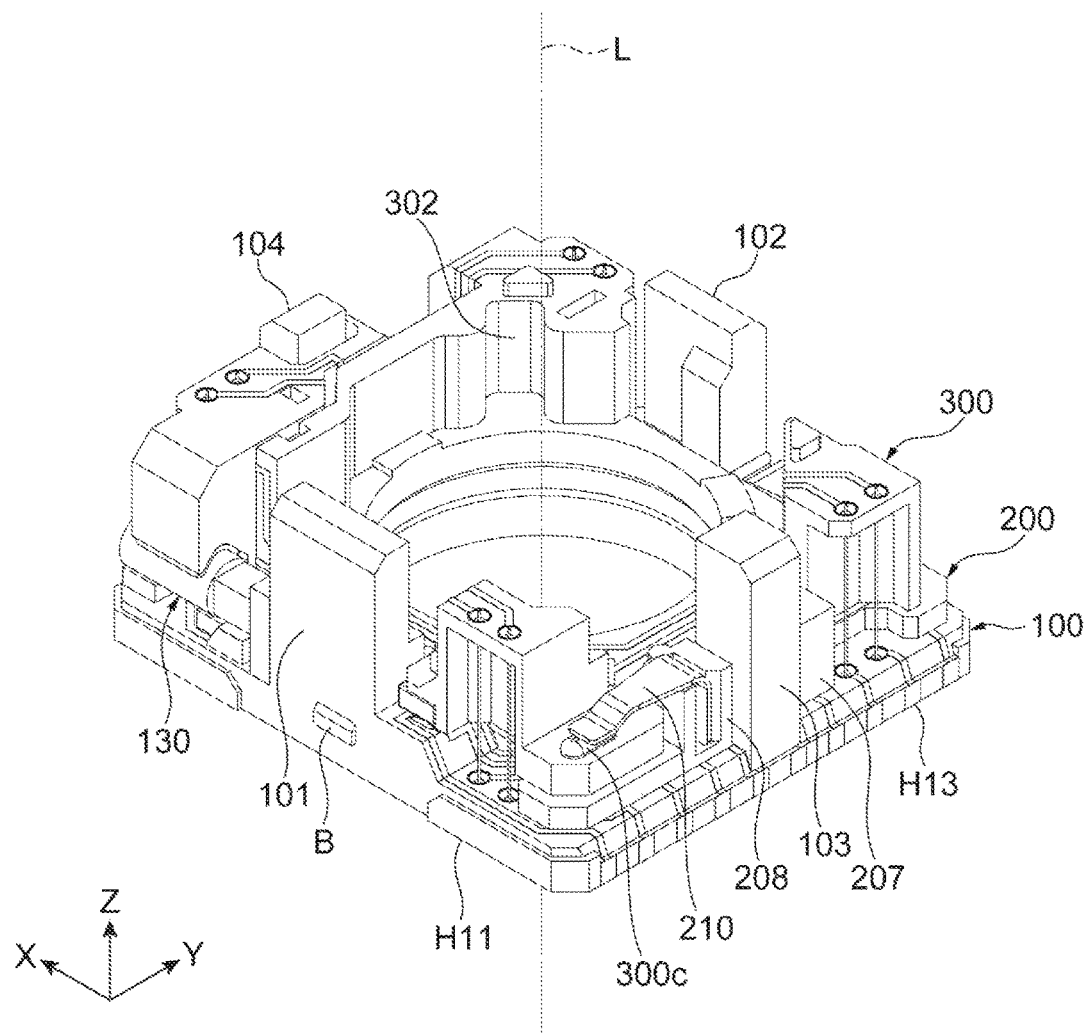
FIG. 8 is a perspective view showing a state in which the base member, the X-axis movable element, and a Y-axis movable element are combined.

Further, as shown in FIG. 8, the X-axis movable element 200 is provided with a third urging part 210 having a first end part fixed to the rising portion 208, and a second end part abutting on the surface of the Y-axis movable element 300, on a side stacked with the lens carrier 400. The third urging part 210 has elasticity. The third urging part 210 urges the Y-axis movable element 300 toward the X-axis movable element 200 side by abutting on the Y-axis movable element 300.

A projection 300c is provided at an abutting part of the Y-axis movable element 300 with the third urging part 210. A top of the projection 300c has a substantially arcuate cross section along the X-axis direction. The projection 300c extends in a band shape along the Y-axis direction. Note that the projection 300c is not limited to extending in the band shape, but may be substantially hemispherical.

In addition, as shown in FIGS. 3 and 8 and the like, a position of at least one of the plurality of projections 200b provided on the X-axis movable element 200 substantially coincides with a position of the projection 300c provided on the Y-axis movable element 300, in the direction of the optical axis L. Thus, when the Y-axis movable element 300 is urged by the third urging part 210, an urging force of the third urging part 210 is received by the projection 200b that substantially coincides with a region where the third urging part 210 urges the Y-axis movable element 300, in the direction of the optical axis L. This can inhibit tilting of the Y-axis movable element 300 with respect to the X-axis movable element 200.

The third urging part 210 mounted on the X-axis movable element 200 is opposed to the fourth urging part 320 mounted on the Y-axis movable element 300 with the optical axis L interposed in between, when viewed along the direction of the optical axis L.

Thus, the Y-axis drive shaft 233 of the Y-axis piezoelectric actuator 230 fixed to the X-axis movable element 200 is sandwiched between the Y-axis friction engagement part 301 and the fourth urging part 320, and the third urging part 210 urges the Y-axis movable element 300, suppressing floating of the Y-axis movable element 300 with respect to the X-axis movable element 200.

Here, when a force is applied to the Y-axis movable element 300 in a direction to separate from the X-axis movable element 200, deflecting of the fourth urging part 320 can suppress deformation of the Y-axis piezoelectric actuator 230 (Y-axis piezoelectric element 232).

As shown in FIG. 11, when viewed along the direction of the optical axis L, the rising portions 207 and 208 are located in the escape portion 303 of the Y-axis movable element 300. In order to illustrate around the escape portion 303, FIG. 11 shows a state in which the third urging part 210 is removed. An inner wall surface of the escape portion 303 faces the rising portions 207 and 208 in the Y-axis direction. The rising portions 207 and 208 are formed such that the rising portions 207 and 208 abut on the inner wall surface of the escape portion 303 when the Y-axis movable element 300 moves in the Y-axis direction. Thus, the rising portions 207 and 208 have a function of limiting the moving range of the Y-axis movable element 300 moved by the Y-axis piezoelectric actuator 230.

The rising portion 207 may be provided with a projection 207a protruding toward the opening 200a side. Similarly, the rising portion 208 may be provided with a projection 208a protruding toward the opening 200a side. A line connecting a top of the projection 207a and a top portion of the projection 208a is along the Y-axis direction. The rising portions 207 and 208 may guide a movement of the Y-axis movable element 300 along the Y-axis direction, by abutting the projections 207a and 208a to the inner wall surface of the escape portion 303 of the Y-axis movable element 300. Thus, when the projections 207a and 208a are provided on the rising portions 207 and 208 configured to limit the moving range of the Y-axis movable element 300, it is possible to suppress a rotation of the Y-axis movable element 300 with the axis (parallel axis) along the direction of the optical axis L as a rotation axis.

Next, details of a configuration of the lens carrier 400 and details of a supporting configuration of the lens carrier 400 by the Y-axis movable element 300 will be described. As shown in FIG. 2, the lens driving part 2 further includes a Z-axis piezoelectric actuator 330 configured to move the lens carrier 400. The Z-axis piezoelectric actuator 330 is an actuator constituting the smooth impact drive mechanism. The Z-axis piezoelectric actuator 330 has a piezoelectric element, and moves the lens carrier 400 in the direction of the optical axis L by expanding and contracting the piezoelectric element. In detail, the Z-axis piezoelectric actuator 330 includes a weight part 331, a Z-axis piezoelectric element 332, and a Z-axis drive shaft 333.

The Z-axis piezoelectric element 332 is an element capable of expanding and contracting in the direction of the optical axis L. The Z-axis piezoelectric element 332 is made of a piezoelectric material. The Z-axis drive shaft 333 is formed in a columnar shape, and arranged such that an axis of the column extends along the direction of the optical axis L. The Z-axis drive shaft 333 is fixed to a first end part of the Z-axis piezoelectric element 332 in the expansion/contraction direction. The weight part 331 is fixed to a second end part of the Z-axis piezoelectric element 332 in the expansion/contraction direction.

A first end part (an end part on the weight part 331 side) of the Z-axis piezoelectric actuator 330 is fitted and fixed in a concave mounting part 305 (see FIG. 11) provided on the Y-axis movable element 300. The Z-axis piezoelectric actuator 330 extends from a part fixed with the Y-axis movable element 300 along the direction of the optical axis L. A second end part (an end part on the Z-axis drive shaft 333 side) of the Z-axis piezoelectric actuator 330 is engaged with the lens carrier 400 to move the lens carrier 400 in the direction of the optical axis L.

Figure 12:
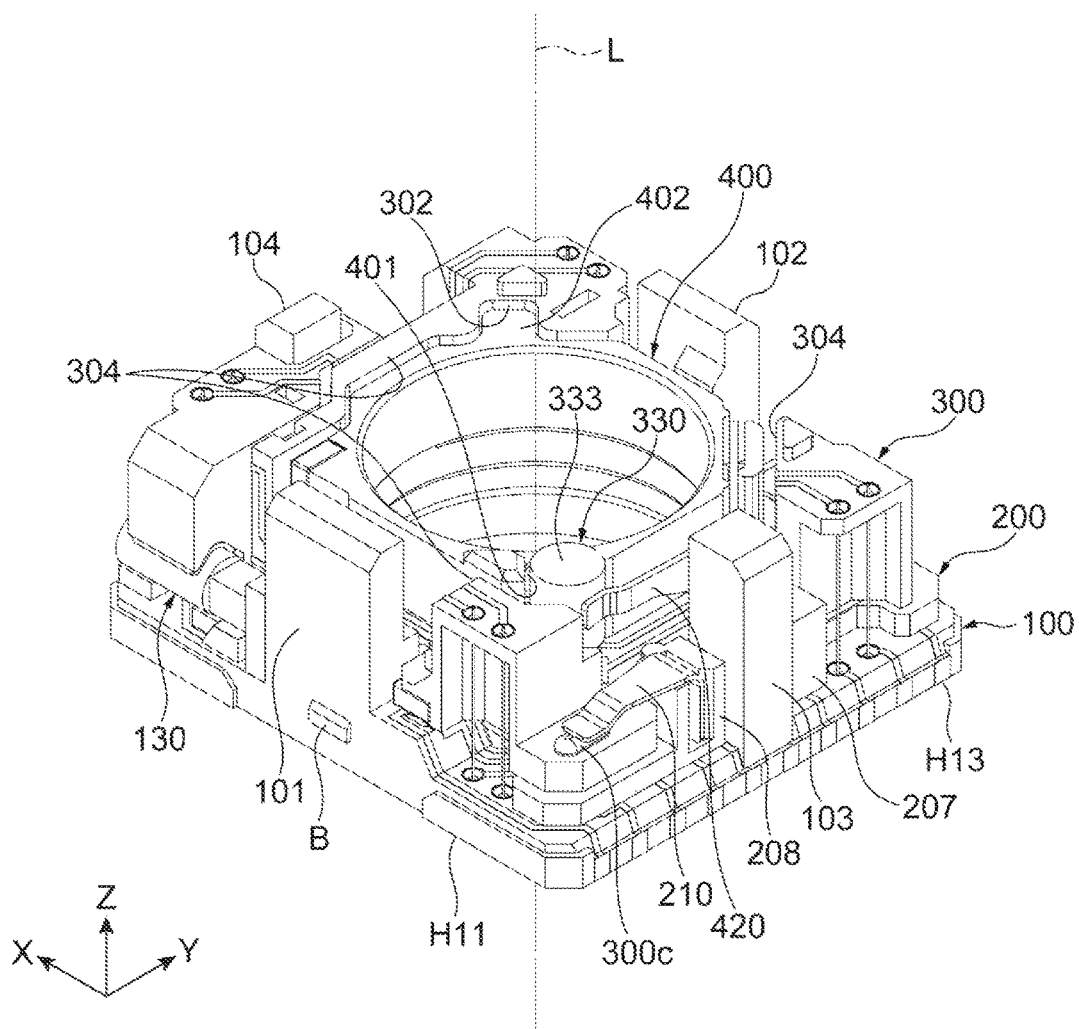
FIG. 12 is a perspective view showing a state in which the base member, the X-axis movable element, the Y-axis movable element, and the lens carrier are combined.

The lens carrier 400 is provided with a circular opening 400a centered on the optical axis L. On the opening 400a of the lens carrier 400, the lens 4 is mounted. That is, the lens carrier 400 can hold the lens 4. The lens 4 may be a lens unit formed by a plurality of lenses, or may be a single lens. As shown in FIGS. 2 and 12, the lens carrier 400 is arranged to be surrounded by a side wall portion 304 rising toward the lens carrier 400 side in the Y-axis movable element 300. The lens carrier 400 has a rotation-stopping projection 402. The rotation-stopping projection 402 is fitted into a cutout portion 302 provided on the side wall portion 304 of the Y-axis movable element 300. Fitting the rotation-stopping projection 402 into the cutout portion 302 suppresses the rotation of the lens carrier 400 with the optical axis L as a rotation axis.

Figure 13:
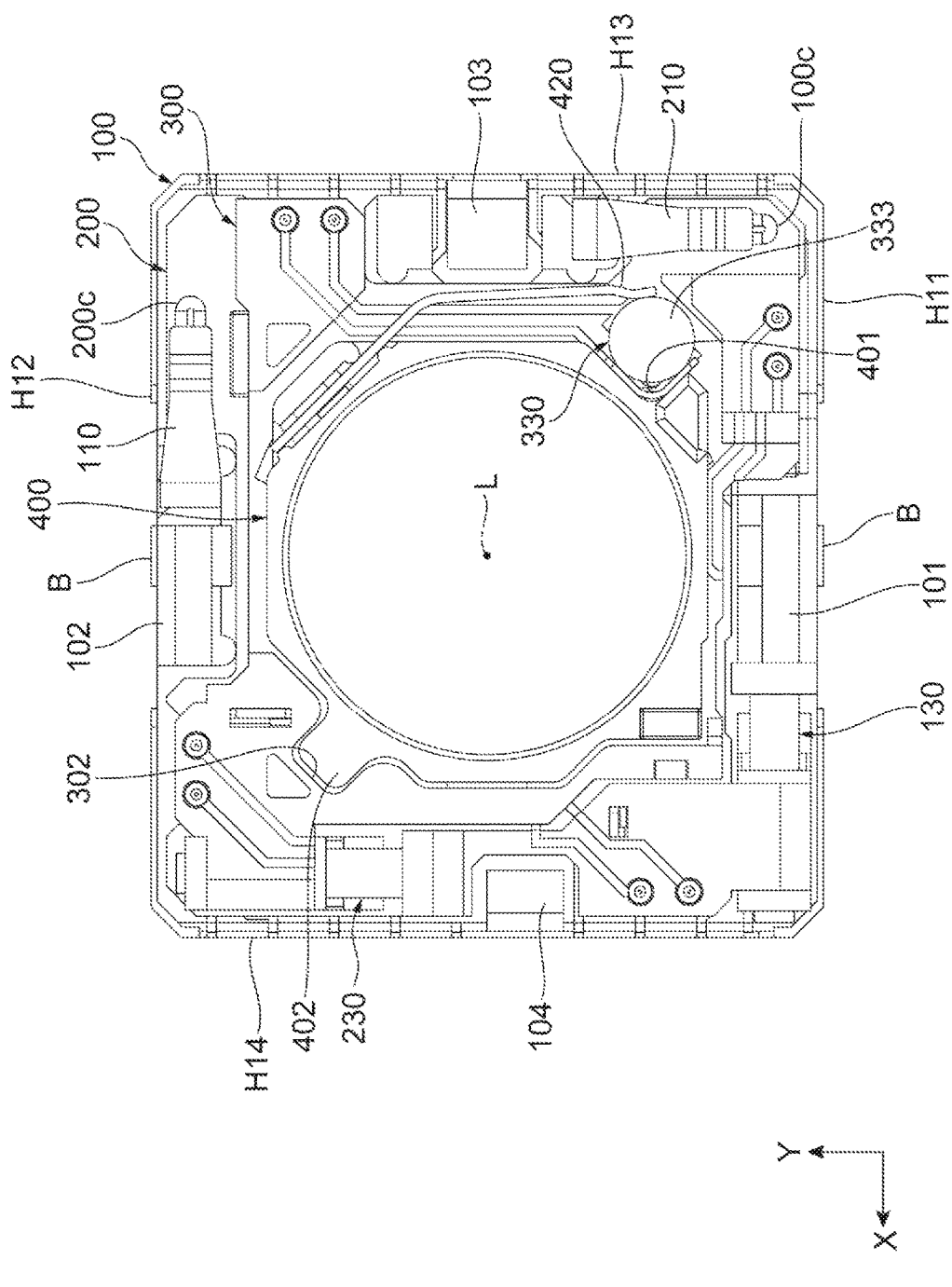
FIG. 13 is a plan view of a state in which the base member, the X-axis movable element, the Y-axis movable element, and the lens carrier are combined, as viewed from the lens carrier side.

As shown in FIGS. 12 and 13, the lens carrier 400 has a Z-axis friction engagement part 401 frictionally engaged with the Z-axis drive shaft 333 of the Z-axis piezoelectric actuator 330. In the Z-axis friction engagement part 401, a surface abutting on the Z-axis drive shaft 333 is V-shaped. Further, in the Z-axis friction engagement part 401, a V-shaped metal plate is provided at a portion abutting on the Z-axis drive shaft 333.

On an outer peripheral surface of the lens carrier 400, a retaining member 420 is mounted. The retaining member 420 has elasticity. A first end part of the retaining member 420 is fixed to the lens carrier 400, and a second end part abuts on the Z-axis drive shaft 333. The retaining member 420 urges the Z-axis drive shaft 333 toward the Z-axis friction engagement part 401 side. That is, the retaining member 420 presses the Z-axis friction engagement part 401 against the Z-axis drive shaft 333. Accordingly, the Z-axis drive shaft 333 is sandwiched between the retaining member 420 and the Z-axis friction engagement part 401.

This causes the Z-axis friction engagement part 401 to be frictionally engaged with an outer peripheral surface of the Z-axis drive shaft 333 of the Z-axis piezoelectric actuator 330. The Z-axis piezoelectric element 332 expands and contracts in the direction of the optical axis L while the Z-axis friction engagement part 401 is frictionally engaged with the Z-axis drive shaft 333 of the Z-axis piezoelectric actuator 330, causing the lens carrier 400 to move in the Z-axis direction.

Figure 14:
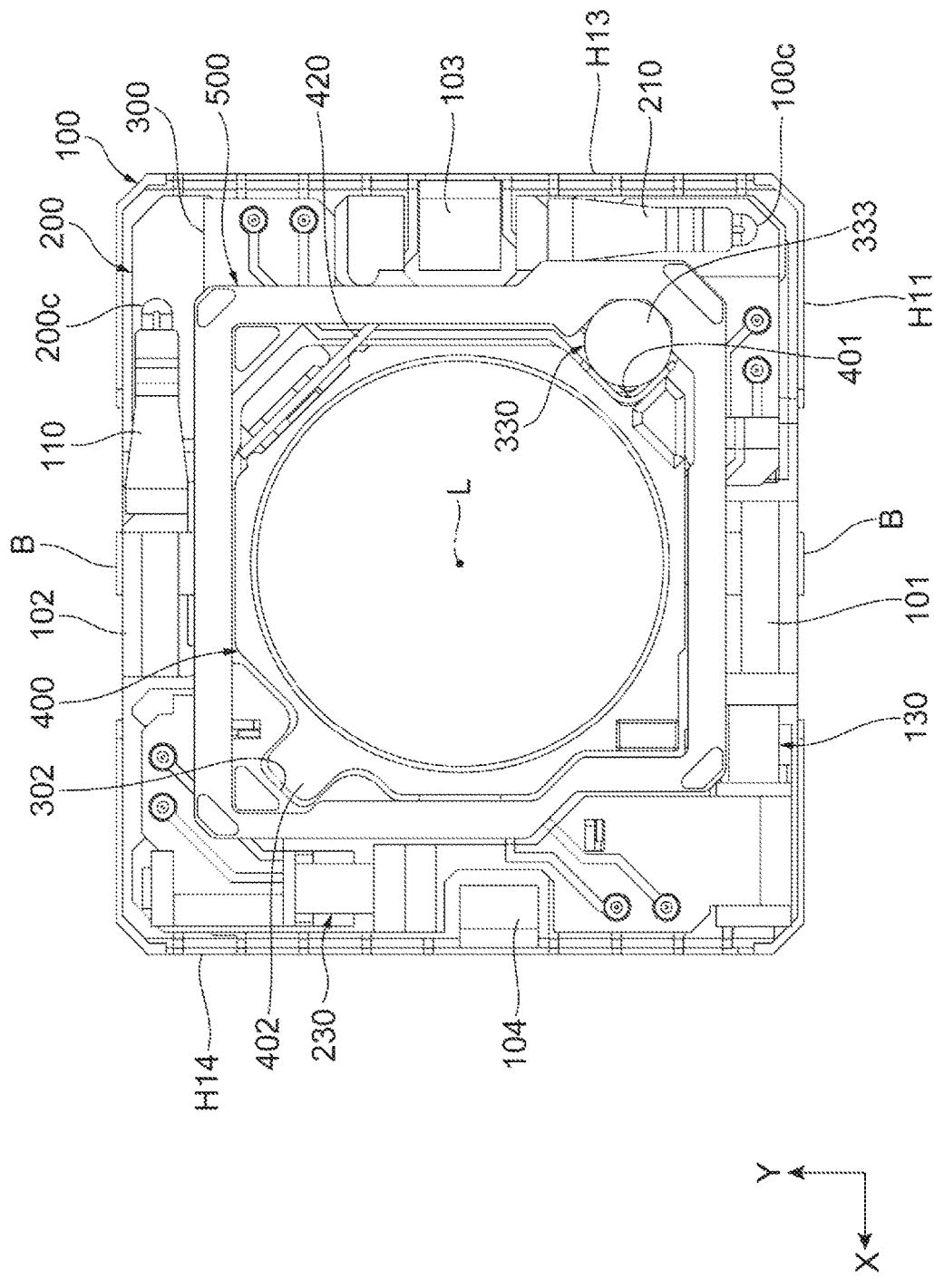
FIG. 14 is a plan view of a state in which the base member, the X-axis movable element, the Y-axis movable element, the lens carrier, and a holding frame are combined, as viewed from the holding frame side.

As shown in FIGS. 2 and 14, the holding frame 500 has a substantially rectangular frame shape surrounding the lens carrier 400, when viewed along the direction of the optical axis L. The holding frame 500 is mounted on a tip end part of the side wall portion 304 of the Y-axis movable element 300. An inner peripheral surface of a corner of the holding frame 500 abuts on the Z-axis drive shaft 333 of the Z-axis piezoelectric actuator 330. This causes the holding frame 500 to support an end part on the Z-axis drive shaft 333 side of the Z-axis piezoelectric actuator 330. Therefore, even when an external impact is applied, tilt of the Z-axis piezoelectric actuator 330 with respect to the Y-axis movable element 300 is suppressed.

Figure 15:
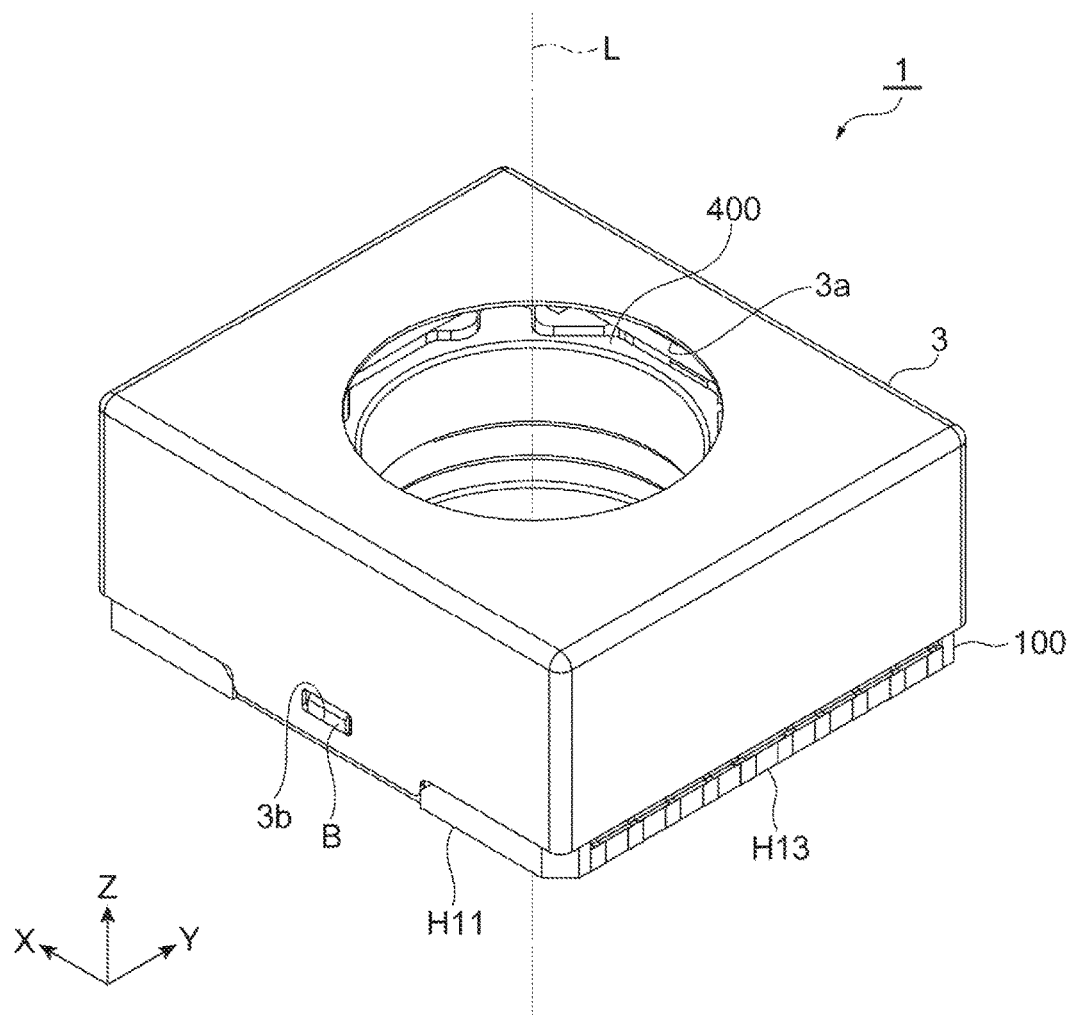
FIG. 15 is a perspective view showing the lens driving device in a state in which a case is mounted on the lens driving part.
Figure 16:
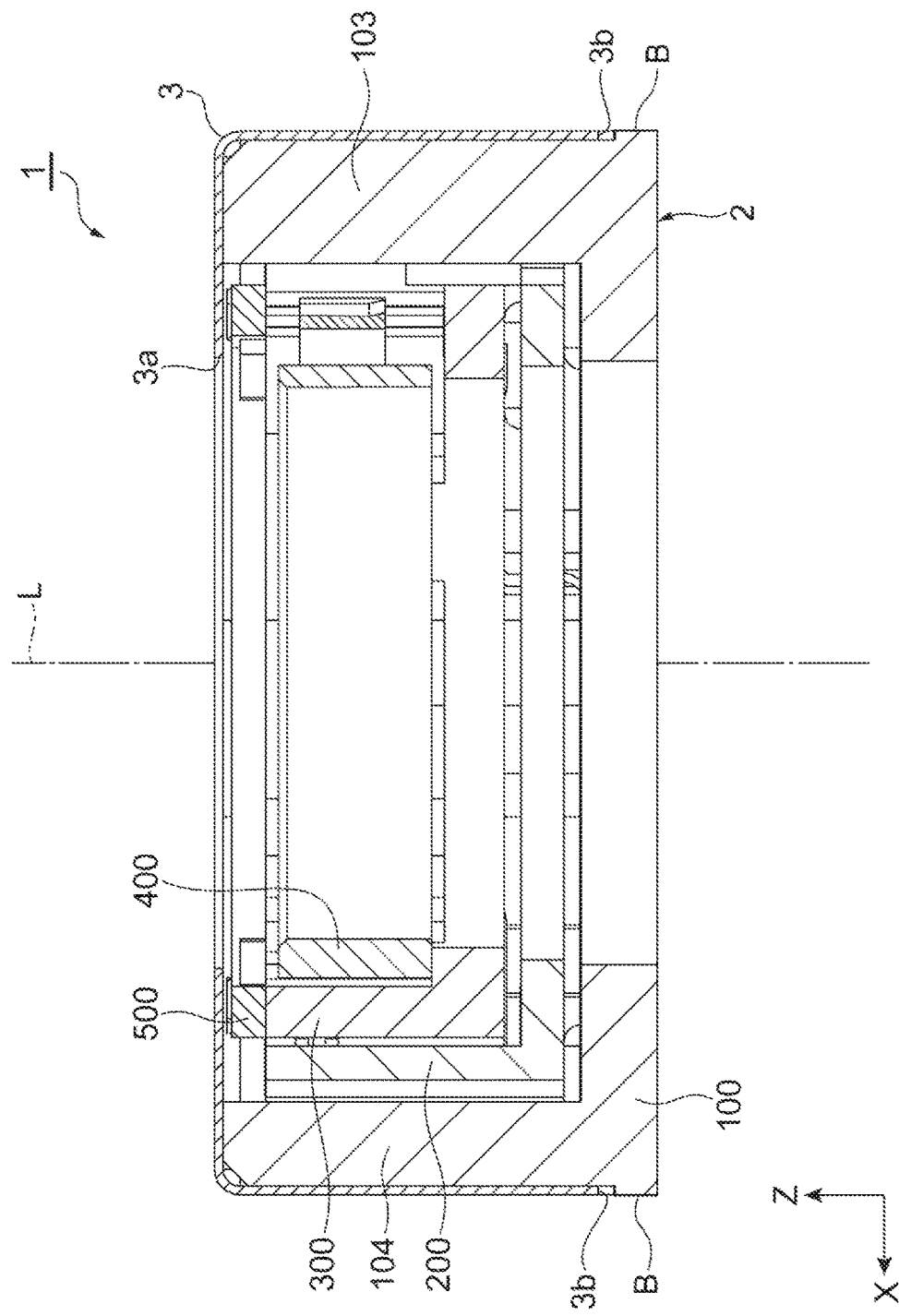
FIG. 16 is a cross-sectional view showing a state in which the lens driving device is cut along an X-axis direction.

Next, a configuration for mounting the case 3 to the lens driving part 2 will be described. As shown in FIGS. 15 and 16, the case 3 covers the base member 100 so as to accommodate components inside other than the base member 100, among the components constituting the lens driving part 2. As shown in FIGS. 1, 6, and the like, an engagement projection B is provided on each outer side surface of the first support column 101 and the second support column 102. The case 3 is provided with an engagement hole 3b at a position corresponding to the engagement projection B when covering the base member 100. Each engagement projection B of the first support column 101 and the second support column 102 is fitted into the engagement hole 3b of the case 3, causing the case 3 to be engaged with the engagement projection B. This allows the case 3 to be fixed to the lens driving part 2.

Further, as shown in FIG. 16, with the engagement projection B fitted into the engagement hole 3b, the inner surface of the case 3 abuts on a surface facing outward from the lens driving part 2, of the third support column 103 and a tip end part of the third support column 103, and on a surface facing outward from the lens driving part 2, of the fourth support column 104 and a tip end part of the fourth support column 104. Similarly, the inner surface of the case 3 abuts on a surface facing outward from the lens driving part 2, of the first support column 101 and a tip end part of the first support column 101, and on a surface facing outward from the lens driving part 2, of the second support column 102 and a tip end part of the second support column 102. Thus, the first support column 101 to the fourth support column 104 support the case 3 from inside the case 3.

That is, since the tip end parts of the first support column 101 to the fourth support column 104 abut on the inner surface of the case 3, it is possible to suppress deformation of the case 3 in the direction of the optical axis L (deformation in a direction of the case 3 approaching the base member 100). Further, the surfaces facing outward, of the first support column 101 to the fourth support column 104, abut on the inner surface of the case 3, which enables suppression of the deformation of the case 3 in the X-axis direction and the Y-axis direction.

The first embodiment is configured as described above. In this lens driving device 1, the X-axis movable element 200 is urged toward the base member 100 side by the first urging part 110. This suppresses floating of the X-axis movable element 200 from the base member 100, and rattling of the X-axis movable element 200 with respect to the base member 100. Similarly, the Y-axis movable element 300 is urged toward the X-axis movable element 200 side by the third urging part 210. This suppresses rattling of the Y-axis movable element 300 with respect to the X-axis movable element 200.

The second urging part 220 urges the X-axis piezoelectric actuator 130 toward the X-axis movable element 200 side. That is, the X-axis drive shaft 133 of the X-axis piezoelectric actuator 130 is sandwiched between the X-axis friction engagement part 201 of the X-axis movable element 200 and the second urging part 220. Since the X-axis piezoelectric actuator 130 is fixed to the first support column 101 provided on the base member 100, rattling of the X-axis movable element 200 with respect to the base member 100 is suppressed. Similarly, the fourth urging part 320 urges the Y-axis piezoelectric actuator 230 toward the Y-axis movable element 300 side. That is, the Y-axis drive shaft 233 of the Y-axis piezoelectric actuator 230 is sandwiched between the Y-axis friction engagement part 301 of the Y-axis movable element 300 and the fourth urging part 320. Since the Y-axis piezoelectric actuator 230 is fixed to the X-axis movable element 200, rattling of the Y-axis movable element 300 with respect to the X-axis movable element 200 is suppressed.

Thus, having the first urging part 110, the second urging part 220, the third urging part 210, and the fourth urging part 320 causes suppression of floating of the X-axis movable element 200 and the Y-axis movable element 300 from the base member 100, enabling stable movement of the X-axis movable element 200 and the Y-axis movable element 300.

The first urging part 110 is opposed to the second urging part 220 with the optical axis L in between, and the third urging part 210 is opposed to the fourth urging part 320 with the optical axis L in between. In this case, the first urging part 110 and the second urging part 220 can hold the X-axis movable element 200 at a position with the center of gravity of the lens 4 interposed in between. Similarly, the third urging part 210 and the fourth urging part 320 can hold the Y-axis movable element 300 at a position with the center of gravity of the lens 4 interposed in between. Arranging the first urging part 110, the second urging part 220, the third urging part 210, and the fourth urging part 320 in this way allows the lens driving device 1 to further stably move the X-axis movable element 200 and the Y-axis movable element 300.

The X-axis drive shaft 133 of the X-axis piezoelectric actuator 130 is sandwiched between the second urging part 220 and the X-axis friction engagement part 201, and frictionally engaged with the second urging part 220 and the X-axis friction engagement part 201. This allows the X-axis piezoelectric actuator 130 to move the X-axis movable element 200 frictionally engaged with the X-axis drive shaft 133, in an expansion/contraction direction of the X-axis piezoelectric element 132, by expanding and contracting the X-axis piezoelectric element 132. Similarly, the Y-axis drive shaft 233 of the Y-axis piezoelectric actuator 230 is sandwiched between the fourth urging part 320 and the Y-axis friction engagement part 301, and frictionally engaged with the fourth urging part 320 and the Y-axis friction engagement part 301. This allows the Y-axis piezoelectric actuator 230 to move the Y-axis movable element 300 frictionally engaged with the Y-axis drive shaft 233, in an expansion/contraction direction of the Y-axis piezoelectric element 232, by expanding and contracting the Y-axis piezoelectric element 232.

Although the first embodiment of the present disclosure has been described above, the present disclosure is not limited to the above embodiment. For example, the first urging part 110 is not necessarily opposed to the second urging part 220 with the optical axis L in between. Similarly, the third urging part 210 is not necessarily opposed to the fourth urging part 320 with the optical axis L in between.

Further, the lens driving part 2 is not limited to holding the X-axis movable element 200 and the Y-axis movable element 300 on the base member 100 by using the first urging part 110, the second urging part 220, the third urging part 210, and the fourth urging part 320. For example, the lens driving part 2 may hold the X-axis movable element 200 alone on the base member 100 by using the first urging part 110 and the second urging part 220.

Second Embodiment

Figure 17:
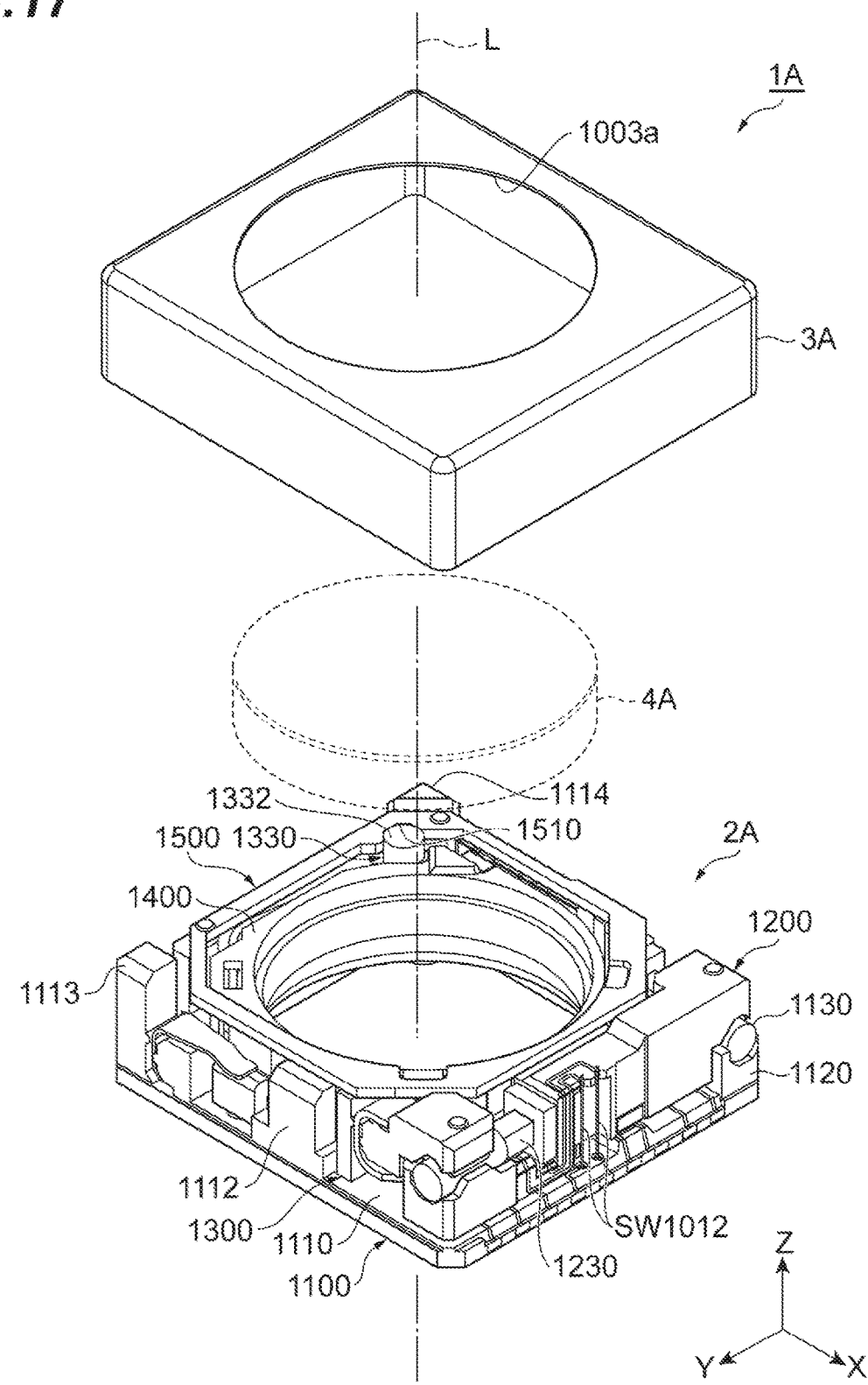
FIG. 17 is an exploded perspective view showing a schematic configuration of a lens driving device according to a second embodiment.

Next, a second embodiment will be described. A lens driving device 1A shown in FIG. 17 is mounted on an imaging apparatus such as a digital camera, for example, and drives a lens 4A. The lens driving device 1A includes a lens driving part 2A and a case 3A. The lens driving device 1A has an optical axis L of the lens 4A to be mounted on the lens driving part 2A.

For convenience of description, each figure shows an XYZ orthogonal coordinate system. The Z-axis direction is a direction of the optical axis L of the lens 4A to be mounted. The X-axis direction is orthogonal to the direction of the optical axis L. The Y-axis direction is orthogonal to the direction of the optical axis L and orthogonal to the X-axis direction.

The lens driving part 2A includes, as shown in FIG. 17, a base member 1100, an auxiliary element 1200, a movable element 1300, a lens carrier 1400, an X-axis actuator 1130, a Y-axis actuator (piezoelectric actuator) 1230, and a Z-axis actuator 1330. The lens driving part 2A also includes a frame member 1500 arranged so as to surround the lens carrier 1400.

On one surface of the base member 1100, individual members including the auxiliary element 1200 are disposed. On the lens carrier 1400, the lens 4A is mounted. The lens carrier 1400 is moved in the X-axis direction and the Y-axis direction with respect to the base member 1100, by operation of the X-axis actuator 1130 and the Y-axis actuator 1230. The lens carrier 1400 is moved in the Z-axis direction with respect to the base member 1100, by operation of the Z-axis actuator 1330.

Figure 18:
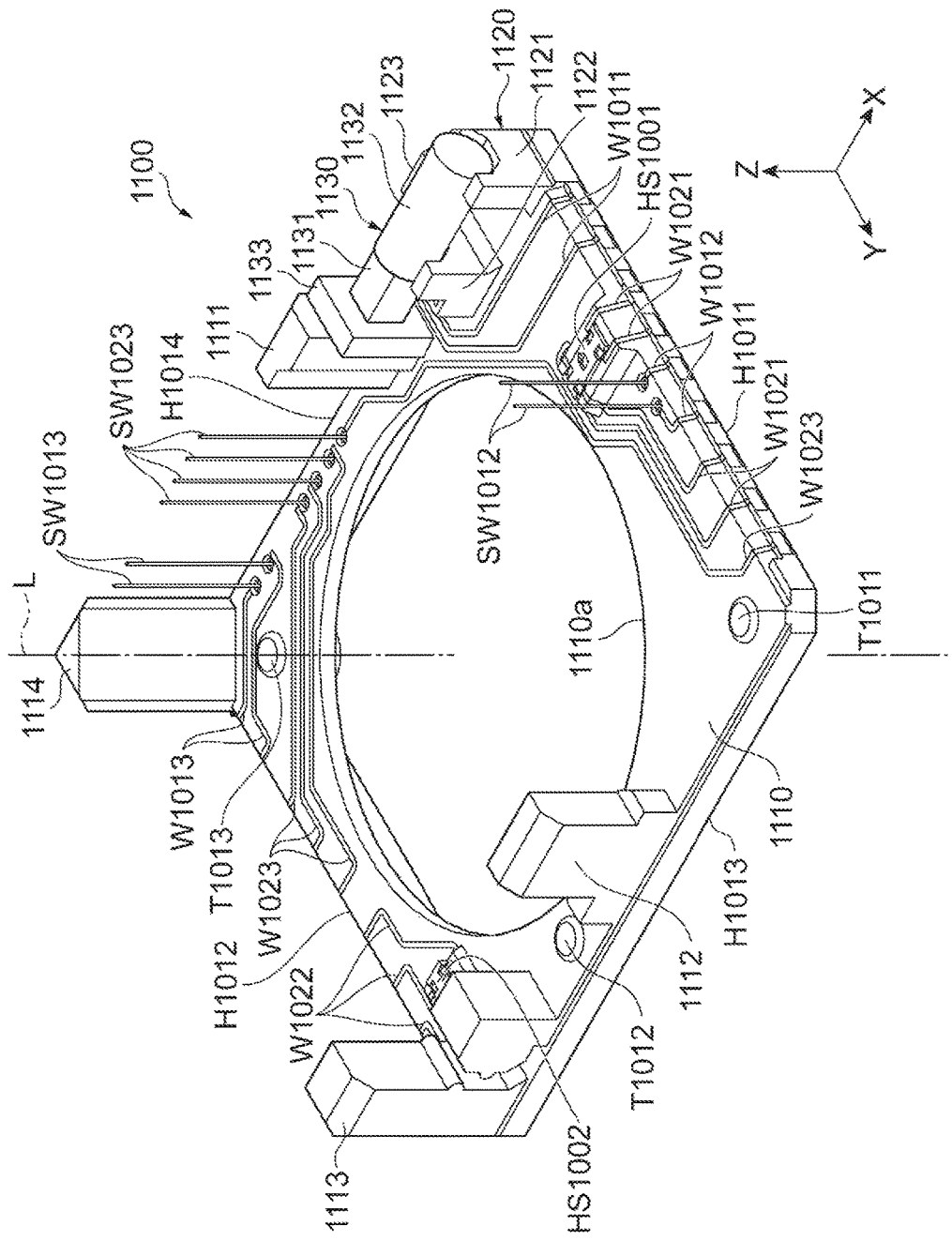
FIG. 18 is a perspective view showing a base member of FIG. 17.
Figure 19:
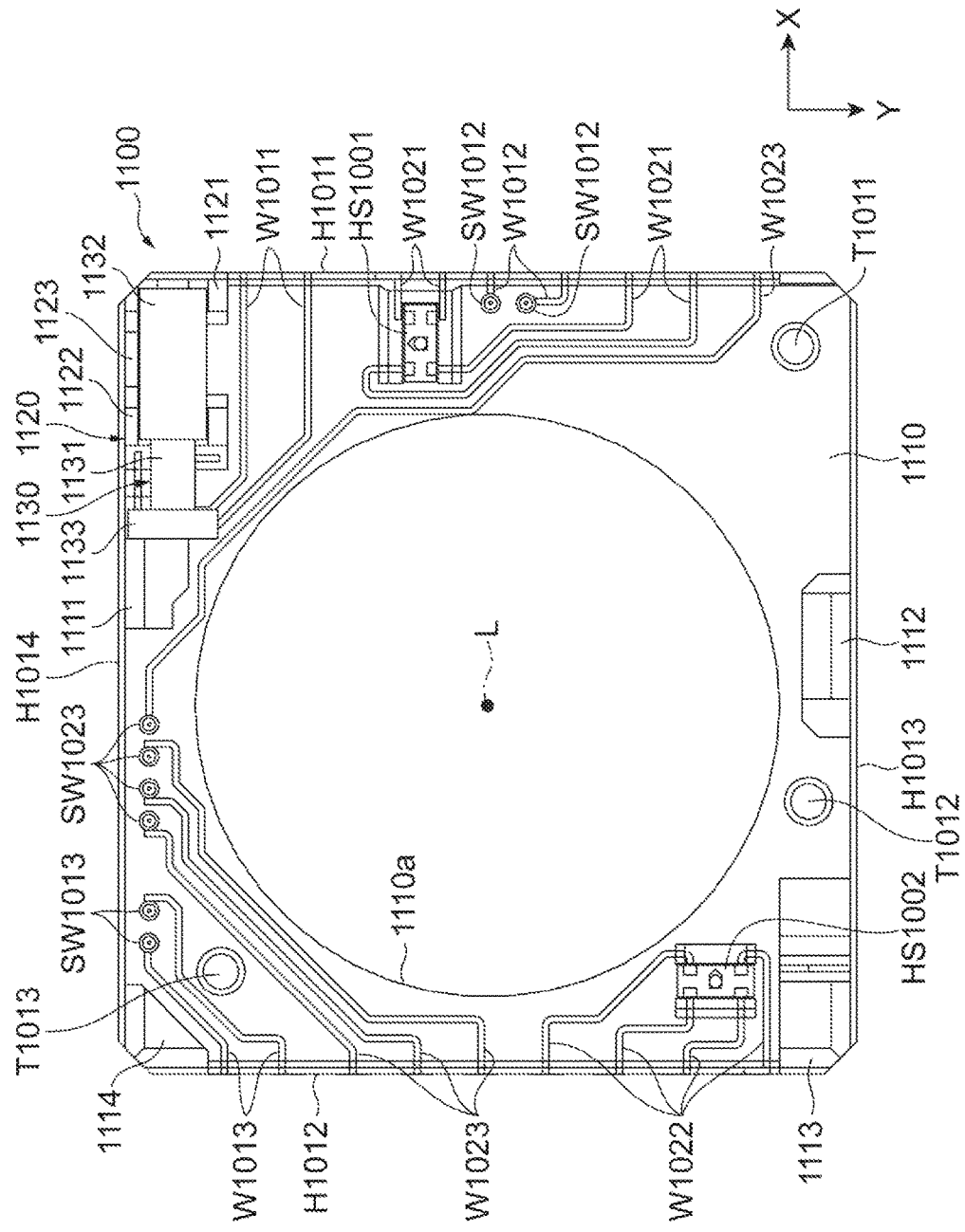
FIG. 19 is a top view showing the base member of FIG. 17.

First, details around the base member 1100 will be described. As shown in FIGS. 18 and 19, the base member 1100 includes a base main body 1110, an actuator mounting part 1111, a stopper part 1112, a first strut part 1113, a second strut part 1114, and an X-axis actuator support part 1120.

The base main body 1110 is formed in a substantially rectangular plate shape having four corners when viewed along the direction of the optical axis L. For convenience of description, individual four edges constituting an outer peripheral edge of the base main body 1110 when viewed along the direction of the optical axis L are referred to as an edge 111011, an edge H1012, an edge H1013, and an edge 141014. The edge H1011 and the edge H1012 are parallel and extend along the Y-axis direction. The edge H1013 and the edge H1014 are parallel and extend along the X-axis direction. When the base main body 1110 is viewed along the direction of the optical axis L, individual edges are connected in the order of the edge H1011, the edge H1014, the edge H1012, and the edge H1013 to form the outer peripheral edge. A length of the edge H1011 and the edge H1012 is shorter than a length of the edge H1013 and the edge H1014.

The base main body 1110 is provided with a circular opening 1110a centered on the optical axis L (through which the optical axis L passes). When viewed along the direction of the optical axis L, a center position of the opening 1110a (optical axis L) is eccentric to a center position of the base main body 1110 having a substantially rectangular plate shape. Specifically, when viewed along the direction of the optical axis L, the opening 1110a is provided at a position closer to the edge 111012 side than the edge H1011.

Figure 20:
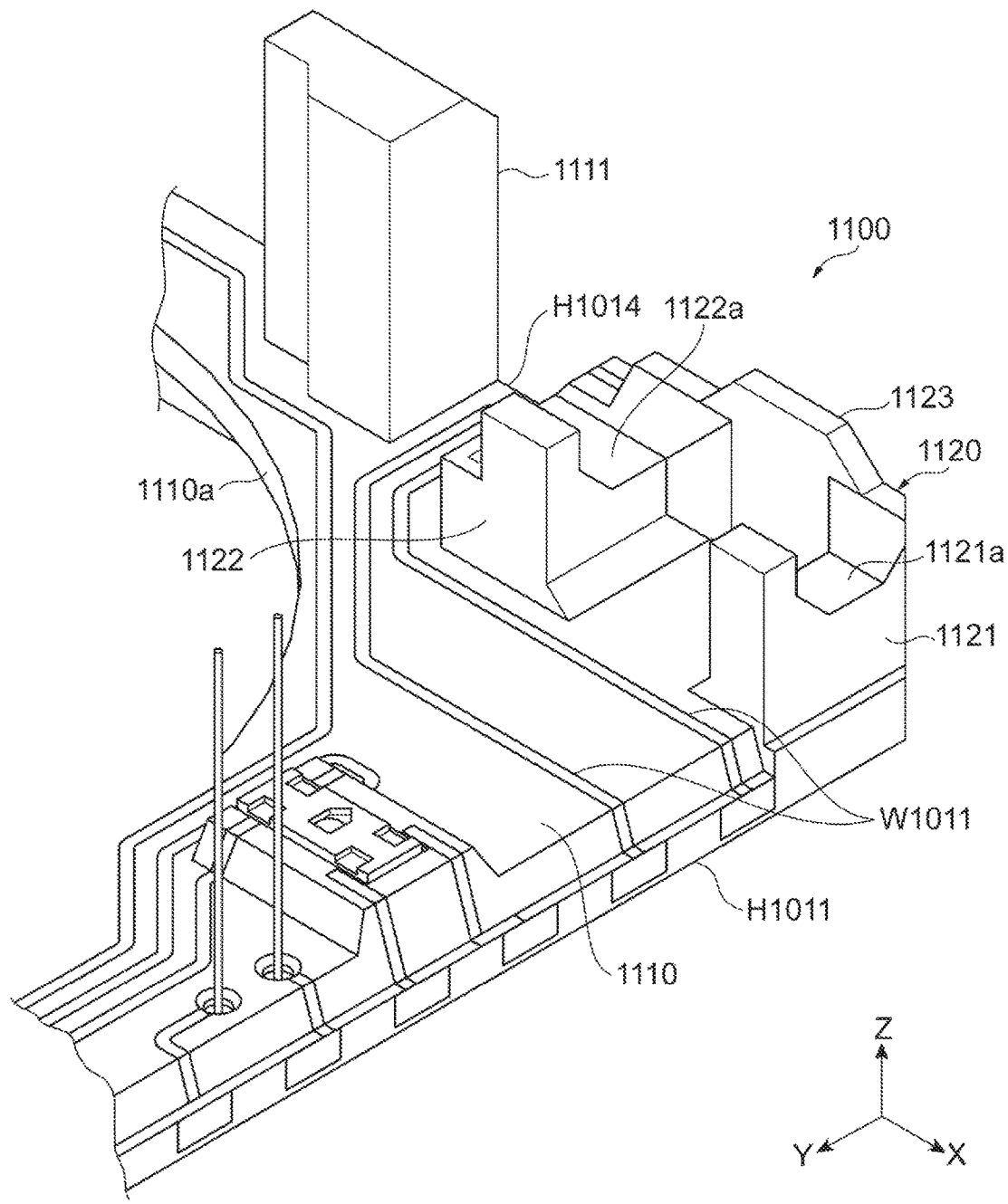
FIG. 20 is an enlarged perspective view showing around an X-axis actuator support part of FIG. 18.

The X-axis actuator support part 1120 is provided on the base main body 1110, on a surface on a side disposed with the auxiliary element 1200. The X-axis actuator support part 1120 is provided near a corner where the edge H1011 and the edge H1014 are connected, on the surface of the base main body 1110. The X-axis actuator support part 1120 supports the X-axis actuator 1130 (X-axis drive shaft 1132) from the base main body 1110 side. As shown in FIG. 20, the X-axis actuator support part 1120 includes a first support part 1121, a second support part 1122, and a wall portion 1123. In FIG. 20, the X-axis actuator 1130 is omitted in order to describe details of the X-axis actuator support part 1120.

The first support part 1121 and the second support part 1122 are arranged side by side in the X-axis direction. The first support part 1121 is located on the edge H1011 side from the second support part 1122. Between the first support part 1121 and the second support part 1122, a predetermined clearance is provided. At the top of each of the first support part 1121 and the second support part 1122, there are respectively provided grooves 1121a and 1122a having a substantially U-shaped cross section and extending along the X-axis direction. Between the first support part 1121 and the second support part 1122, the wall portion 1123 is provided. The wall portion 1123 connects end parts on the edge H1104 side of the first support part 1121 and the second support part 1122 to each other. The base main body 1110 and the X-axis actuator support part 1120 are integrally provided.

As shown in FIGS. 18 and 19, The X-axis actuator 1130 is provided on the base main body 1110, on the surface on the side disposed with the auxiliary element 1200. The X-axis actuator 1130 is provided near a corner where the edge H1011 and the edge H1014 are connected on the base main body 1110. The X-axis actuator 1130 is an actuator constituting a smooth impact drive mechanism. The X-axis actuator 1130 includes a prismatic X-axis piezoelectric element 1131, the X-axis drive shaft 1132, and a weight part 1133.

The X-axis piezoelectric element 1131 is an element capable of expanding and contracting in the X-axis direction. The X-axis piezoelectric element 1131 is made of a piezoelectric material. As a piezoelectric material, there can be used an inorganic piezoelectric material such as lead zirconate titanate (so-called, PZT), quartz, lithium niobate ($LiNbO_3$), potassium niobate tantalate ($K(Ta, Nb)O_3$), barium titanate ($BaTiO_3$), lithium tantalate ($LiTaO_3$), strontium titanate ($SrTiO_3$), and the like.

The X-axis piezoelectric element 1131 may have a laminated structure in which a plurality of piezoelectric layers made of the above piezoelectric material and a plurality of electrode layers are alternately laminated. Controlling a voltage applied to the X-axis piezoelectric element 1131 allows control of expansion and contraction of the X-axis piezoelectric element 1131. The shape of the X-axis piezoelectric element 1131 is not limited to prismatic, but may be cylindrical or the like as long as capable of expanding and contracting in the X-axis direction.

The X-axis drive shaft 1132 is formed in a columnar shape, and arranged such that an axis of the column extends along the X-axis direction. The X-axis drive shaft 1132 is made of composite resin material including fiber such as carbon fiber.

A first end part of the X-axis drive shaft 1132 in the X-axis direction is fixed to a first end part of the X-axis piezoelectric element 1131 in the X-axis direction. Both end parts of the X-axis drive shaft 1132 are respectively accommodated in the groove 1121a of the first support part 1121 and the groove 1122a of the second support part 1122. A tip end part of the wall portion 1123 in a rising direction supports the X-axis drive shaft 1132 from the edge H1014 side of the base main body 1110, when viewed along the direction of the optical axis L.

The weight part 1133 is fixed to a second end part of the X-axis piezoelectric element 1131 in the X-axis direction. The weight part 1133 is formed from a material having a higher specific gravity such as tungsten or tungsten alloy, and designed to be heavier than the X-axis drive shaft 1132. By making the weight part 1133 heavier than the X-axis drive shaft 1132, the X-axis drive shaft 1132 side can be easily displaced when the X-axis piezoelectric element 1131 expands and contracts.

The actuator mounting part 1111 is provided on the base main body 1110, on the surface on the side disposed with the auxiliary element 1200. The actuator mounting part 1111 is provided so as to rise from the base main body 1110, at a position on the edge H1012 side from the X-axis actuator support part 1120. A surface of the weight part 1133, on an opposite side to a side fixed with the X-axis piezoelectric element 1131, is fixed to the actuator mounting part 1111. This allows the X-axis actuator 1130 to be in a state in which the X-axis drive shaft 1132 is fixed to the actuator mounting part 1111 while being supported by the X-axis actuator support part 1120.

The X-axis actuator 1130 is arranged with X-axis drive shaft 1132 side facing outward, when viewed along the direction of the optical axis L. That is, an end part on the X-axis drive shaft 1132 side of the X-axis actuator 1130 is facing a side away from the lens carrier 1400 (see FIG. 31 and the like).

To fix the X-axis piezoelectric element 1131 and the X-axis drive shaft 1132, to fix the X-axis piezoelectric element 1131 and the weight part 1133, and to fix the weight part 1133 and the actuator mounting part 1111, an adhesive such as an epoxy adhesive is used, for example.

The stopper part 1112, the first strut part 1113, and the second strut part 1114 each are provided on the surface on the side disposed with the auxiliary element 1200, on the base main body 1110. The stopper part 1112, the first strut part 1113, and the second strut part 1114 each are provided on the base main body 1110 so as to rise from the surface on the side disposed with the auxiliary element 1200.

The stopper part 1112 is provided near the edge H1013 of the base main body 1110. The stopper part 1112 limits a moving range of the movable element 1300 in the X-axis direction. Details for limiting the moving range with the stopper part 1112 will be described later.

The first strut part 1113 is provided at a corner where the edge H1012 and the edge H1013 are connected, on the surface of the base main body 1110. The second strut part 1114 is provided at a corner where the edge H1012 and the edge H1014 are connected, on the surface of the base main body 1110. The first strut part 1113 and the second strut part 1114 support the case 3A from inside. The actuator mounting part 1111, the stopper part 1112, the first strut part 1113, and the second strut part 1114 are integrally provided with the base main body 1110.

In the base main body 1110, protrusions T1011 to T1013 are provided on the surface on the side disposed with the auxiliary element 1200. The protrusion T1011 is provided near a corner where the edge H1011 and the edge H1013 are connected, on the surface of the base main body 1110. The protrusion T1012 is provided at a position between the stopper part 1112 and the first strut part 1113, on the surface of the base main body 1110. The protrusion T1013 is provided near a corner where the edge H1012 and the edge H1014 are connected, on the surface of the base main body 1110. The protrusions T1011 to T1013 and the base main body 1110 are integrally provided. The protrusions T1011 to T1013 may be hemispherical, for example, or may be convex with a flat top.

Figure 21:
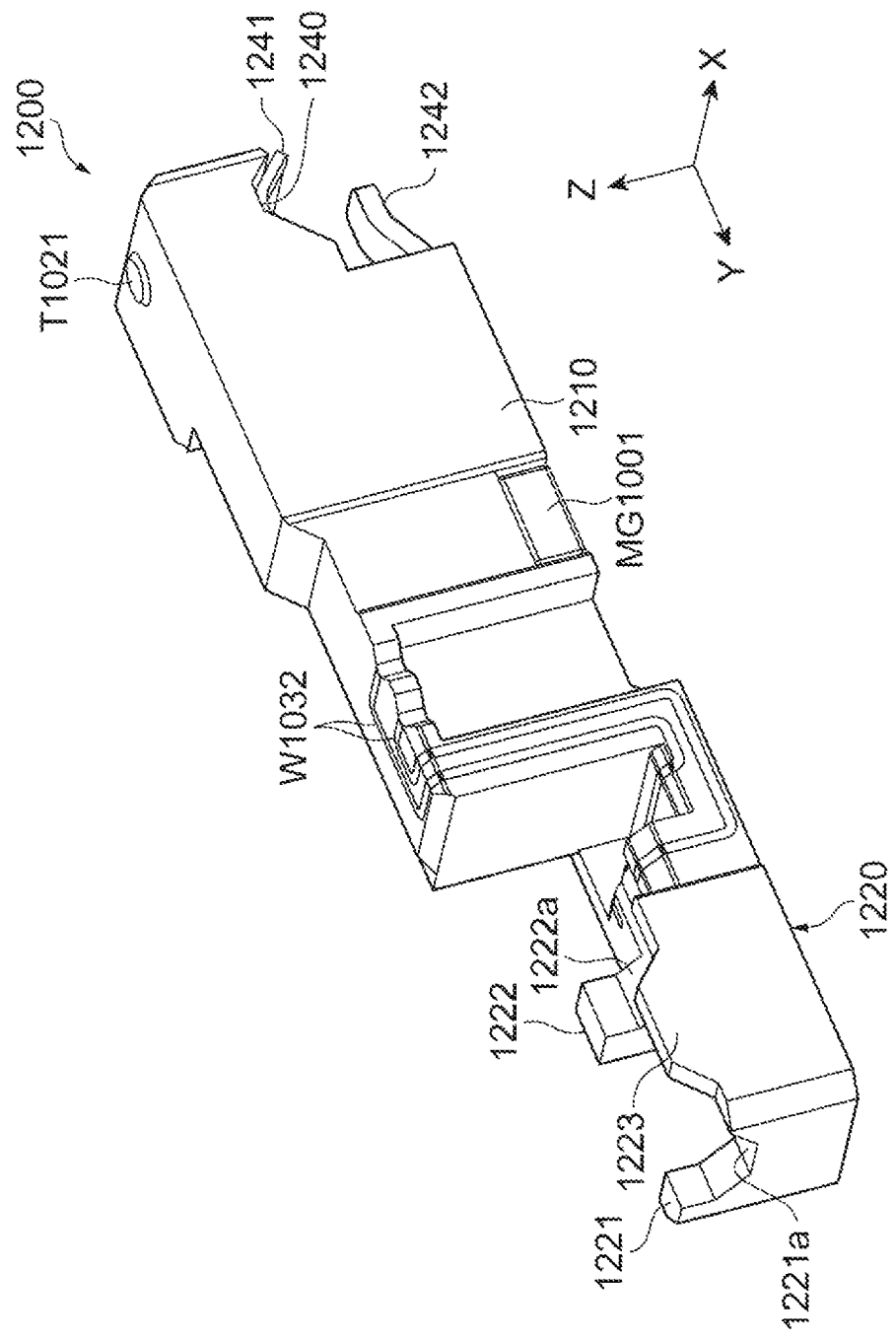
FIG. 21 is a perspective view showing an auxiliary element of FIG. 17.

Next, configuration details of the auxiliary element 1200 will be described. As shown in FIG. 21, the auxiliary element 1200 is a rod-shaped member extending along the Y-axis direction when assembled to the base member 1100. The auxiliary element 1200 includes an auxiliary element main body 1210 and a Y-axis actuator support part 1220. The auxiliary element main body 1210 and the Y-axis actuator support part 1220 are integrally provided.

The auxiliary element main body 1210 is provided with an X-axis friction engagement part 1240. The X-axis friction engagement part 1240 is provided to the auxiliary element main body 1210, at an end part opposite to a side connected with the Y-axis actuator support part 1220. The X-axis friction engagement part 1240 is provided on an outer surface of the auxiliary element main body 1210, on a surface on a side facing the X-axis actuator 1130 side when the auxiliary element 1200 is assembled to the base member 1100. The X-axis friction engagement part 1240 is formed in a substantially V-groove shape extending along the X-axis direction when the auxiliary element 1200 is assembled to the base member 1100. To the X-axis friction engagement part 1240, a metal plate 1241 having a substantially V-shape is mounted (see FIG. 23). The X-axis friction engagement part 1240 abuts on the X-axis drive shaft 1132 via the metal plate 1241.

Figure 23:
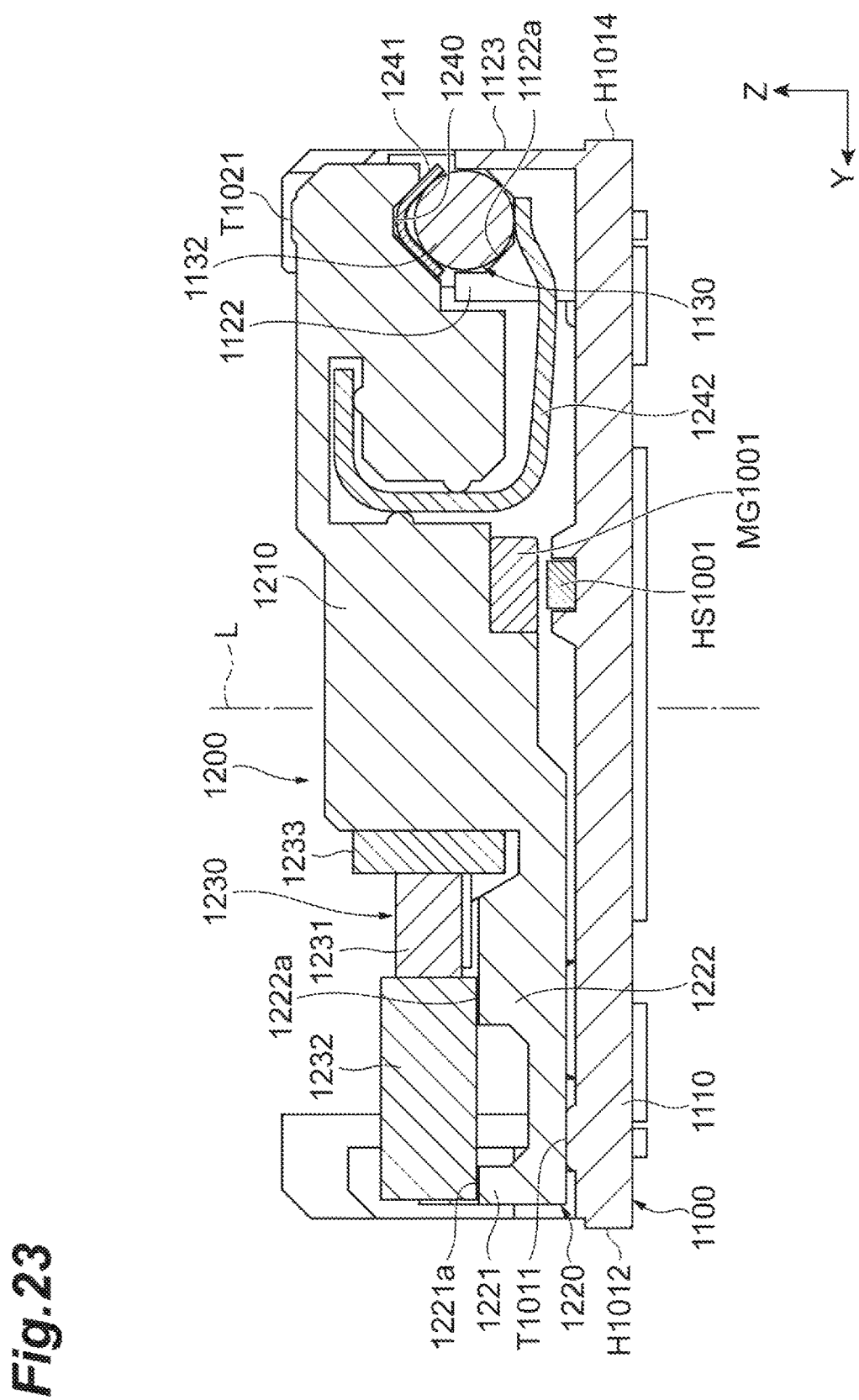
FIG. 23 is a cross-sectional view taken along line XXIII-XXIII of FIG. 22.

To the auxiliary element main body 1210, a first urging part 1242 is mounted (see FIG. 23). The first urging part 1242 is an elastic member. A first end part of the first urging part 1242 is fixed to the auxiliary element main body 1210. A second end part (tip end part) of the first urging part 1242 is opposed to the X-axis friction engagement part 1240.

On a surface of the auxiliary element main body 1210, on an opposite side to a side provided with the X-axis friction engagement part 1240, a protrusion T1021 is provided. The protrusion T1021 is located on the auxiliary element main body 1210, near an end part on the side provided with the X-axis friction engagement part 1240. The protrusion T1021 and the auxiliary element main body 1210 are integrally provided. The protrusion T1021 may be hemispherical, for example, or may be convex with a flat top. The protrusion T1021 abuts on an inner surface of the case 3A, when the auxiliary element 1200 is floated from the base main body 1110.

The Y-axis actuator support part 1220 supports the Y-axis actuator 1230 (Y-axis drive shaft 1232) from the base main body 1110 side, in a state in which the auxiliary element 1200 is assembled to the base member 1100. The Y-axis actuator support part 1220 has a similar configuration as that of the X-axis actuator support part 1120 provided on the base member 1100. Specifically, the Y-axis actuator support part 1220 includes a first support part 1221, a second support part 1222, and a wall portion 1223.

The first support part 1221 and the second support part 1222 are provided so as to be arranged side by side along the Y-axis direction when the auxiliary element 1200 is assembled to the base member 1100. The second support part 1222 is provided on the auxiliary element main body 1210 side from the first support part 1221. Between the first support part 1221 and the second support part 1222, a predetermined clearance is provided. At the top of each of the first support part 1221 and the second support part 1222, there are respectively provided grooves 1221a and 1222a having a substantially U-shaped cross section and extending along the Y-axis direction when the auxiliary element 1200 is assembled to the base member 1100. Between the first support part 1221 and the second support part 1222, the wall portion 1223 is provided to connect the first support part 1221 with the second support part 1222. The wall portion 1223 connects end parts of the first support part 1221 and the second support part 1222 to each other on the edge H1011 side of the base main body 1110, when viewed along the direction of the optical axis L in the state in which the auxiliary element 1200 is assembled to the base member 1100.

Figure 22:
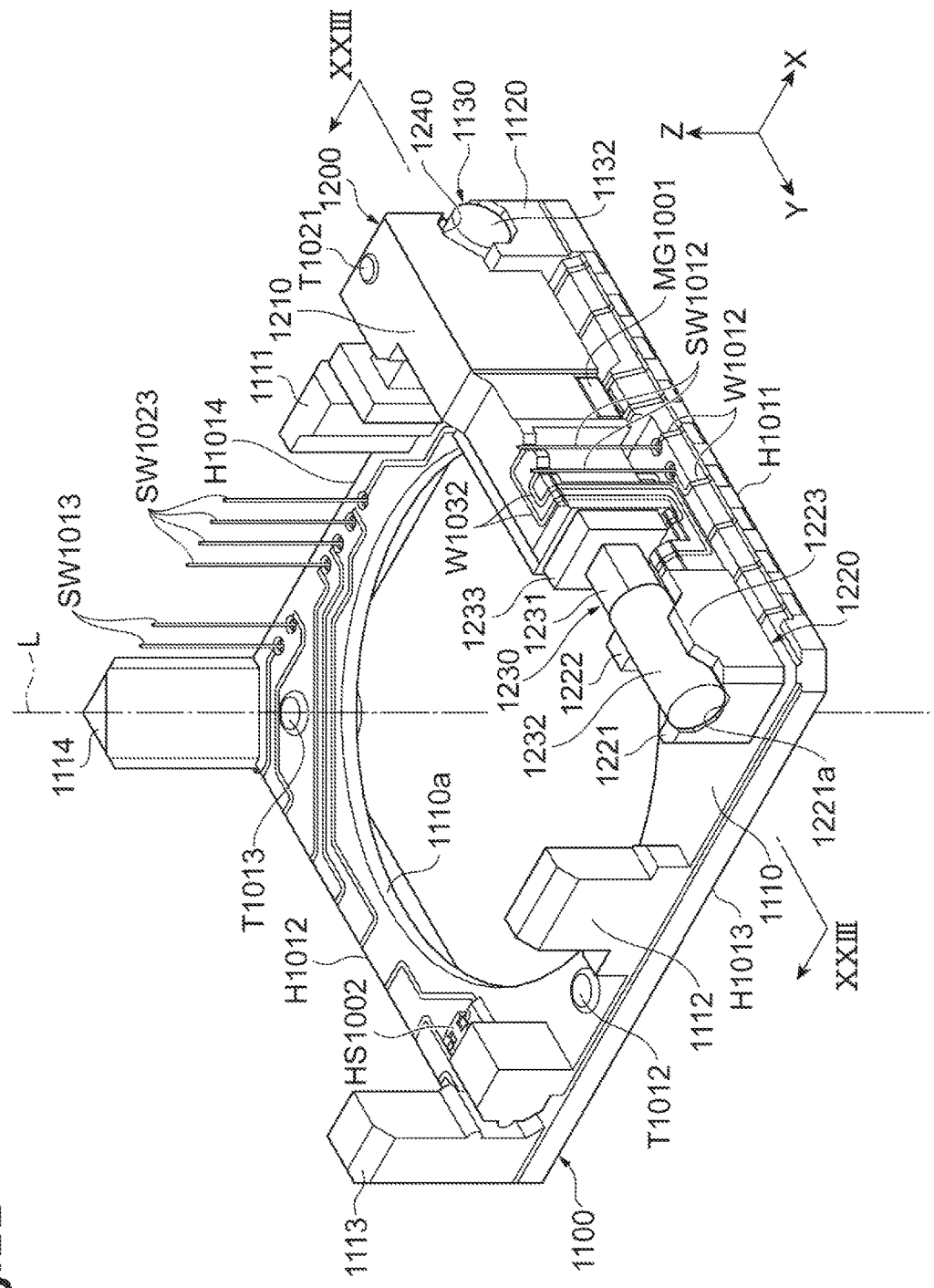
FIG. 22 is a perspective view showing a state in which the auxiliary element is assembled to the base member of FIG. 17.

Next, the state in which the auxiliary element 1200 is assembled to the base member 1100 will be described. As shown in FIGS. 21 to 23, the auxiliary element 1200 is arranged to be stacked on one surface of the base member 1100 in the direction of the optical axis L. The auxiliary element 1200 is disposed on the surface of the base main body 1110, at a region between the opening 1110a and the edge H1011 when viewed along the direction of the optical axis L. An end part of the auxiliary element 1200, on the side provided with the X-axis friction engagement part 1240, is located near a corner where the edge H1011 and the edge H1014 are connected. An end part of the auxiliary element 1200, on a side provided with the Y-axis actuator support part 1220, is located near a corner where the edge H1011 and the edge H1013 are connected.

The X-axis friction engagement part 1240 abuts on the X-axis drive shaft 1132 via the metal plate 1241. The X-axis friction engagement part 1240 abuts on the X-axis drive shaft 1132 so as to sandwich the X-axis drive shaft 1132, together with the X-axis actuator support part 1120. The tip end part of the first urging part 1242 abuts on the X-axis drive shaft 1132, at a position between the first support part 1121 and the second support part 1122. The tip end part of the first urging part 1242 urges the X-axis drive shaft 1132 in a direction pressing the X-axis drive shaft 1132 toward the X-axis friction engagement part 1240. Accordingly, the X-axis drive shaft 1132 is sandwiched between the tip end part of the first urging part 1242 and the X-axis friction engagement part 1240. That is, the X-axis friction engagement part 1240 is frictionally engaged with the X-axis drive shaft 1132 via the metal plate 1241.

In the state in which the auxiliary element 1200 is assembled to the base member 1100, a surface on the base main body 1110 side of the Y-axis actuator support part 1220 abuts on the protrusion T1011 provided on the base main body 1110 (see FIG. 23). By sandwiching the X-axis drive shaft 1132 between the X-axis friction engagement part 1240 and the first urging part 1242, the auxiliary element 1200 is supported to be movable in the X-axis direction, on the base member 1100. That is, a first end part of the auxiliary element 1200 is supported on the base member 1100 via the X-axis actuator 1130, and a second end part is supported on the base member 1100 with the protrusion T1011.

The X-axis piezoelectric element 1131 expands and contracts in the X-axis direction while the X-axis friction engagement part 1240 is frictionally engaged with the X-axis drive shaft 1132, causing a movement of the auxiliary element 1200 in the X-axis direction with respect to the base member 1100.

As shown in FIGS. 22 and 23, the auxiliary element 1200 is provided with the Y-axis actuator 1230. The Y-axis actuator 1230 is an actuator constituting the smooth impact drive mechanism. The Y-axis actuator 1230 includes a prismatic Y-axis piezoelectric element 1231, the Y-axis drive shaft 1232, and a weight part 1233.

The Y-axis piezoelectric element 1231 is an element capable of expanding and contracting in the Y-axis direction. The Y-axis piezoelectric element 1231 is made of a piezoelectric material. Since a material and a shape of the Y-axis piezoelectric element 1231 are similar to those of the X-axis piezoelectric element 1131, detailed description is omitted.

The Y-axis drive shaft 1232 is formed in a columnar shape, and arranged such that an axis of the column extends along the Y-axis direction. The Y-axis drive shaft 1232 is made of composite resin material including fiber such as carbon fiber.

A first end part of the Y-axis drive shaft 1232 in the Y-axis direction is fixed to a first end part of the Y-axis piezoelectric element 1231 in the Y-axis direction. Both end parts of the Y-axis drive shaft 1232 are respectively accommodated in the groove 1221*a* of the first support part 1221 and the groove 1222*a* of the second support part 1222. A tip end part of the wall portion 1223 in a rising direction supports the Y-axis drive shaft 1232 from the edge H1011 side of the base main body 1110, when viewed along the direction of the optical axis L.

The weight part 1233 is fixed to a second end part of the Y-axis piezoelectric element 1231 in the Y-axis direction. Since a material and a function of the weight part 1233 are similar to those of the weight part 1133, detailed description is omitted.

The weight part 1233 is fixed to the auxiliary element main body 1210, on a surface facing the Y-axis actuator support part 1220 side. This allows the Y-axis actuator 1230 to be in a state in which the Y-axis drive shaft 1232 is fixed to the auxiliary element main body 1210 while being supported by the Y-axis actuator support part 1220.

The Y-axis actuator 1230 is arranged with the Y-axis drive shaft 1232 side facing outward, when viewed along the direction of the optical axis L. That is, an end part on the Y-axis drive shaft 1232 side of the Y-axis actuator 1230 is facing a side away from the lens carrier 1400 (see FIG. 31 and the like).

As shown in FIG. 23, when viewed along the X-axis direction, the optical axis L is passing through the auxiliary element 1200. Further, the X-axis actuator 1130 and the Y-axis actuator 1230 are provided at a position opposed to each other with the optical axis L in between, when viewed along the X-axis direction.

Figure 24:
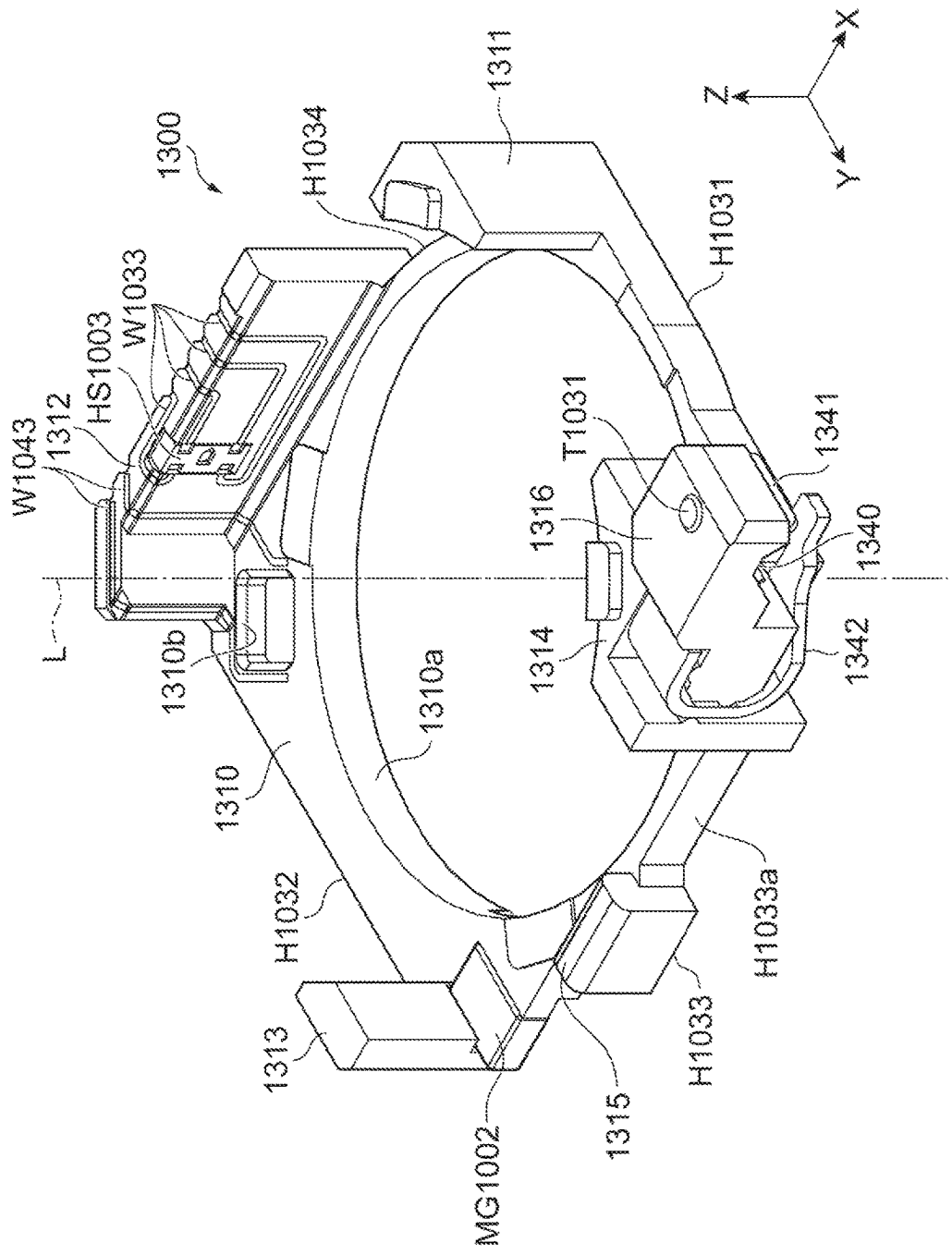
FIG. 24 is a perspective view showing a movable element of FIG. 17.

Next, configuration details of the movable element 1300 will be described. As shown in FIG. 24, the movable element 1300 includes a movable element main body 1310, a first side wall portion 1311, a second side wall portion 1312, a third side wall portion 1313, a fourth side wall portion 1314, a raised portion 1315, an overhanging portion 1316, and a Y-axis friction engagement part 1340.

The movable element main body 1310 is formed in a substantially rectangular plate shape having four corners when viewed along the direction of the optical axis L. For convenience of description, individual four edges constituting an outer peripheral edge of the movable element main body 1310 when viewed along the direction of the optical axis L are referred to as an edge H1031, an edge H1032, an edge H1033, and an edge H1034. The movable element main body 1310 is provided with a circular opening 1310*a* centered on the optical axis L (through which the optical axis L passes). A diameter of the opening 1310*a* provided on the movable element main body 1310 is smaller by a predetermined length than a diameter of the opening 1110*a* provided on the base member 1100 (see FIG. 33).

Figure 25:
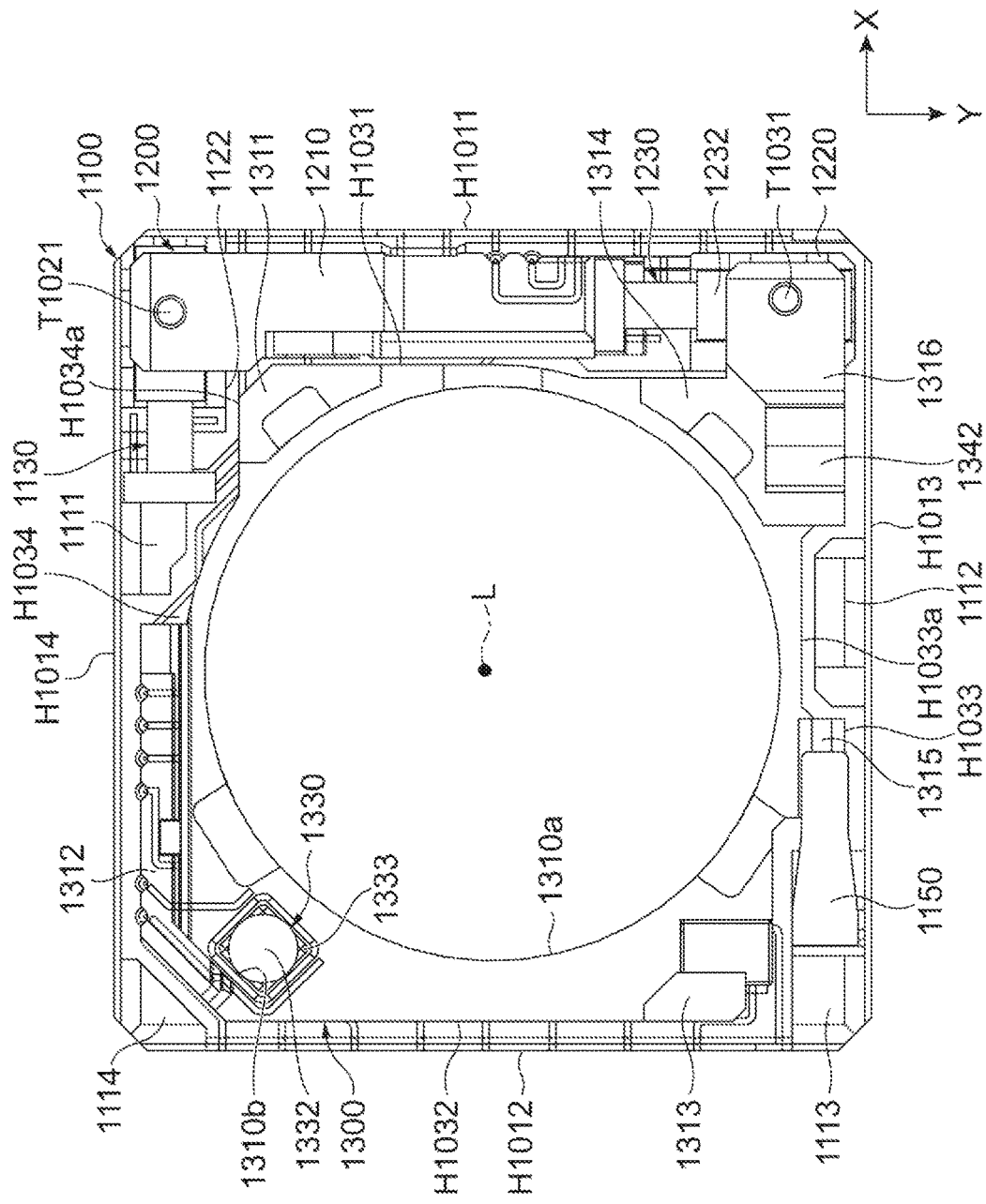
FIG. 25 is a top view showing a state in which the auxiliary element and the movable element are assembled to the base member of FIG. 17.

As shown in FIGS. 24 and 25, the edge 111031 is an edge located on the edge H1011 side of the base member 1100 with respect to the opening 1310*a* when viewed along the direction of the optical axis L, in a state in which the movable element 1300 is stacked on the base member 1100. Similarly, the edge H1032 is an edge located on the edge H1012 side of the base member 1100, with respect to the opening 1310*a*. The edge H1033 is an edge located on the edge H1013 side of the base member 1100, with respect to the opening 1310*a*. The edge H1034 is an edge located on the edge H1014 side of the base member 1100, with respect to the opening 1310*a*.

As shown in FIG. 24, the first side wall portion 1311 rises from the movable element main body 1310 toward a side disposed with the lens carrier 1400, at a corner where the edge H1031 and the edge H1034 are connected on the movable element main body 1310. The second side wall portion 1312 rises from the movable element main body 1310 toward the side disposed with the lens carrier 1400, at a corner where the edge H1032 and the edge H1034 are connected on the movable element main body 1310. The second side wall portion 1312 extends by a predetermined length toward the first side wall portion 1311 side from the corner where the edge H1032 and the edge H1034 are connected.

The third side wall portion 1313 rises from the movable element main body 1310 toward the side disposed with the lens carrier 1400, at a corner where the edge H1032 and the edge H1033 are connected on the movable element main body 1310. The fourth side wall portion 1314 rises from the movable element main body 1310 toward the side disposed with the lens carrier 1400, at a corner where the edge H1033 and the edge H1031 are connected on the movable element main body 1310. The overhanging portion 1316 is provided at a tip end part of the fourth side wall portion 1314 in a rising direction. The overhanging portion 1316 outwardly overhangs from the tip end part of the fourth side wall portion 1314 (to a side away from the opening 1310*a*).

On the movable element main body 1310, on a surface on the side disposed with the lens carrier 1400, there is provided an actuator holding part 1310*b* recessed in a rectangular shape. The actuator holding part 1310*b* is located near the corner where the edge H1032 and the edge H1034 are connected.

The raised portion 1315 is provided near the edge H1033 on the surface of the movable element main body 1310, on the side disposed with the lens carrier 1400. A top of the raised portion 1315 extends along the X-axis direction. The raised portion 1315 protrudes from the movable element main body 1310 so as to have a substantially arcuate cross section in the Y-axis direction. The top of the raised portion 1315 may have a flat portion.

The Y-axis friction engagement part 1340 is provided to the overhanging portion 1316. The Y-axis friction engagement part 1340 is provided on an outer surface of the overhanging portion 1316, on a surface on a side facing the Y-axis actuator 1230 side when the movable element 1300 is assembled to the base member 1100 and the auxiliary element 1200 (see FIG. 26). The Y-axis friction engagement part 1340 is formed in a substantially V-groove shape extending along the Y-axis direction when the movable element 1300 is assembled to the base member 1100 (see FIGS. 26, 27 and the like). To the Y-axis friction engagement part 1340, a metal plate 1341 having a substantially V-shape is mounted. The Y-axis friction engagement part 1340 abuts on the Y-axis drive shaft 1232 via the metal plate 1341.

To the overhanging portion 1316, a second urging part (movable-element-side urging part) 1342 is mounted. The second urging part 1342 is an elastic member. A first end part of the second urging part 1342 is fixed to the overhanging portion 1316. A second end part (tip end part) of the second urging part 1342 is opposed to the Y-axis friction engagement part 1340.

To the overhanging portion 1316, the protrusion T1031 is provided. The protrusion T1031 is provided on a surface of the overhanging portion 1316, on an opposite side to a side provided with the Y-axis friction engagement part 1340. The protrusion T1031 and the overhanging portion 1316 are integrally provided. The protrusion T1031 may be hemispherical, for example, or may be convex with a flat top. The protrusion T1031 abuts on an inner surface of the case 3A, when the movable element 1300 is floated from the base main body 1110.

The edge H1033 of the movable element main body 1310 is provided with a recess H1033*a* recessed toward the opening 1310*a* side.

Next, a state in which the movable element 1300 is assembled to the base member 1100 and the auxiliary element 1200 will be described. As shown in FIGS. 24 to 28, the movable element 1300 is arranged to be stacked on the base main body 1110, on a same side as that of the auxiliary element 1200. The movable element 1300 is stacked on the surface of the base main body 1110 such that the opening 1310*a* and the opening 1110*a* of the base main body 1110 are communicated when viewed along the direction of the optical axis L. The auxiliary element 1200 and the movable element 1300 are disposed on the same surface of the base main body 1110, to be adjacent to each other. As shown in FIG. 25, when viewed along the direction of the optical axis L, the auxiliary element 1200 and the movable element 1300 do not overlap each other. However, the overhanging portion 1316 of the movable element 1300 overlaps the auxiliary element 1200 in order to engage the Y-axis friction engagement part 1340 with the Y-axis drive shaft 1232.

The Y-axis friction engagement part 1340 abuts on the Y-axis drive shaft 1232 via the metal plate 1341. The Y-axis friction engagement part 1340 abuts on the Y-axis drive shaft 1232 so as to sandwich the Y-axis drive shaft 1232, together with the Y-axis actuator support part 1220. The tip end part of the second urging part 1342 abuts on the Y-axis drive shaft 1232, at a position between the first support part 1221 and the second support part 1222. The tip end part of the second urging part 1342 urges the Y-axis drive shaft 1232 in a direction pressing the Y-axis drive shaft 1232 toward the Y-axis friction engagement part 1340. That is, the second urging part 1342 urges the Y-axis actuator 1230 toward the movable element 1300 (overhanging portion 1316) side. Accordingly, the Y-axis drive shaft 1232 is sandwiched between the tip end part of the second urging part 1342 and the Y-axis friction engagement part 1340. That is, the Y-axis friction engagement part 1340 is frictionally engaged with the Y-axis drive shaft 1232 via the metal plate 1341. Thus, the Y-axis actuator 1230 is engaged with the movable element 1300.

In the state in which the movable element 1300 is assembled to the base member 1100 and the auxiliary element 1200, a surface on the base main body 1110 side of the movable element main body 1310 abuts on the protrusions T1012 and T1013 provided on the base main body 1110. By sandwiching the Y-axis drive shaft 1232 between the Y-axis friction engagement part 1340 and the second urging part 1342, the movable element 1300 is supported to be movable in the Y-axis direction, on the base member 1100 and the auxiliary element 1200. That is, in the movable element 1300, a side provided with the Y-axis friction engagement part 1340 is supported on the auxiliary element 1200 via the Y-axis actuator 1230, and a side opposite to the side provided with the X-axis friction engagement part 1240 is supported on the base member 1100 with the protrusions T1012 and T1013.

The Y-axis piezoelectric element 1231 expands and contracts in the Y-axis direction while the Y-axis friction engagement part 1340 is frictionally engaged with the Y-axis drive shaft 1232, causing a movement of the movable element 1300 in the Y-axis direction with respect to the auxiliary element 1200.

Since the Y-axis friction engagement part 1340 is engaged with the Y-axis drive shaft 1232, the movable element 1300 moves with the auxiliary element 1200 in the X-axis direction. Accordingly, the auxiliary element 1200 moves in the X-axis direction with respect to the base member 1100, while the movable element 1300 moves in the Y-axis direction with respect to the auxiliary element 1200, causing movement of the movable element 1300 in the X-axis direction and the Y-axis direction with respect to the base member 1100.

As shown in FIG. 25, when viewed along the direction of the optical axis L, a part of the stopper part 1112 enters into the recess H1033*a*. A wall surface of the recess H1033*a* faces an outer surface of the stopper part 1112 in the Y-axis direction. Further, the wall surface of the recess H1033*a* faces the outer surface of the stopper part 1112 in the X-axis direction. In a side wall portion on the edge H1034 of the auxiliary element main body 1210, a portion facing the second support part 1122 of the X-axis actuator support part 1120 is defined as a stopper part H1034*a*.

When the movable element 1300 moves toward a side away from the stopper part 1112 along the Y-axis direction, the stopper part H1034*a* abuts on the second support part 1122. When the auxiliary element 1200 moves in a direction approaching the stopper part 1112 along the Y-axis direction, the wall surface of the recess H1033a abuts on the stopper part 1112. That is, the stopper part 1112 and the second support part 1122 function as a stopper mechanism to regulate a moving range of the auxiliary element 1200 in the Y-axis direction. When the auxiliary element 1200 moves along the X-axis direction, the wall surface of the recess H1033a abuts on the stopper part 1112. That is, the stopper part 1112 functions as a stopper mechanism to regulate a moving range of the auxiliary element 1200 in the X-axis direction.

The base member 1100 is provided with a retaining member (base-member-side urging part) 1150. A first end part of the retaining member 1150 is fixed to the base main body 1110, and a second end part (tip end part) abuts on the top of the raised portion 1315. The retaining member 1150 is an elastic member. The tip end part of the retaining member 1150 urges the raised portion 1315 toward the base main body 1110 side. That is, the retaining member 1150 urges the movable element 1300 toward the base member 1100 side. This inhibits floating of the movable element 1300 from the base main body 1110. Since the Y-axis friction engagement part 1340 abuts on the Y-axis drive shaft 1232, it is inhibited that an end part on the Y-axis actuator support part 1220 side of the auxiliary element 1200 is floated from the base main body 1110. This inhibits floating of the auxiliary element 1200 and the movable element 1300 from the base main body 1110.

Figure 26:
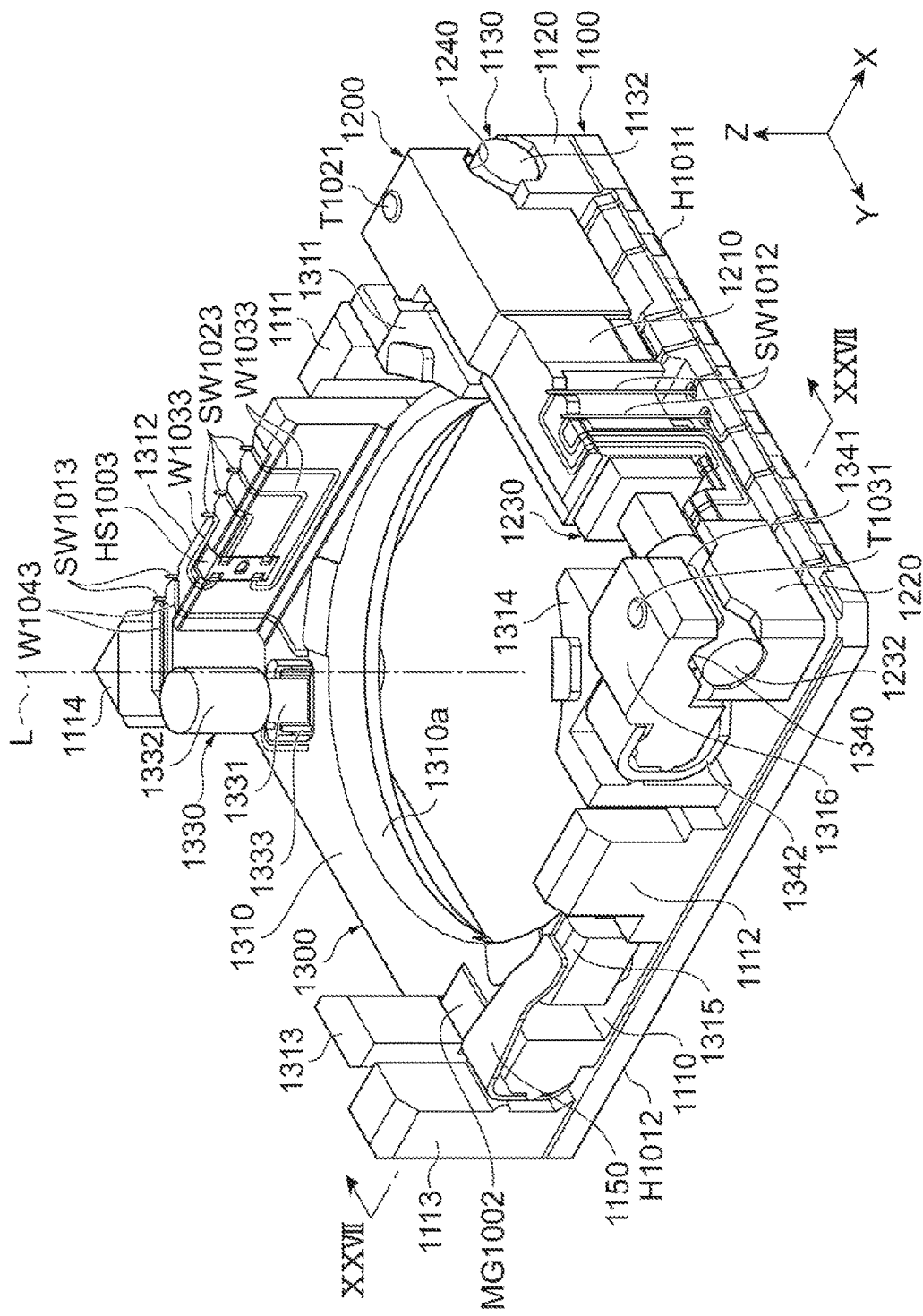
FIG. 26 is a perspective view showing the state in which the auxiliary element and the movable element are assembled to the base member of FIG. 17.

As shown in FIGS. 25 and 26, the movable element 1300 is mounted with the Z-axis actuator 1330. The Z-axis actuator 1330 is an actuator constituting the smooth impact drive mechanism. The Z-axis actuator 1330 includes a prismatic Z-axis piezoelectric element 1331, a Z-axis drive shaft 1332, and a weight part 1333.

The Z-axis piezoelectric element 1331 is an element capable of expanding and contracting in the Z-axis direction. The Z-axis piezoelectric element 1331 is made of a piezoelectric material. Since a material and a shape of the Z-axis piezoelectric element 1331 are similar to those of the X-axis piezoelectric element 1131, detailed description is omitted.

The Z-axis drive shaft 1332 is formed in a columnar shape, and arranged such that an axis of the column extends along the Z-axis direction. The Z-axis drive shaft 1332 is made of composite resin material including fiber such as carbon fiber.

A first end part of the Z-axis drive shaft 1332 in the Z-axis direction is fixed to a first end part of the Z-axis piezoelectric element 1331 in the Z-axis direction. The weight part 1333 is fixed to a second end part of the Z-axis piezoelectric element 1331 in the Z-axis direction. Since a material and a function of the weight part 1333 are similar to those of the weight part 1133, detailed description is omitted.

By fitting and fixing the weight part 1333 in the actuator holding part 1310b provided on the movable element main body 1310, the Z-axis actuator 1330 is held on the movable element 1300. The Z-axis actuator 1330 is opposed to the auxiliary element 1200 via the lens carrier 1400.

Figure 29:
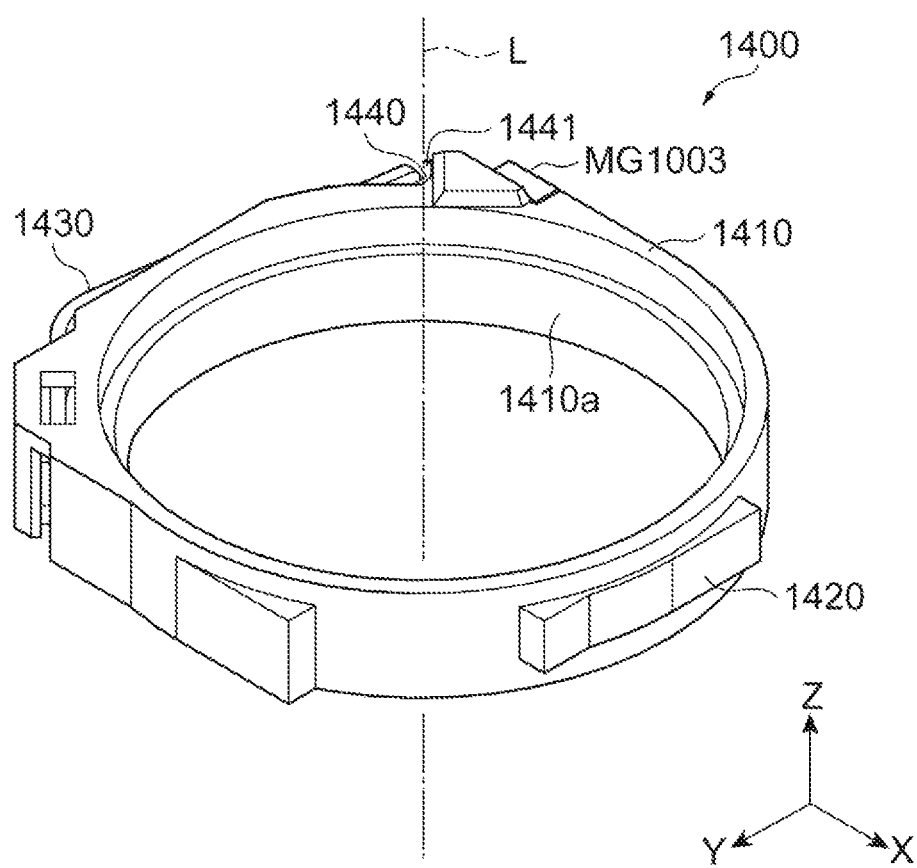
FIG. 29 is a perspective view showing a lens carrier of FIG. 17.
Figure 30:
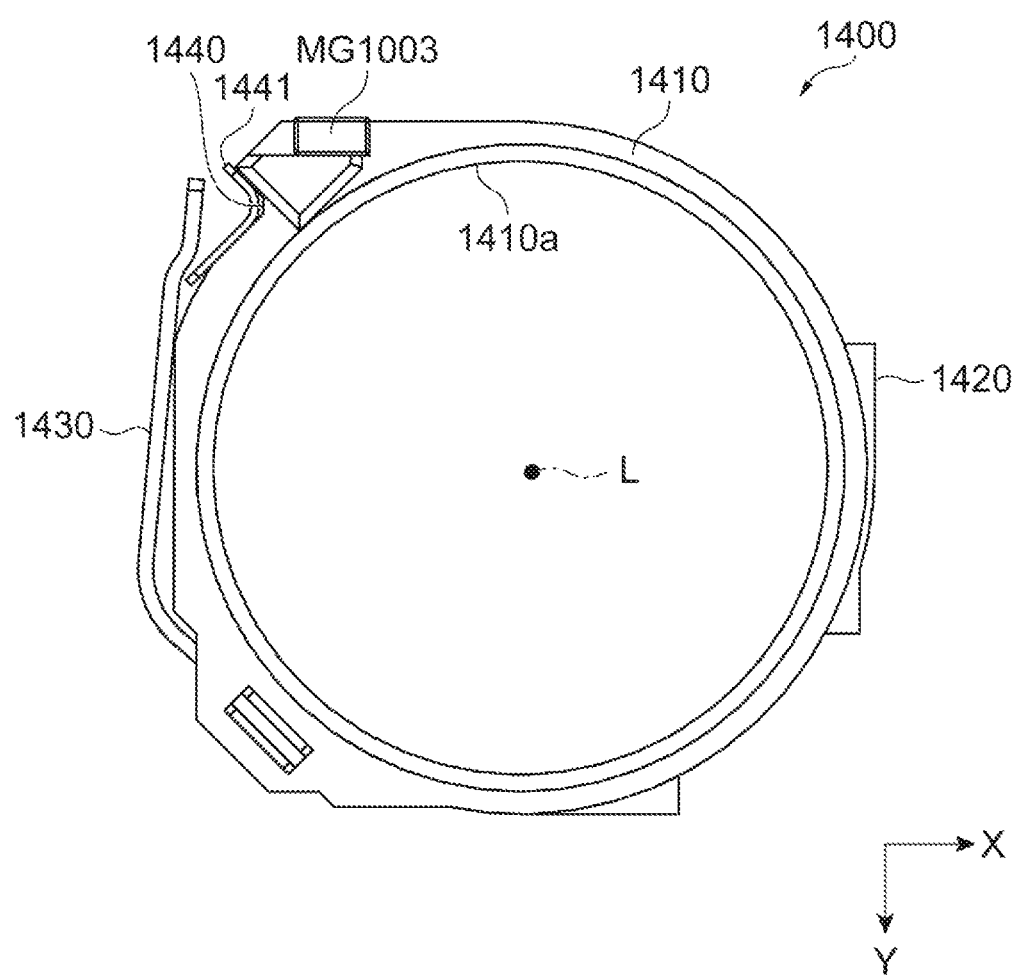
FIG. 30 is a top view showing the lens carrier of FIG. 17.

Next, configuration details of the lens carrier 1400 will be described. As shown in FIGS. 29 and 30, the lens carrier 1400 includes a carrier main body 1410, a rotation-stopping projection 1420, a third urging part 1430, and a Z-axis friction engagement part 1440.

The carrier main body 1410 is provided with a circular opening 1410a centered on the optical axis L. A diameter of the opening 1410a provided on the carrier main body 1410 is smaller by a predetermined length than the diameter of the opening 1310a provided on the movable element 1300 (see FIG. 33). The opening 1410a of the carrier main body 1410 can be mounted with (can hold) the lens 4A. That is, a wall surface of the opening 1410a is a lens mounting part to be mounted with the lens 4A (FIG. 17). The lens 4A may be a lens unit formed by a plurality of lenses, or may be a single lens.

The rotation-stopping projection 1420 protrudes from an outer peripheral surface of the carrier main body 1410 along a direction orthogonal to the optical axis L.

The Z-axis friction engagement part 1440 is provided on the outer peripheral surface of the carrier main body 1410. The Z-axis friction engagement part 1440 is provided at a position substantially opposed to the rotation-stopping projection 1420 with the optical axis L in between. The Z-axis friction engagement part 1440 is formed in a substantially V-groove shape extending along the Z-axis direction when the lens carrier 1400 is assembled to the movable element 1300. To the Z-axis friction engagement part 1440, a metal plate 1441 having a substantially V-shape is mounted. The Z-axis friction engagement part 1440 abuts on the Z-axis drive shaft 1332 via the metal plate 1441.

The third urging part 1430 is mounted on the outer peripheral surface of the carrier main body 1410. The third urging part 1430 is an elastic member. A first end part of the third urging part 1430 is fixed to the carrier main body 1410. A second end part (tip end part) of the third urging part 1430 is opposed to the Z-axis friction engagement part 1440.

Figure 31:
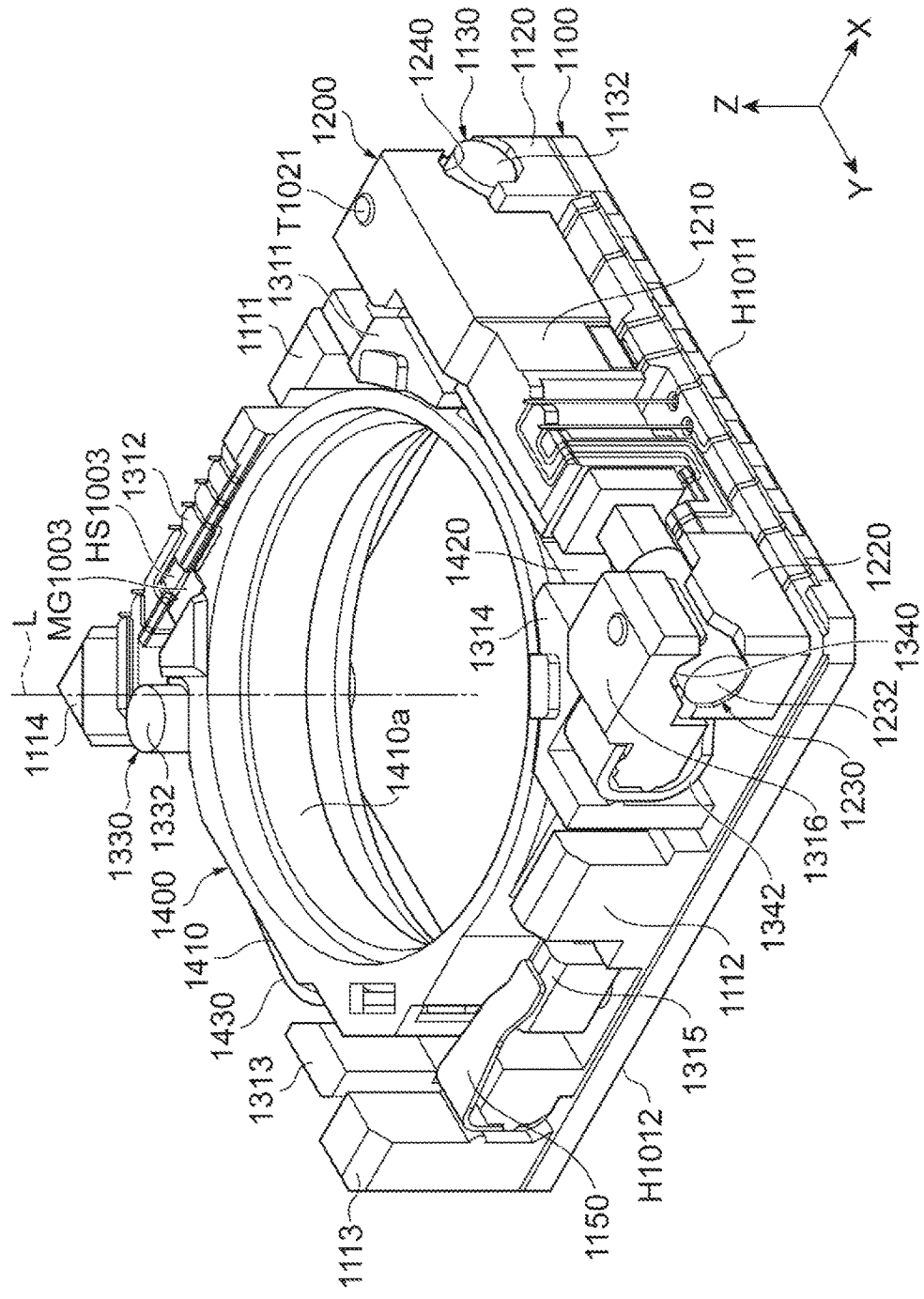
FIG. 31 is a perspective view showing a state in which the auxiliary element, the movable element, and the lens carrier are assembled to the base member of FIG. 17.
Figure 32:
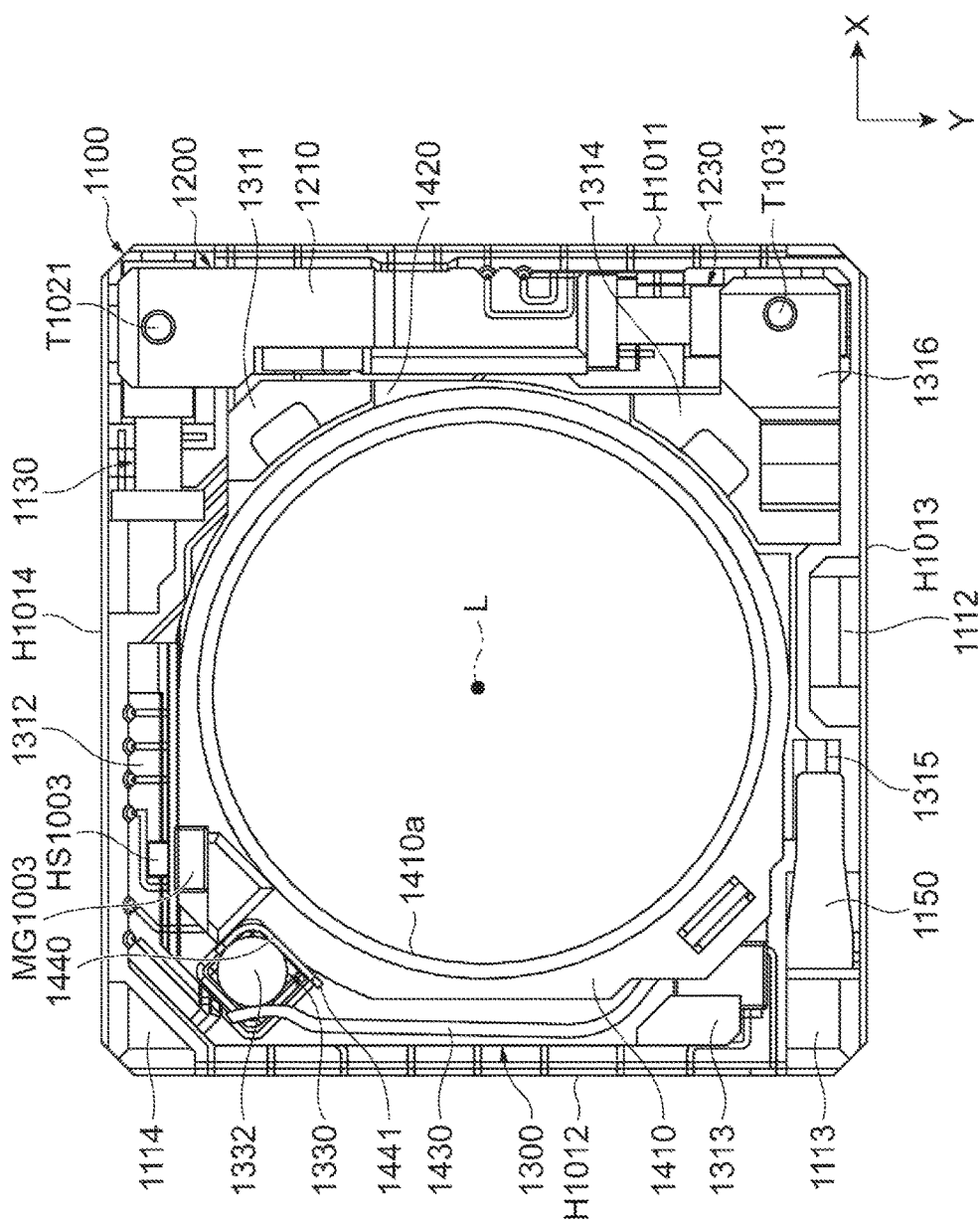
FIG. 32 is a top view showing the state in which the auxiliary element, the movable element, and the lens carrier are assembled to the base member of FIG. 17.

Next, a state in which the lens carrier 1400 is assembled to the movable element 1300 will be described. As shown in FIGS. 31 and 32, the lens carrier 1400 is arranged to be stacked on the movable element 1300, on an opposite side to a side provided with the base member 1100 (the side where the base member 1100 is stacked) in the direction of the optical axis L. The lens carrier 1400 is stacked on the surface of the movable element main body 1310 such that the opening 1410a and the opening 1310a of the movable element 1300 are communicated when viewed along the direction of the optical axis L.

The carrier main body 1410 is surrounded by the first side wall portion 1311, the second side wall portion 1312, the third side wall portion 1313, and the fourth side wall portion 1314. This regulates a movement of the lens carrier 1400 in the X-axis direction and the Y-axis direction with respect to the movable element 1300. The lens carrier 1400 is held on the movable element 1300 to be movable in the direction of the optical axis L. As shown in FIG. 32, when viewed along the direction of the optical axis L, the lens carrier 1400 and the auxiliary element 1200 do not overlap each other. The Z-axis actuator 1330 is opposed to the auxiliary element 1200 via the lens carrier 1400.

The opening 1110a of the base member 1100 is provided at a position closer to the edge H1012 side than the edge H1011. Therefore, when viewed along the direction of the optical axis L, the lens carrier 1400 is disposed at a position closer to an end part on the edge H1012 side (second end part) of the base member 1100 than an end part on the edge H1011 side (first end part). The auxiliary element 1200 is disposed at a position closer to the end part on the edge H1011 side (first end part) of the base member 1100 than the end part on the edge H1012 side (second end part).

The rotation-stopping projection 1420 is located between the first side wall portion 1311 and the fourth side wall portion 1314 in the Y-axis direction. Since the rotation-stopping projection 1420 is located between the first side wall portion 1311 and the fourth side wall portion 1314, rotation of the lens carrier 1400 around the optical axis L is inhibited.

The Z-axis friction engagement part 1440 abuts on the Z-axis drive shaft 1332 via the metal plate 1441. The third urging part 1430 is opposed to the auxiliary element 1200 via the carrier main body 1410. The tip end part of the third urging part 1430 abuts on the Y-axis drive shaft 1232. The tip end part of the third urging part 1430 urges the Z-axis drive shaft 1332 in a direction pressing the Z-axis drive shaft 1332 toward the Z-axis friction engagement part 1440. Accordingly, the Z-axis drive shaft 1332 is sandwiched between the tip end part of the third urging part 1430 and the Z-axis friction engagement part 1440. That is, the Z-axis friction engagement part 1440 is frictionally engaged with the Z-axis drive shaft 1332 via the metal plate 1441.

The Z-axis piezoelectric element 1331 expands and contracts in the Z direction while the Z-axis friction engagement part 1440 is frictionally engaged with the Z-axis drive shaft 1332, causing a movement of the lens carrier 1400 in the Z-axis direction with respect to the movable element 1300.

Next, details of the frame member 1500 will be described. As shown in FIG. 17, the frame member 1500 has a substantially rectangular frame shape surrounding the lens carrier 1400, when viewed along the direction of the optical axis L. The frame member 1500 is mounted at tip end parts of the first side wall portion 1311, the second side wall portion 1312, the third side wall portion 1313, and the fourth side wall portion 1314, provided on the movable element 1300.

An inner peripheral surface of the frame member 1500 is provided with a Z-axis actuator support part 1510 configured to support the Z-axis drive shaft 1332 of the Z-axis actuator 1330. The Z-axis actuator support part 1510 abuts on a portion on a side away from the optical axis L, on an outer peripheral surface of the Z-axis drive shaft 1332 when viewed along the direction of the optical axis L.

Next, a state in which the case 3A is mounted on the lens driving part 2A will be described. As shown in FIGS. 17 and 32, the case 3A covers the base main body 1110 so as to accommodate components inside other than the base member 1100, among the components constituting the lens driving part 2A. The case 3A is provided with a circular opening 1003a centered on the optical axis L. Tip end parts of the first strut part 1113 and the second strut part 1114 provided on the base member 1100 abut on an inner surface of the case 3A to support the case 3A.

Next, an electric wire connected to each of the actuators, a sensor configured to detect a position of the auxiliary element 1200 and the like, and an electric wire connected to each sensor will be described. First, an electric wire and a sensor provided on the base member 1100 will be described. As shown in FIGS. 18 and 19, on the surface of the base main body 1110, on a side disposed with the movable element 1300 and the like, there are provided a Hall sensor HS1001, a Hall sensor HS1002, two electric wires W1011, two electric wires W1012, two electric wires W1013, four electric wires W1021, four electric wires W1022, and four electric wires W1023.

Each first end of the two electric wires W1011 is connected to the X-axis piezoelectric element 1131 of the X-axis actuator 1130, and each second end extends to the edge H1011 of the base main body 1110. The electric wire W1011 supplies power to the X-axis piezoelectric element 1131.

Each of the two electric wires W1012 is provided near the edge H1011 on the base main body 1110. Each first end of the two electric wires W1012 is located near the edge H1011 on the base main body 1110, and each second end extends to the edge H1011 of the base main body 1110.

The two electric wires W1013 are provided near a corner where the edge H1012 and the edge H1014 of the base main body 1110 are connected. Each first end of the two electric wires W1013 is located near the edge H1014 on the base main body 1110, and each second end extends to the edge H1012 of the base main body 1110.

Each first end of three electric wires W1023 among the four electric wires W1023 is located near the edge H1014 on the base main body 1110, and each second end extends to the edge H1012 of the base main body 1110. A first end of the remaining electric wire W1023 is located near the edge H1014 on the base main body 1110, and a second end extends to the edge H1011 of the base main body 1110.

The Hall sensor HS1001 functions as a position sensor configured to detect a position of the auxiliary element 1200 moved with respect to the base member 1100. The Hall sensor HS1001 is provided near the edge H1011 of the base main body 1110. The Hall sensor HS1001 is connected with each first end of the four electric wires W1021. Each second end of the four electric wires W1021 extends to the edge H1011 of the base main body 1110.

The Hall sensor HS1002 functions as a position sensor configured to detect a position of the movable element 1300 moved with respect to the base member 1100. The Hall sensor HS1002 is provided near a corner where the edge H1012 and the edge 111013 of the base main body 1110 are connected. The Hall sensor HS1002 is connected with each first end of the four electric wires W1022. Each second end of the four electric wires W1022 extends to the edge H1012 of the base main body 1110.

At an end part position of the base main body 1110, each of the electric wires W1011 to W1013 and W1021 to W1023 is connected with each wire of a control circuit, drive circuit, and the like.

Next, an electric wire or the like provided to the auxiliary element 1200 will be described. As shown in FIG. 21, the auxiliary element 1200 is provided with a magnet MG1001 and two electric wires W1032. The magnet MG1001 is mounted on a surface facing the base main body 1110, on the auxiliary element main body 1210. As shown in FIG. 23 and the like, the magnet MG1001 faces the Hall sensor HS1001 provided on the base member 1100, in the Z-axis direction. The Hall sensor HS1001 detects a position of the auxiliary element 1200 with respect to the base member 1100, based on a change in a magnetic field of the magnet MG1001 moved with the auxiliary element 1200. The X-axis actuator 1130 is feedback-controlled based on a detection result of the Hall sensor HS1001.

Each first end of the two electric wires W1032 is connected to the Y-axis piezoelectric element 1231 of the Y-axis actuator 1230. Each second end of the two electric wires W1032 is connected to each first end of two suspension wires SW1012. The suspension wire SW1012 is an elastic member having electrical conductivity. As shown in FIG. 22, each second end of the two suspension wires SW1012 is connected to each second end of the electric wire W1012. To the Y-axis piezoelectric element 1231, power is supplied via the electric wire W1012 provided on the base main body 1110, the suspension wire SW1012, and the electric wire W1032 provided on the auxiliary element 1200.

Next, an electric wire or the like provided to the movable element 1300 will be described. As shown in FIG. 24, the movable element 1300 is provided with a magnet MG1002, a Hall sensor HS1003, four electric wires W1033, and two electric wires W1043.

Figure 27:
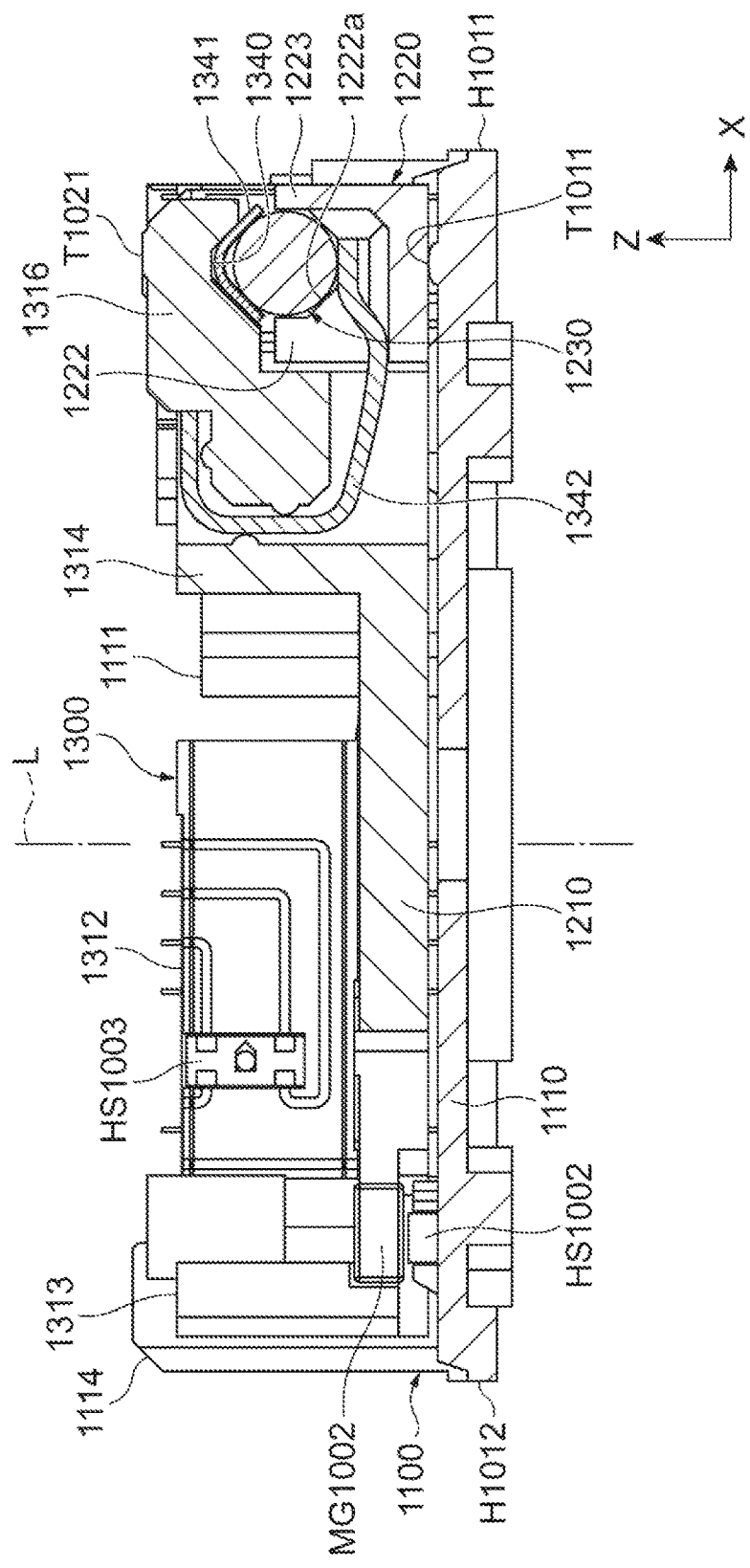
FIG. 27 is a cross-sectional view taken along line XXVII-XXVII of FIG. 26.

The magnet MG1002 is provided at a corner on the third side wall portion 1313 side of the movable element main body 1310. As shown in FIG. 27 and the like, the magnet MG1002 faces the Hall sensor HS1002 provided on the base member 1100, in the Z-axis direction. The Hall sensor HS1002 detects a position of the movable element 1300 with respect to the base member 1100, based on a change in a magnetic field of the magnet MG1002 moved with the movable element 1300. The Y-axis actuator 1230 is feedback-controlled based on a detection result of the Hall sensor HS1002.

As shown in FIG. 24, the Hall sensor HS1003 functions as a position sensor configured to detect a position of the lens carrier 1400 moved in the Z-axis direction with respect to the movable element 1300. The Hall sensor HS1003 is provided on a surface on the optical axis L side of the second side wall portion 1312. The Hall sensor HS1003 is connected with each first end of the four electric wires W1033. Each second end of the four electric wires W1033 extends to the tip end part (top) of the second side wall portion 1312 rising from the movable element main body 1310.

Figure 28:
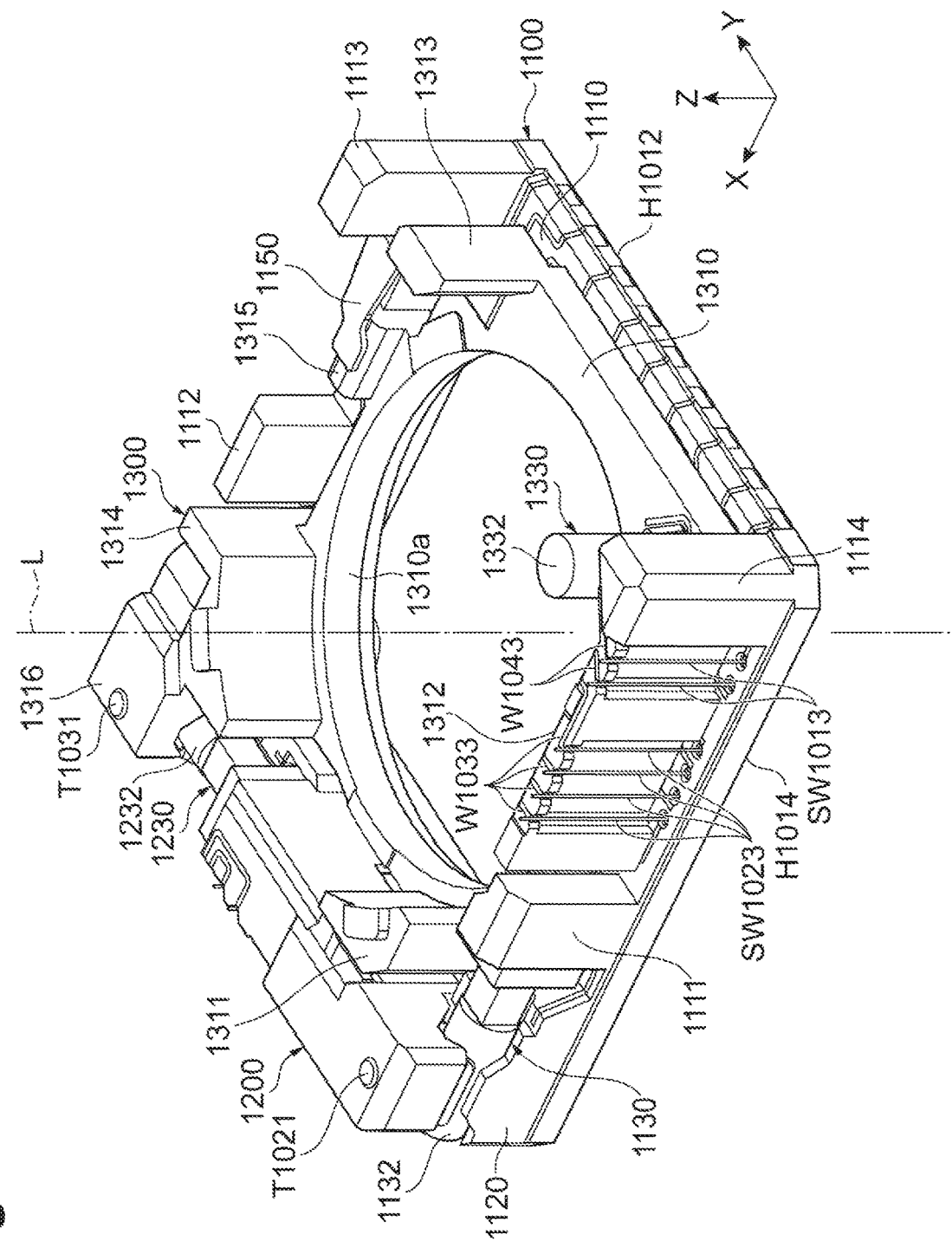
FIG. 28 is a perspective view showing the state, from another angle, in which the auxiliary element and the movable element are assembled to the base member of FIG. 17.

As shown in FIGS. 18 and 28, each first end of the four electric wires W1023 provided on the base member 1100 is connected to each second end of the four electric wires W1033 provided on the movable element 1300 by four suspension wires SW1023. The suspension wire SW1023 is an elastic member having electrical conductivity.

As shown in FIGS. 24, 26 and the like, each first end of the two electric wires W1043 is connected to the Z-axis piezoelectric element 1331 of the Z-axis actuator 1330, each second end extends to a tip end part of the second side wall portion 1312.

As shown in FIGS. 18 and 28, each first end of the two electric wires W1013 provided on the base member 1100 is connected to each second end of the two electric wires W1043 provided on the movable element 1300 by two suspension wires SW1013. The suspension wire SW1013 is an elastic member having electrical conductivity. To the Z-axis piezoelectric element 1331, power is supplied via the electric wire W1013 provided on the base main body 1110, the suspension wire SW1013, and the electric wire W1043 provided on the movable element 1300.

Next, the lens carrier 1400 will be described. As shown in FIG. 30, the lens carrier 1400 is provided with a magnet MG1003. The magnet MG1003 is provided on the outer peripheral surface of the carrier main body 1410, at a position near the Z-axis friction engagement part 1440. As shown in FIG. 32 and the like, the magnet MG1003 faces the Hall sensor HS1003 provided on the second side wall portion 1312 of the movable element 1300, in the Y-axis direction. The Hall sensor HS1003 detects a position of the lens carrier 1400 with respect to the movable element 1300, based on a change in a magnetic field of the magnet MG1003 moved with the lens carrier 1400. The Z-axis actuator 1330 is feedback-controlled based on a detection result of the Hall sensor HS1003.

The second embodiment is configured as described above. In this lens driving device 1A, the movable element 1300 is urged to the base member 1100 side by the retaining member 1150. This suppresses floating of the movable element 1300 from the base member 1100, and rattling of the movable element 1300 with respect to the base member 1100. Further, the second urging part 1342 urges the Y-axis actuator 1230 toward the movable element 1300 (overhanging portion 1316) side. That is, the Y-axis actuator 1230 is sandwiched between the movable element 1300 (overhanging portion 1316) and the second urging part 1342. The auxiliary element 1200 is engaged with the X-axis actuator 1130 fixed to the base member 1100. Thus, providing the retaining member 1150 and the second urging part 1342 causes suppression of floating of the movable element 1300 from the base member 1100, enabling stable movement of the movable element 1300.

What is claimed is:

1. A lens driving device for driving a lens, comprising:
a base member;
a movable element arranged to be stacked on the base member in a direction of an optical axis of the lens, and movable with respect to the base member;
a piezoelectric actuator having a piezoelectric element, and configured to move the movable element in a direction orthogonal to the direction of the optical axis of the lens by expanding and contracting the piezoelectric element, the piezoelectric actuator being engaged with the movable element;
a lens carrier arranged to be stacked on the movable element, on an opposite side to a side provided with the base member in the direction of the optical axis of the lens, the lens carrier being capable of holding the lens;
a base-member-side urging part mounted on the base member, the base-member-side urging part urging the movable element from a lens carrier side toward a base member side; and
a movable-element-side urging part mounted on the movable element, the movable-element-side urging part urging the piezoelectric actuator from the base member side toward a movable element side.

2. The lens driving device according to claim 1, wherein
a first end part of the piezoelectric actuator is fixed to the base member, and a second end part is engaged with the movable element; and
the movable-element-side urging part urges the piezoelectric actuator toward the movable element side while the piezoelectric actuator is located closer to the base member than the movable element.

3. The lens driving device according to claim 2, wherein the base-member-side urging part is opposed to the movable-element-side urging part with the optical axis of the lens interposed in between.

4. The lens driving device according to claim 2, wherein
the piezoelectric actuator has the piezoelectric element and a drive shaft having one end part fixed to the piezoelectric element;
an end part of the piezoelectric actuator on the piezoelectric element side with respect to the drive shaft is fixed to the base member;
the drive shaft is engaged with the movable element; and
the movable-element-side urging part urges the drive shaft toward the movable element side while the drive shaft is located closer to the base member than the movable element.

5. A lens driving device for driving a lens, comprising:
a base member;
an X-axis movable element arranged to be stacked on the base member in a direction of an optical axis of the lens, and movable with respect to the base member;
an X-axis piezoelectric actuator having an X-axis piezoelectric element, and configured to move the X-axis movable element in an X-axis direction orthogonal to the direction of the optical axis of the lens by expanding and contracting the X-axis piezoelectric element, a first end part of the X-axis piezoelectric actuator being fixed to the base member, and a second end part being engaged with the X-axis movable element;

a Y-axis movable element arranged to be stacked on the X-axis movable element, on an opposite side to a side provided with the base member in the direction of the optical axis of the lens, the Y-axis movable element being movable with respect to the X-axis movable element;

a Y-axis piezoelectric actuator having a Y-axis piezoelectric element, and configured to move the Y-axis movable element in a Y-axis direction by expanding and contracting the Y-axis piezoelectric element, the Y-axis direction being orthogonal to the direction of the optical axis of the lens and crossing the X-axis direction, a first end part of the Y-axis piezoelectric actuator being fixed to the X-axis movable element, and a second end part being engaged with the Y-axis movable element;

a lens carrier arranged to be stacked on the Y-axis movable element, on an opposite side to a side provided with the X-axis movable element in the direction of the optical axis of the lens, the lens carrier being capable of holding the lens;

a first urging part mounted on the base member, the first urging part urging the X-axis movable element from a Y-axis moveable element side toward a base member side;

a second urging part mounted on the X-axis movable element, the second urging part urging the X-axis piezoelectric actuator from the base member side toward an X-axis movable element side while the X-axis piezoelectric actuator is located closer to the base member than the X-axis movable element;

a third urging part mounted on the X-axis movable element, the third urging part urging the Y-axis movable element from a lens carrier side toward the X-axis movable element side; and a fourth urging part mounted on the Y-axis movable element, the fourth urging part urging the Y-axis piezoelectric actuator from the X-axis movable element side toward the Y-axis movable element side while the Y-axis piezoelectric actuator is located closer to the X-axis movable element than the Y-axis movable element.

6. The lens driving device according to claim 5, wherein the first urging part is opposed to the second urging part with the optical axis of the lens interposed in between; and the third urging part is opposed to the fourth urging part with the optical axis of the lens interposed in between.

7. The lens driving device according to claim 5, wherein the X-axis piezoelectric actuator has the X-axis piezoelectric element and an X-axis drive shaft having one end part fixed to the X-axis piezoelectric element;

an end part of the X-axis piezoelectric actuator, on the X-axis piezoelectric element side with respect to the X-axis drive shaft, is fixed to the base member;

the X-axis drive shaft is engaged with the X-axis movable element;

the second urging part urges the X-axis drive shaft toward the X-axis movable element side while the X-axis drive shaft is located closer to the base member than the X-axis movable element;

the Y-axis piezoelectric actuator has the Y-axis piezoelectric element and a Y-axis drive shaft having one end part fixed to the Y-axis piezoelectric element;

an end part of the Y-axis piezoelectric actuator, on the Y-axis piezoelectric element side with respect to the Y-axis drive shaft, is fixed to the X-axis movable element;

the Y-axis drive shaft is engaged with the Y-axis movable element; and the fourth urging part urges the Y-axis drive shaft toward the Y-axis movable element side while the Y-axis drive shaft is located closer to the X-axis movable element than the Y-axis movable element.

* * * * *